US011024160B2

(12) United States Patent
Ricci

(10) Patent No.: US 11,024,160 B2
(45) Date of Patent: Jun. 1, 2021

(54) FEEDBACK PERFORMANCE CONTROL AND TRACKING

(71) Applicant: NIO USA, Inc., San Jose, CA (US)

(72) Inventor: Christopher P. Ricci, Saratoga, CA (US)

(73) Assignee: NIO USA, Inc., San Jose, CA (US)

( * ) Notice: Subject to any disclaimer, the term of this patent is extended or adjusted under 35 U.S.C. 154(b) by 247 days.

(21) Appl. No.: 15/393,054

(22) Filed: Dec. 28, 2016

(65) Prior Publication Data

US 2018/0127001 A1    May 10, 2018

Related U.S. Application Data

(60) Provisional application No. 62/418,620, filed on Nov. 7, 2016.

(51) Int. Cl.
*G08G 1/01* (2006.01)
*B60R 25/20* (2013.01)
(Continued)

(52) U.S. Cl.
CPC ....... *G08G 1/0125* (2013.01); *B60R 25/2018* (2013.01); *B60R 25/24* (2013.01);
(Continued)

(58) Field of Classification Search
CPC .................................................. G08G 1/0125
See application file for complete search history.

(56) References Cited

U.S. PATENT DOCUMENTS 4,361,202 A   11/1982 Minovitch
4,476,954 A   10/1984 Johnson et al.
(Continued)

FOREIGN PATENT DOCUMENTS

CN   1417755    5/2003
CN   1847817    10/2006
(Continued)

OTHER PUBLICATIONS

Jack Pokrzywa, SAE Global Ground Vehicle Standards, https://www.itu.int/en/ITU-T/extcoop/cits/Documents/Meeting-20190308-Geneva/09_SAE_Update-on-Global-Ground-Vehicle-Standards.pdf (2014)(downloaded on Sep. 4, 2016).*
(Continued)

*Primary Examiner* — Jean Paul Cass
(74) *Attorney, Agent, or Firm* — Sheridan Ross P.C.

(57) ABSTRACT

A method is provided for optimizing the use of autonomous features of advanced driver assistance systems and the tracking thereof. For example, a vehicle may be equipped with several driver assistance systems in which a driver of the vehicle may be assisted. The vehicle may automatically change the number of active assistance systems or suggest to the driver one or more assistance systems to activate based on several factors, including poor driving on behalf of the driver or poor driving conditions due to weather or road quality. Statistics regarding the use of such advanced driver assistance systems may be monitored and tracked and stored on an onboard database or transmitted continuously or periodically to various entities. For example, the system may operate to allow an insurance company to track the driving performance and the use of the advanced driver assistance systems to update actuarial models to more accurately adjust rates.

8 Claims, 19 Drawing Sheets

(51) Int. Cl.
*B60R 25/24* (2013.01)
*B60R 25/30* (2013.01)
*G08G 1/0967* (2006.01)
*B60W 30/16* (2020.01)
*B60W 30/10* (2006.01)
*B60W 30/14* (2006.01)
*B60W 40/09* (2012.01)
*B60W 50/14* (2020.01)
*G06Q 40/08* (2012.01)
*G01C 21/26* (2006.01)
*G05D 1/00* (2006.01)
*G05D 1/02* (2020.01)
*G08G 1/017* (2006.01)
*G08G 1/16* (2006.01)
*G01C 21/36* (2006.01)

(52) U.S. Cl.
CPC .......... *B60R 25/305* (2013.01); *B60W 30/10* (2013.01); *B60W 30/14* (2013.01); *B60W 30/16* (2013.01); *B60W 40/09* (2013.01); *B60W 50/14* (2013.01); *G01C 21/26* (2013.01); *G05D 1/0088* (2013.01); *G05D 1/0287* (2013.01); *G06Q 40/08* (2013.01); *G08G 1/017* (2013.01); *G08G 1/0112* (2013.01); *G08G 1/0129* (2013.01); *G08G 1/0133* (2013.01); *G08G 1/0145* (2013.01); *G08G 1/096725* (2013.01); *G08G 1/096741* (2013.01); *G08G 1/096775* (2013.01); *G01C 21/36* (2013.01); *G08G 1/164* (2013.01)

(56) References Cited

U.S. PATENT DOCUMENTS

| | | |
|---|---|---|
| 4,754,255 A | 6/1988 | Sanders et al. |
| 4,875,391 A | 10/1989 | Leising et al. |
| 5,136,498 A | 8/1992 | McLaughlin et al. |
| 5,204,817 A | 4/1993 | Yoshida |
| 5,363,306 A | 11/1994 | Kuwahara et al. |
| 5,508,689 A | 4/1996 | Rado et al. |
| 5,521,815 A | 5/1996 | Rose |
| 5,529,138 A | 6/1996 | Shaw et al. |
| 5,531,122 A | 7/1996 | Chatham et al. |
| 5,572,450 A | 11/1996 | Worthy |
| 5,610,821 A | 3/1997 | Gazis et al. |
| 5,648,769 A | 7/1997 | Sato et al. |
| 5,710,702 A | 1/1998 | Hayashi et al. |
| 5,794,164 A | 8/1998 | Beckert et al. |
| 5,797,134 A | 8/1998 | McMillan et al. |
| 5,812,067 A | 9/1998 | Bergholz et al. |
| 5,825,283 A | 10/1998 | Camhi |
| 5,838,251 A | 11/1998 | Brinkmeyer et al. |
| 5,847,661 A | 12/1998 | Ricci |
| 5,890,080 A | 3/1999 | Coverdill et al. |
| 5,928,294 A | 7/1999 | Zelinkovsky |
| 5,949,345 A | 9/1999 | Beckert et al. |
| 5,983,161 A | 11/1999 | Lemelson et al. |
| 5,986,575 A | 11/1999 | Jones et al. |
| 6,038,426 A | 3/2000 | Williams, Jr. |
| 6,081,756 A | 6/2000 | Mio et al. |
| D429,684 S | 8/2000 | Johnson |
| 6,128,003 A | 10/2000 | Smith et al. |
| 6,141,620 A | 10/2000 | Zyburt et al. |
| 6,148,261 A | 11/2000 | Obradovich et al. |
| 6,152,514 A | 11/2000 | McLellen |
| 6,157,321 A | 12/2000 | Ricci |
| 6,198,996 B1 | 3/2001 | Berstis |
| 6,199,001 B1 | 3/2001 | Ohta et al. |
| 6,202,008 B1 | 3/2001 | Beckert et al. |
| 6,226,389 B1* | 5/2001 | Lemelson ............... G01S 19/11 382/104 |
| 6,252,544 B1 | 6/2001 | Hoffberg |
| 6,267,428 B1 | 7/2001 | Baldas et al. |
| 6,302,438 B1 | 10/2001 | Stopper, Jr. et al. |
| 6,310,542 B1 | 10/2001 | Gehlot |
| 6,317,058 B1 | 11/2001 | Lemelson et al. |
| 6,339,826 B2 | 1/2002 | Hayes, Jr. et al. |
| 6,356,838 B1 | 3/2002 | Paul |
| 6,388,579 B1 | 5/2002 | Adcox et al. |
| 6,480,224 B1 | 11/2002 | Brown |
| 6,502,022 B1 | 12/2002 | Chastain et al. |
| 6,519,519 B1 | 2/2003 | Stopczynski |
| 6,557,752 B1 | 5/2003 | Yacoob |
| 6,563,910 B2 | 5/2003 | Menard et al. |
| 6,587,739 B1 | 7/2003 | Abrams et al. |
| 6,598,227 B1 | 7/2003 | Berry et al. |
| 6,607,212 B1 | 8/2003 | Reimer et al. |
| 6,617,981 B2 | 9/2003 | Basinger |
| 6,654,732 B1* | 11/2003 | Naito ..................... G05B 15/02 706/45 |
| 6,662,077 B2 | 12/2003 | Haag |
| 6,675,081 B2 | 1/2004 | Shuman et al. |
| 6,678,747 B2 | 1/2004 | Goossen et al. |
| 6,681,176 B2 | 1/2004 | Funk et al. |
| 6,690,260 B1 | 2/2004 | Ashihara |
| 6,690,940 B1 | 2/2004 | Brown et al. |
| 6,724,920 B1 | 4/2004 | Berenz et al. |
| 6,754,580 B1 | 6/2004 | Ask et al. |
| 6,757,593 B2 | 6/2004 | Mori et al. |
| 6,762,684 B1 | 7/2004 | Camhi |
| 6,765,495 B1 | 7/2004 | Dunning et al. |
| 6,778,888 B2 | 8/2004 | Cataldo et al. |
| 6,782,240 B1 | 8/2004 | Tabe |
| 6,785,531 B2 | 8/2004 | Lepley et al. |
| 6,816,783 B2 | 11/2004 | Hashima et al. |
| 6,816,971 B2 | 11/2004 | Schmidt et al. |
| 6,820,259 B1 | 11/2004 | Kawamata et al. |
| 6,944,533 B2 | 9/2005 | Obradovich et al. |
| 6,950,022 B2 | 9/2005 | Breed |
| 6,958,707 B1 | 10/2005 | Siegel |
| 6,992,580 B2 | 1/2006 | Kotzin et al. |
| 7,019,641 B1 | 3/2006 | Lakshmanan et al. |
| 7,020,544 B2 | 3/2006 | Shinada et al. |
| 7,021,691 B1 | 4/2006 | Schmidt et al. |
| 7,042,345 B2 | 5/2006 | Ellis |
| 7,047,129 B2 | 5/2006 | Uotani |
| 7,058,898 B2 | 6/2006 | McWalter et al. |
| 7,096,431 B2 | 8/2006 | Tambata et al. |
| 7,142,696 B1 | 11/2006 | Engelsberg et al. |
| 7,164,117 B2 | 1/2007 | Breed et al. |
| 7,187,947 B1 | 3/2007 | White et al. |
| 7,203,598 B1 | 4/2007 | Whitsell |
| 7,233,861 B2 | 6/2007 | Van Buer et al. |
| 7,239,960 B2 | 7/2007 | Yokota et al. |
| 7,277,454 B2 | 10/2007 | Mocek et al. |
| 7,284,769 B2 | 10/2007 | Breed |
| 7,289,645 B2 | 10/2007 | Yamamoto et al. |
| 7,295,921 B2 | 11/2007 | Spencer et al. |
| 7,313,547 B2 | 12/2007 | Mocek et al. |
| 7,333,012 B1 | 2/2008 | Nguyen |
| 7,343,148 B1 | 3/2008 | O'Neil |
| 7,386,376 B2 | 6/2008 | Basir et al. |
| 7,386,799 B1 | 6/2008 | Clanton et al. |
| 7,432,829 B2 | 10/2008 | Poltorak |
| 7,474,264 B2 | 1/2009 | Bolduc et al. |
| 7,493,140 B2 | 2/2009 | Michmerhuizen et al. |
| 7,526,539 B1 | 4/2009 | Hsu |
| 7,548,815 B2 | 6/2009 | Watkins et al. |
| 7,566,083 B2 | 7/2009 | Vitito |
| 7,606,660 B2 | 10/2009 | Diaz et al. |
| 7,606,867 B1 | 10/2009 | Singhal et al. |
| 7,643,913 B2 | 1/2010 | Taki et al. |
| 7,650,234 B2 | 1/2010 | Obradovich et al. |
| 7,671,764 B2 | 3/2010 | Uyeki et al. |
| 7,680,596 B2 | 3/2010 | Uyeki et al. |
| 7,683,771 B1 | 3/2010 | Loeb |
| 7,711,468 B1 | 5/2010 | Levy |
| 7,734,315 B2 | 6/2010 | Rathus et al. |
| 7,748,021 B2 | 6/2010 | Obradovich et al. |
| RE41,449 E | 7/2010 | Krahnstoever et al. |
| 7,791,499 B2 | 9/2010 | Mohan et al. |

(56) References Cited

U.S. PATENT DOCUMENTS

| | | |
|---|---|---|
| 7,796,190 B2 | 9/2010 | Basso et al. |
| 7,802,832 B2 | 9/2010 | Carnevali |
| 7,821,421 B2 | 10/2010 | Tamir et al. |
| 7,832,762 B2 | 11/2010 | Breed |
| 7,864,073 B2 | 1/2011 | Lee et al. |
| 7,872,591 B2 | 1/2011 | Kane et al. |
| 7,873,471 B2 | 1/2011 | Gieseke |
| 7,881,703 B2 | 2/2011 | Roundtree et al. |
| 7,891,004 B1 | 2/2011 | Gelvin et al. |
| 7,891,719 B2 | 2/2011 | Carnevali |
| 7,899,610 B2 | 3/2011 | McClellan |
| 7,966,678 B2 | 6/2011 | Ten Eyck et al. |
| 7,969,290 B2 | 6/2011 | Waeller et al. |
| 7,969,324 B2 | 6/2011 | Chevion et al. |
| 8,060,631 B2 | 11/2011 | Collart et al. |
| 8,064,925 B1 | 11/2011 | Sun et al. |
| 8,066,313 B2 | 11/2011 | Carnevali |
| 8,098,170 B1 | 1/2012 | Szczerba et al. |
| 8,113,564 B2 | 2/2012 | Carnevali |
| 8,131,419 B2 | 3/2012 | Ampunan et al. |
| 8,157,310 B2 | 4/2012 | Carnevali |
| 8,162,368 B2 | 4/2012 | Carnevali |
| 8,175,802 B2 | 5/2012 | Forstall et al. |
| 8,233,919 B2 | 7/2012 | Haag et al. |
| 8,245,609 B1 | 8/2012 | Greenwald et al. |
| 8,306,514 B1 | 11/2012 | Nunally |
| 8,334,847 B2 | 12/2012 | Tomkins |
| 8,346,233 B2 | 1/2013 | Aaron et al. |
| 8,346,432 B2 | 1/2013 | Van Wiemeersch et al. |
| 8,350,721 B2 | 1/2013 | Carr |
| 8,352,282 B2 | 1/2013 | Jensen et al. |
| 8,369,263 B2 | 2/2013 | Dowling et al. |
| 8,417,449 B1 | 4/2013 | Denise |
| 8,432,260 B2 | 4/2013 | Talty et al. |
| 8,442,389 B2 | 5/2013 | Kashima et al. |
| 8,442,758 B1 | 5/2013 | Rovik et al. |
| 8,467,965 B2 | 6/2013 | Chang |
| 8,497,842 B2 | 7/2013 | Tomkins et al. |
| 8,498,809 B2 | 7/2013 | Bill |
| 8,509,982 B2 | 8/2013 | Montemerlo et al. |
| 8,521,410 B2 | 8/2013 | Mizuno et al. |
| 8,527,143 B2 | 9/2013 | Tan |
| 8,527,146 B1 | 9/2013 | Jackson et al. |
| 8,532,574 B2 | 9/2013 | Kirsch |
| 8,543,330 B2 | 9/2013 | Taylor et al. |
| 8,547,340 B2 | 10/2013 | Sizelove et al. |
| 8,548,669 B2 | 10/2013 | Naylor |
| 8,559,183 B1 | 10/2013 | Davis |
| 8,577,600 B1 | 11/2013 | Pierfelice |
| 8,578,279 B2 | 11/2013 | Chen et al. |
| 8,583,292 B2 | 11/2013 | Preston et al. |
| 8,589,073 B2 | 11/2013 | Guha et al. |
| 8,600,611 B2 | 12/2013 | Seize |
| 8,613,385 B1 | 12/2013 | Hulet et al. |
| 8,621,645 B1 | 12/2013 | Spackman |
| 8,624,727 B2 | 1/2014 | Saigh et al. |
| 8,634,984 B2 | 1/2014 | Sumizawa |
| 8,644,165 B2 | 2/2014 | Saarimaki et al. |
| 8,660,735 B2 | 2/2014 | Tengler et al. |
| 8,671,068 B2 | 3/2014 | Harter et al. |
| 8,688,372 B2 | 4/2014 | Bhogal et al. |
| 8,705,527 B1 | 4/2014 | Addepalli et al. |
| 8,706,143 B1 | 4/2014 | Elias |
| 8,718,797 B1 | 5/2014 | Addepalli et al. |
| 8,725,311 B1 | 5/2014 | Breed |
| 8,730,033 B2 | 5/2014 | Yarnold et al. |
| 8,737,986 B2 | 5/2014 | Rhoads et al. |
| 8,761,673 B2 | 6/2014 | Sakata |
| 8,774,842 B2 | 7/2014 | Jones et al. |
| 8,779,947 B2 | 7/2014 | Tengler et al. |
| 8,782,262 B2 | 7/2014 | Collart et al. |
| 8,793,065 B2 | 7/2014 | Seltzer et al. |
| 8,798,918 B2 | 8/2014 | Onishi et al. |
| 8,805,110 B2 | 8/2014 | Rhoads et al. |
| 8,812,171 B2 | 8/2014 | Filev et al. |
| 8,817,761 B2 | 8/2014 | Gruberman et al. |
| 8,825,031 B2 | 9/2014 | Aaron et al. |
| 8,825,277 B2 | 9/2014 | McClellan et al. |
| 8,825,382 B2 | 9/2014 | Liu |
| 8,826,261 B1 | 9/2014 | Anand AG et al. |
| 8,838,088 B1 | 9/2014 | Henn et al. |
| 8,862,317 B2 | 10/2014 | Shin et al. |
| 8,977,408 B1 | 3/2015 | Cazanas et al. |
| 8,996,224 B1* | 3/2015 | Herbach .............. G05D 1/0044 701/23 |
| 9,043,016 B2 | 5/2015 | Filippov et al. |
| 9,229,905 B1 | 1/2016 | Penilla et al. |
| 9,940,834 B1* | 4/2018 | Konrardy ............. G08G 1/161 |
| 9,944,282 B1* | 4/2018 | Fields ................ A61B 5/4064 |
| 9,972,054 B1* | 5/2018 | Konrardy .......... B60W 50/0205 |
| 10,019,904 B1* | 7/2018 | Chan ..................... G08G 1/205 |
| 10,065,637 B2* | 9/2018 | Arndt .................... B60W 10/20 |
| 10,134,278 B1* | 11/2018 | Konrardy .......... G08G 1/096791 |
| 10,163,162 B1* | 12/2018 | Devereaux ............ G06Q 10/20 |
| 10,169,771 B1* | 1/2019 | Devereaux ......... G06Q 30/0215 |
| 10,222,228 B1* | 3/2019 | Chan ................... G01C 21/3691 |
| 10,223,479 B1* | 3/2019 | Konrardy .......... G08G 1/096775 |
| 2001/0010516 A1 | 8/2001 | Roh et al. |
| 2001/0015888 A1 | 8/2001 | Shaler et al. |
| 2002/0009978 A1 | 1/2002 | Dukach et al. |
| 2002/0023010 A1 | 2/2002 | Rittmaster et al. |
| 2002/0026278 A1 | 2/2002 | Feldman et al. |
| 2002/0045484 A1 | 4/2002 | Eck et al. |
| 2002/0065046 A1 | 5/2002 | Mankins et al. |
| 2002/0077985 A1 | 6/2002 | Kobata et al. |
| 2002/0095249 A1 | 7/2002 | Lang |
| 2002/0097145 A1 | 7/2002 | Tumey et al. |
| 2002/0103622 A1 | 8/2002 | Burge |
| 2002/0105968 A1 | 8/2002 | Pruzan et al. |
| 2002/0126876 A1 | 9/2002 | Paul et al. |
| 2002/0128774 A1 | 9/2002 | Takezaki et al. |
| 2002/0143461 A1 | 10/2002 | Burns et al. |
| 2002/0143643 A1 | 10/2002 | Catan |
| 2002/0152010 A1 | 10/2002 | Colmenarez et al. |
| 2002/0154217 A1 | 10/2002 | Ikeda |
| 2002/0169551 A1 | 11/2002 | Inoue et al. |
| 2002/0174021 A1 | 11/2002 | Chu et al. |
| 2003/0004624 A1 | 1/2003 | Wilson et al. |
| 2003/0007227 A1 | 1/2003 | Ogino |
| 2003/0055557 A1 | 3/2003 | Dutta et al. |
| 2003/0060937 A1 | 3/2003 | Shinada et al. |
| 2003/0065432 A1 | 4/2003 | Shuman et al. |
| 2003/0101451 A1 | 5/2003 | Bentolila et al. |
| 2003/0109972 A1 | 6/2003 | Tak |
| 2003/0125846 A1 | 7/2003 | Yu et al. |
| 2003/0132666 A1 | 7/2003 | Bond et al. |
| 2003/0149530 A1 | 8/2003 | Stopczynski |
| 2003/0158638 A1 | 8/2003 | Yakes et al. |
| 2003/0182435 A1 | 9/2003 | Redlich et al. |
| 2003/0202683 A1 | 10/2003 | Ma et al. |
| 2003/0204290 A1 | 10/2003 | Sadler et al. |
| 2003/0230443 A1 | 12/2003 | Cramer et al. |
| 2004/0017292 A1 | 1/2004 | Reese et al. |
| 2004/0022416 A1* | 2/2004 | Lemelson ............. G01S 13/931 382/104 |
| 2004/0024502 A1 | 2/2004 | Squires et al. |
| 2004/0036622 A1 | 2/2004 | Dukach et al. |
| 2004/0039500 A1 | 2/2004 | Amendola et al. |
| 2004/0039504 A1 | 2/2004 | Coffee et al. |
| 2004/0068364 A1 | 4/2004 | Zhao et al. |
| 2004/0070920 A1 | 4/2004 | Flueli |
| 2004/0093155 A1 | 5/2004 | Simonds et al. |
| 2004/0117494 A1 | 6/2004 | Mitchell et al. |
| 2004/0128062 A1 | 7/2004 | Ogino et al. |
| 2004/0153356 A1 | 8/2004 | Lockwood et al. |
| 2004/0162019 A1 | 8/2004 | Horita et al. |
| 2004/0180653 A1 | 9/2004 | Royalty |
| 2004/0182574 A1 | 9/2004 | Adnan et al. |
| 2004/0193347 A1 | 9/2004 | Harumoto et al. |
| 2004/0203974 A1 | 10/2004 | Seibel |
| 2004/0204837 A1 | 10/2004 | Singleton |
| 2004/0209594 A1 | 10/2004 | Naboulsi |
| 2004/0217850 A1 | 11/2004 | Perttunen et al. |
| 2004/0225557 A1 | 11/2004 | Phelan et al. |

(56) References Cited

U.S. PATENT DOCUMENTS

| | | |
|---|---|---|
| 2004/0255123 A1 | 12/2004 | Noyama et al. |
| 2004/0257208 A1 | 12/2004 | Huang et al. |
| 2004/0260470 A1 | 12/2004 | Rast |
| 2005/0012599 A1 | 1/2005 | DeMatteo |
| 2005/0031100 A1 | 2/2005 | Iggulden et al. |
| 2005/0038598 A1 | 2/2005 | Oesterling et al. |
| 2005/0042999 A1 | 2/2005 | Rappaport |
| 2005/0065678 A1 | 3/2005 | Smith et al. |
| 2005/0065711 A1 | 3/2005 | Dahlgren et al. |
| 2005/0086051 A1 | 4/2005 | Brulle-Drews |
| 2005/0093717 A1 | 5/2005 | Lilja |
| 2005/0097541 A1 | 5/2005 | Holland |
| 2005/0114864 A1 | 5/2005 | Surace |
| 2005/0122235 A1 | 6/2005 | Teffer et al. |
| 2005/0124211 A1 | 6/2005 | Diessner et al. |
| 2005/0130744 A1 | 6/2005 | Eck et al. |
| 2005/0144156 A1 | 6/2005 | Barber |
| 2005/0149752 A1 | 7/2005 | Johnson et al. |
| 2005/0153760 A1 | 7/2005 | Varley |
| 2005/0159853 A1 | 7/2005 | Takahashi et al. |
| 2005/0159892 A1 | 7/2005 | Chung |
| 2005/0192727 A1 | 9/2005 | Shostak et al. |
| 2005/0197748 A1 | 9/2005 | Holst et al. |
| 2005/0197767 A1 | 9/2005 | Nortrup |
| 2005/0251324 A1 | 11/2005 | Wiener et al. |
| 2005/0261815 A1 | 11/2005 | Cowelchuk et al. |
| 2005/0278093 A1 | 12/2005 | Kameyama |
| 2005/0283284 A1 | 12/2005 | Grenier et al. |
| 2006/0015819 A1 | 1/2006 | Hawkins et al. |
| 2006/0036358 A1 | 2/2006 | Hale et al. |
| 2006/0044119 A1 | 3/2006 | Egelhaaf |
| 2006/0047386 A1 | 3/2006 | Kanevsky et al. |
| 2006/0058948 A1 | 3/2006 | Blass et al. |
| 2006/0059229 A1 | 3/2006 | Bain et al. |
| 2006/0125631 A1 | 6/2006 | Sharony |
| 2006/0130033 A1 | 6/2006 | Stoffels et al. |
| 2006/0142933 A1 | 6/2006 | Feng |
| 2006/0173841 A1 | 8/2006 | Bill |
| 2006/0175403 A1 | 8/2006 | McConnell et al. |
| 2006/0184319 A1 | 8/2006 | Seick et al. |
| 2006/0212909 A1 | 9/2006 | Girard et al. |
| 2006/0241836 A1 | 10/2006 | Kachouh et al. |
| 2006/0243056 A1 | 11/2006 | Sundermeyer et al. |
| 2006/0250272 A1 | 11/2006 | Puamau |
| 2006/0253307 A1 | 11/2006 | Warren et al. |
| 2006/0259210 A1 | 11/2006 | Tanaka et al. |
| 2006/0274829 A1 | 12/2006 | Siemens et al. |
| 2006/0282204 A1 | 12/2006 | Breed |
| 2006/0287807 A1 | 12/2006 | Teffer |
| 2006/0287865 A1 | 12/2006 | Cross et al. |
| 2006/0288382 A1 | 12/2006 | Vitito |
| 2006/0290516 A1 | 12/2006 | Muehlsteff et al. |
| 2007/0001831 A1 | 1/2007 | Raz et al. |
| 2007/0002032 A1 | 1/2007 | Powers et al. |
| 2007/0010942 A1 | 1/2007 | Bill |
| 2007/0015485 A1 | 1/2007 | DeBiasio et al. |
| 2007/0028370 A1 | 2/2007 | Seng |
| 2007/0032225 A1 | 2/2007 | Konicek et al. |
| 2007/0057781 A1 | 3/2007 | Breed |
| 2007/0061057 A1 | 3/2007 | Huang et al. |
| 2007/0067614 A1 | 3/2007 | Berry et al. |
| 2007/0069880 A1 | 3/2007 | Best et al. |
| 2007/0083298 A1 | 4/2007 | Pierce et al. |
| 2007/0088488 A1 | 4/2007 | Reeves et al. |
| 2007/0103328 A1 | 5/2007 | Lakshmanan et al. |
| 2007/0115101 A1 | 5/2007 | Creekbaum et al. |
| 2007/0118301 A1 | 5/2007 | Andarawis et al. |
| 2007/0120697 A1 | 5/2007 | Ayoub et al. |
| 2007/0135995 A1 | 6/2007 | Kikuchi et al. |
| 2007/0156317 A1 | 7/2007 | Breed |
| 2007/0182625 A1 | 8/2007 | Kerai et al. |
| 2007/0182816 A1 | 8/2007 | Fox |
| 2007/0185969 A1 | 8/2007 | Davis |
| 2007/0192486 A1 | 8/2007 | Wilson et al. |
| 2007/0194902 A1 | 8/2007 | Blanco et al. |
| 2007/0194944 A1 | 8/2007 | Galera et al. |
| 2007/0195997 A1 | 8/2007 | Paul et al. |
| 2007/0200663 A1 | 8/2007 | White et al. |
| 2007/0208860 A1 | 9/2007 | Zellner et al. |
| 2007/0213090 A1 | 9/2007 | Holmberg |
| 2007/0228826 A1 | 10/2007 | Jordan et al. |
| 2007/0233341 A1 | 10/2007 | Logsdon |
| 2007/0250228 A1 | 10/2007 | Reddy et al. |
| 2007/0257815 A1 | 11/2007 | Gunderson et al. |
| 2007/0276596 A1 | 11/2007 | Solomon et al. |
| 2007/0280505 A1 | 12/2007 | Breed |
| 2008/0005974 A1 | 1/2008 | Delgado Vazquez et al. |
| 2008/0023253 A1 | 1/2008 | Prost-Fin et al. |
| 2008/0027337 A1 | 1/2008 | Dugan et al. |
| 2008/0033635 A1 | 2/2008 | Obradovich et al. |
| 2008/0042824 A1 | 2/2008 | Kates |
| 2008/0051957 A1 | 2/2008 | Breed et al. |
| 2008/0052627 A1 | 2/2008 | Oguchi |
| 2008/0071465 A1 | 3/2008 | Chapman et al. |
| 2008/0082237 A1 | 4/2008 | Breed |
| 2008/0086455 A1 | 4/2008 | Meisels et al. |
| 2008/0090522 A1 | 4/2008 | Oyama |
| 2008/0104227 A1 | 5/2008 | Birnie et al. |
| 2008/0119994 A1 | 5/2008 | Kameyama |
| 2008/0129475 A1 | 6/2008 | Breed et al. |
| 2008/0143085 A1 | 6/2008 | Breed et al. |
| 2008/0147280 A1 | 6/2008 | Breed |
| 2008/0148374 A1 | 6/2008 | Spaur et al. |
| 2008/0154712 A1 | 6/2008 | Wellman |
| 2008/0154957 A1 | 6/2008 | Taylor et al. |
| 2008/0161986 A1 | 7/2008 | Breed |
| 2008/0164985 A1 | 7/2008 | Iketani et al. |
| 2008/0169940 A1 | 7/2008 | Lee et al. |
| 2008/0174451 A1 | 7/2008 | Harrington et al. |
| 2008/0212215 A1 | 9/2008 | Schofield et al. |
| 2008/0216067 A1 | 9/2008 | Villing |
| 2008/0228358 A1 | 9/2008 | Wang et al. |
| 2008/0234919 A1 | 9/2008 | Ritter et al. |
| 2008/0252487 A1 | 10/2008 | McClellan et al. |
| 2008/0253613 A1 | 10/2008 | Jones et al. |
| 2008/0255721 A1 | 10/2008 | Yamada |
| 2008/0255722 A1 | 10/2008 | McClellan et al. |
| 2008/0269958 A1 | 10/2008 | Filev et al. |
| 2008/0281508 A1 | 11/2008 | Fu |
| 2008/0300778 A1 | 12/2008 | Kuznetsov |
| 2008/0305780 A1 | 12/2008 | Williams et al. |
| 2008/0319602 A1 | 12/2008 | McClellan et al. |
| 2009/0006525 A1 | 1/2009 | Moore |
| 2009/0024419 A1 | 1/2009 | McClellan et al. |
| 2009/0037719 A1 | 2/2009 | Sakthikumar et al. |
| 2009/0040026 A1 | 2/2009 | Tanaka |
| 2009/0055178 A1 | 2/2009 | Coon |
| 2009/0082951 A1 | 3/2009 | Graessley |
| 2009/0099720 A1 | 4/2009 | Elgali |
| 2009/0112393 A1 | 4/2009 | Maten et al. |
| 2009/0112452 A1 | 4/2009 | Buck et al. |
| 2009/0119657 A1 | 5/2009 | Link, II |
| 2009/0125174 A1 | 5/2009 | Delean |
| 2009/0132294 A1 | 5/2009 | Haines |
| 2009/0138336 A1 | 5/2009 | Ashley et al. |
| 2009/0144622 A1 | 6/2009 | Evans et al. |
| 2009/0157312 A1 | 6/2009 | Black et al. |
| 2009/0158200 A1 | 6/2009 | Palahnuk et al. |
| 2009/0180668 A1 | 7/2009 | Jones et al. |
| 2009/0189373 A1 | 7/2009 | Schramm et al. |
| 2009/0189979 A1 | 7/2009 | Smyth |
| 2009/0195370 A1 | 8/2009 | Huffman et al. |
| 2009/0210257 A1 | 8/2009 | Chalfant et al. |
| 2009/0216935 A1 | 8/2009 | Flick |
| 2009/0222200 A1 | 9/2009 | Link et al. |
| 2009/0224931 A1 | 9/2009 | Dietz et al. |
| 2009/0224942 A1 | 9/2009 | Goudy et al. |
| 2009/0234578 A1 | 9/2009 | Newby et al. |
| 2009/0241883 A1 | 10/2009 | Nagoshi et al. |
| 2009/0254446 A1 | 10/2009 | Chernyak |
| 2009/0264849 A1 | 10/2009 | La Croix |
| 2009/0275321 A1 | 11/2009 | Crowe |
| 2009/0278750 A1 | 11/2009 | Man et al. |
| 2009/0278915 A1 | 11/2009 | Kramer et al. |

(56) References Cited

U.S. PATENT DOCUMENTS

| | | |
|---|---|---|
| 2009/0279839 A1 | 11/2009 | Nakamura et al. |
| 2009/0284359 A1 | 11/2009 | Huang et al. |
| 2009/0287405 A1 | 11/2009 | Liu et al. |
| 2009/0299572 A1 | 12/2009 | Fujikawa et al. |
| 2009/0312998 A1 | 12/2009 | Berckmans et al. |
| 2009/0319181 A1 | 12/2009 | Khosravy et al. |
| 2010/0008053 A1 | 1/2010 | Osternack et al. |
| 2010/0023204 A1 | 1/2010 | Basir et al. |
| 2010/0035620 A1 | 2/2010 | Naden et al. |
| 2010/0036560 A1 | 2/2010 | Wright et al. |
| 2010/0042498 A1 | 2/2010 | Schalk |
| 2010/0052945 A1 | 3/2010 | Breed |
| 2010/0057337 A1 | 3/2010 | Fuchs |
| 2010/0066498 A1 | 3/2010 | Fenton |
| 2010/0069115 A1 | 3/2010 | Liu |
| 2010/0070338 A1 | 3/2010 | Siotia et al. |
| 2010/0077094 A1 | 3/2010 | Howarter et al. |
| 2010/0087987 A1 | 4/2010 | Huang et al. |
| 2010/0090817 A1 | 4/2010 | Yamaguchi et al. |
| 2010/0097178 A1 | 4/2010 | Pisz et al. |
| 2010/0097239 A1 | 4/2010 | Campbell et al. |
| 2010/0097458 A1 | 4/2010 | Zhang et al. |
| 2010/0106344 A1 | 4/2010 | Edwards et al. |
| 2010/0106418 A1 | 4/2010 | Kindo et al. |
| 2010/0118025 A1 | 5/2010 | Smith et al. |
| 2010/0121570 A1 | 5/2010 | Tokue et al. |
| 2010/0121645 A1 | 5/2010 | Seitz et al. |
| 2010/0125387 A1 | 5/2010 | Sehyun et al. |
| 2010/0125405 A1 | 5/2010 | Chae et al. |
| 2010/0125811 A1 | 5/2010 | Moore et al. |
| 2010/0127847 A1 | 5/2010 | Evans et al. |
| 2010/0131300 A1 | 5/2010 | Collopy et al. |
| 2010/0134958 A1 | 6/2010 | Disaverio et al. |
| 2010/0136944 A1 | 6/2010 | Taylor et al. |
| 2010/0137037 A1 | 6/2010 | Basir |
| 2010/0144284 A1 | 6/2010 | Chutorash et al. |
| 2010/0145700 A1 | 6/2010 | Kennewick et al. |
| 2010/0145987 A1 | 6/2010 | Harper et al. |
| 2010/0152976 A1 | 6/2010 | White et al. |
| 2010/0169432 A1 | 7/2010 | Santori et al. |
| 2010/0174474 A1 | 7/2010 | Nagase |
| 2010/0179712 A1 | 7/2010 | Pepitone et al. |
| 2010/0185341 A1 | 7/2010 | Wilson et al. |
| 2010/0188831 A1 | 7/2010 | Ortel |
| 2010/0197359 A1 | 8/2010 | Harris |
| 2010/0202346 A1 | 8/2010 | Sitzes et al. |
| 2010/0211259 A1 | 8/2010 | McClellan |
| 2010/0211282 A1 | 8/2010 | Nakata et al. |
| 2010/0211300 A1 | 8/2010 | Jaffe et al. |
| 2010/0211304 A1 | 8/2010 | Hwang et al. |
| 2010/0211441 A1 | 8/2010 | Sprigg et al. |
| 2010/0217458 A1 | 8/2010 | Schweiger et al. |
| 2010/0222939 A1 | 9/2010 | Namburu et al. |
| 2010/0228404 A1 | 9/2010 | Link et al. |
| 2010/0234071 A1 | 9/2010 | Shabtay et al. |
| 2010/0235042 A1 | 9/2010 | Ying |
| 2010/0235744 A1 | 9/2010 | Schultz |
| 2010/0235891 A1 | 9/2010 | Oglesbee et al. |
| 2010/0250071 A1 | 9/2010 | Pala et al. |
| 2010/0253493 A1 | 10/2010 | Szczerba et al. |
| 2010/0256836 A1 | 10/2010 | Mudalige |
| 2010/0265104 A1 | 10/2010 | Zlojutro |
| 2010/0268426 A1 | 10/2010 | Pathak et al. |
| 2010/0274410 A1 | 10/2010 | Tsien et al. |
| 2010/0280751 A1 | 11/2010 | Breed |
| 2010/0287303 A1 | 11/2010 | Smith et al. |
| 2010/0289632 A1 | 11/2010 | Seder et al. |
| 2010/0289643 A1 | 11/2010 | Trundle et al. |
| 2010/0291427 A1 | 11/2010 | Zhou |
| 2010/0295676 A1 | 11/2010 | Khachaturov et al. |
| 2010/0304640 A1 | 12/2010 | Sofman et al. |
| 2010/0305807 A1 | 12/2010 | Basir et al. |
| 2010/0306080 A1 | 12/2010 | Trandal et al. |
| 2010/0306309 A1 | 12/2010 | Santori et al. |
| 2010/0306435 A1 | 12/2010 | Nigoghosian et al. |
| 2010/0315218 A1 | 12/2010 | Cades et al. |
| 2010/0321151 A1 | 12/2010 | Matsuura et al. |
| 2010/0325626 A1 | 12/2010 | Greschler et al. |
| 2010/0332130 A1 | 12/2010 | Shimizu et al. |
| 2011/0015853 A1 | 1/2011 | DeKock et al. |
| 2011/0018736 A1 | 1/2011 | Carr |
| 2011/0021213 A1 | 1/2011 | Carr |
| 2011/0021234 A1 | 1/2011 | Tibbits et al. |
| 2011/0028138 A1 | 2/2011 | Davies-Moore et al. |
| 2011/0035098 A1 | 2/2011 | Goto et al. |
| 2011/0035141 A1 | 2/2011 | Barker et al. |
| 2011/0040438 A1 | 2/2011 | Kluge et al. |
| 2011/0050589 A1 | 3/2011 | Yan et al. |
| 2011/0053506 A1 | 3/2011 | Lemke et al. |
| 2011/0077808 A1 | 3/2011 | Hyde et al. |
| 2011/0078024 A1 | 3/2011 | Messier et al. |
| 2011/0080282 A1 | 4/2011 | Kleve et al. |
| 2011/0082615 A1 | 4/2011 | Small et al. |
| 2011/0084824 A1 | 4/2011 | Tewari et al. |
| 2011/0090078 A1 | 4/2011 | Kim et al. |
| 2011/0092159 A1 | 4/2011 | Park et al. |
| 2011/0093154 A1 | 4/2011 | Moinzadeh et al. |
| 2011/0093158 A1 | 4/2011 | Theisen et al. |
| 2011/0093438 A1 | 4/2011 | Poulsen |
| 2011/0093846 A1 | 4/2011 | Moinzadeh et al. |
| 2011/0105097 A1 | 5/2011 | Tadayon et al. |
| 2011/0106375 A1 | 5/2011 | Sundaram et al. |
| 2011/0112717 A1 | 5/2011 | Resner |
| 2011/0112969 A1 | 5/2011 | Zaid et al. |
| 2011/0117933 A1 | 5/2011 | Andersson |
| 2011/0119344 A1 | 5/2011 | Eustis |
| 2011/0130915 A1 | 6/2011 | Wright et al. |
| 2011/0134749 A1 | 6/2011 | Speks et al. |
| 2011/0137520 A1 | 6/2011 | Rector et al. |
| 2011/0145331 A1 | 6/2011 | Christie et al. |
| 2011/0172873 A1 | 7/2011 | Szwabowski et al. |
| 2011/0175754 A1 | 7/2011 | Karpinsky |
| 2011/0183658 A1 | 7/2011 | Zellner |
| 2011/0187520 A1 | 8/2011 | Filev et al. |
| 2011/0193707 A1 | 8/2011 | Ngo |
| 2011/0193726 A1 | 8/2011 | Szwabowski et al. |
| 2011/0195699 A1 | 8/2011 | Tadayon et al. |
| 2011/0197187 A1 | 8/2011 | Roh |
| 2011/0205047 A1 | 8/2011 | Patel et al. |
| 2011/0209079 A1 | 8/2011 | Tarte et al. |
| 2011/0210867 A1 | 9/2011 | Benedikt |
| 2011/0212717 A1 | 9/2011 | Rhoads et al. |
| 2011/0221656 A1 | 9/2011 | Haddick et al. |
| 2011/0224865 A1 | 9/2011 | Gordon et al. |
| 2011/0224898 A1 | 9/2011 | Scofield et al. |
| 2011/0225527 A1 | 9/2011 | Law et al. |
| 2011/0227757 A1 | 9/2011 | Chen et al. |
| 2011/0231091 A1 | 9/2011 | Gourlay et al. |
| 2011/0234369 A1 | 9/2011 | Cai et al. |
| 2011/0245999 A1 | 10/2011 | Kordonowy |
| 2011/0246210 A1 | 10/2011 | Matsur |
| 2011/0247013 A1 | 10/2011 | Feller et al. |
| 2011/0251734 A1 | 10/2011 | Schepp et al. |
| 2011/0257973 A1 | 10/2011 | Chutorash et al. |
| 2011/0267204 A1 | 11/2011 | Chuang et al. |
| 2011/0267205 A1 | 11/2011 | McClellan et al. |
| 2011/0286676 A1 | 11/2011 | El Dokor |
| 2011/0291886 A1 | 12/2011 | Krieter |
| 2011/0291926 A1 | 12/2011 | Gokturk et al. |
| 2011/0298808 A1 | 12/2011 | Rovik |
| 2011/0301844 A1 | 12/2011 | Aono |
| 2011/0307354 A1 | 12/2011 | Erman et al. |
| 2011/0307570 A1 | 12/2011 | Speks |
| 2011/0309926 A1 | 12/2011 | Eikelenberg et al. |
| 2011/0309953 A1 | 12/2011 | Petite et al. |
| 2011/0313653 A1 | 12/2011 | Lindner |
| 2011/0320089 A1 | 12/2011 | Lewis |
| 2012/0006610 A1 | 1/2012 | Wallace et al. |
| 2012/0010807 A1 | 1/2012 | Zhou |
| 2012/0016581 A1 | 1/2012 | Mochizuki et al. |
| 2012/0029852 A1 | 2/2012 | Goff et al. |
| 2012/0030002 A1 | 2/2012 | Bous et al. |
| 2012/0030512 A1 | 2/2012 | Wadhwa et al. |
| 2012/0038489 A1 | 2/2012 | Goldshmidt |

(56) References Cited

U.S. PATENT DOCUMENTS

| | | |
|---|---|---|
| 2012/0046822 A1 | 2/2012 | Anderson |
| 2012/0047530 A1 | 2/2012 | Shkedi |
| 2012/0053793 A1 | 3/2012 | Sala et al. |
| 2012/0053888 A1 | 3/2012 | Stahlin et al. |
| 2012/0059789 A1 | 3/2012 | Sakai et al. |
| 2012/0065815 A1 | 3/2012 | Hess |
| 2012/0065834 A1 | 3/2012 | Senart |
| 2012/0068956 A1 | 3/2012 | Jira et al. |
| 2012/0071097 A1 | 3/2012 | Matsushita et al. |
| 2012/0072244 A1 | 3/2012 | Collins et al. |
| 2012/0074770 A1 | 3/2012 | Lee |
| 2012/0083960 A1 | 4/2012 | Zhu et al. |
| 2012/0083971 A1 | 4/2012 | Preston |
| 2012/0084773 A1 | 4/2012 | Lee et al. |
| 2012/0089299 A1 | 4/2012 | Breed |
| 2012/0092251 A1 | 4/2012 | Hashimoto et al. |
| 2012/0101876 A1 | 4/2012 | Truvey et al. |
| 2012/0101914 A1 | 4/2012 | Kumar et al. |
| 2012/0105613 A1 | 5/2012 | Weng et al. |
| 2012/0106114 A1 | 5/2012 | Caron et al. |
| 2012/0109446 A1 | 5/2012 | Yousefi et al. |
| 2012/0109451 A1 | 5/2012 | Tan |
| 2012/0110356 A1 | 5/2012 | Yousefi et al. |
| 2012/0113822 A1 | 5/2012 | Letner |
| 2012/0115446 A1 | 5/2012 | Guatama et al. |
| 2012/0116609 A1 | 5/2012 | Jung et al. |
| 2012/0116678 A1 | 5/2012 | Witmer |
| 2012/0116696 A1 | 5/2012 | Wank |
| 2012/0146766 A1 | 6/2012 | Geisler et al. |
| 2012/0146809 A1 | 6/2012 | Oh et al. |
| 2012/0149341 A1 | 6/2012 | Tadayon et al. |
| 2012/0150651 A1 | 6/2012 | Hoffberg et al. |
| 2012/0155636 A1 | 6/2012 | Muthaiah |
| 2012/0158436 A1 | 6/2012 | Bauer et al. |
| 2012/0173900 A1 | 7/2012 | Diab et al. |
| 2012/0173905 A1 | 7/2012 | Diab et al. |
| 2012/0179325 A1 | 7/2012 | Faenger |
| 2012/0179547 A1 | 7/2012 | Besore et al. |
| 2012/0188876 A1 | 7/2012 | Chow et al. |
| 2012/0197523 A1 | 8/2012 | Kirsch |
| 2012/0197669 A1 | 8/2012 | Kote et al. |
| 2012/0204166 A1 | 8/2012 | Ichihara |
| 2012/0210160 A1 | 8/2012 | Fuhrman |
| 2012/0215375 A1 | 8/2012 | Chang |
| 2012/0217928 A1 | 8/2012 | Kulidjian |
| 2012/0218125 A1 | 8/2012 | Demirdjian et al. |
| 2012/0226413 A1 | 9/2012 | Chen et al. |
| 2012/0238286 A1 | 9/2012 | Mallavarapu et al. |
| 2012/0239242 A1 | 9/2012 | Uehara |
| 2012/0242510 A1 | 9/2012 | Choi et al. |
| 2012/0254763 A1 | 10/2012 | Protopapas et al. |
| 2012/0254804 A1 | 10/2012 | Shema et al. |
| 2012/0259951 A1 | 10/2012 | Schalk et al. |
| 2012/0265359 A1 | 10/2012 | Das |
| 2012/0274459 A1 | 11/2012 | Jaisimha et al. |
| 2012/0274481 A1 | 11/2012 | Ginsberg et al. |
| 2012/0284292 A1 | 11/2012 | Rechsteiner et al. |
| 2012/0289217 A1 | 11/2012 | Reimer et al. |
| 2012/0289253 A1 | 11/2012 | Haag et al. |
| 2012/0296567 A1 | 11/2012 | Breed |
| 2012/0313771 A1 | 12/2012 | Wottlifff, III |
| 2012/0316720 A1 | 12/2012 | Hyde et al. |
| 2012/0317561 A1 | 12/2012 | Aslam et al. |
| 2012/0323413 A1 | 12/2012 | Kedar-Dongarkar et al. |
| 2012/0327231 A1 | 12/2012 | Cochran et al. |
| 2013/0005263 A1 | 1/2013 | Sakata |
| 2013/0005414 A1 | 1/2013 | Bindra et al. |
| 2013/0013157 A1 | 1/2013 | Kim et al. |
| 2013/0019252 A1 | 1/2013 | Haase et al. |
| 2013/0024060 A1 | 1/2013 | Sukkarie et al. |
| 2013/0030645 A1 | 1/2013 | Divine et al. |
| 2013/0030811 A1 | 1/2013 | Olleon et al. |
| 2013/0031540 A1 | 1/2013 | Throop et al. |
| 2013/0031541 A1 | 1/2013 | Wilks et al. |
| 2013/0035063 A1 | 2/2013 | Fisk et al. |
| 2013/0046624 A1 | 2/2013 | Caiman |
| 2013/0050069 A1 | 2/2013 | Ota |
| 2013/0055096 A1 | 2/2013 | Kim et al. |
| 2013/0059607 A1 | 3/2013 | Herz et al. |
| 2013/0063336 A1 | 3/2013 | Sugimoto et al. |
| 2013/0066512 A1 | 3/2013 | Willard et al. |
| 2013/0067599 A1 | 3/2013 | Raje et al. |
| 2013/0075530 A1 | 3/2013 | Shander et al. |
| 2013/0079964 A1 | 3/2013 | Sukkarie et al. |
| 2013/0083805 A1 | 4/2013 | Lu et al. |
| 2013/0085787 A1 | 4/2013 | Gore et al. |
| 2013/0086164 A1 | 4/2013 | Wheeler et al. |
| 2013/0099915 A1 | 4/2013 | Prasad et al. |
| 2013/0103196 A1 | 4/2013 | Monceaux et al. |
| 2013/0116882 A1 | 5/2013 | Link et al. |
| 2013/0116915 A1 | 5/2013 | Ferreira et al. |
| 2013/0134730 A1 | 5/2013 | Ricci |
| 2013/0135118 A1 | 5/2013 | Ricci |
| 2013/0138591 A1 | 5/2013 | Ricci |
| 2013/0138714 A1 | 5/2013 | Ricci |
| 2013/0139140 A1 | 5/2013 | Rao et al. |
| 2013/0141247 A1 | 6/2013 | Ricci |
| 2013/0141252 A1 | 6/2013 | Ricci |
| 2013/0143495 A1 | 6/2013 | Ricci |
| 2013/0143546 A1 | 6/2013 | Ricci |
| 2013/0143601 A1 | 6/2013 | Ricci |
| 2013/0144459 A1 | 6/2013 | Ricci |
| 2013/0144460 A1 | 6/2013 | Ricci |
| 2013/0144461 A1 | 6/2013 | Ricci |
| 2013/0144462 A1 | 6/2013 | Ricci |
| 2013/0144463 A1 | 6/2013 | Ricci et al. |
| 2013/0144469 A1 | 6/2013 | Ricci |
| 2013/0144470 A1 | 6/2013 | Ricci |
| 2013/0144474 A1 | 6/2013 | Ricci |
| 2013/0144486 A1 | 6/2013 | Ricci |
| 2013/0144520 A1 | 6/2013 | Ricci |
| 2013/0144657 A1 | 6/2013 | Ricci |
| 2013/0145065 A1 | 6/2013 | Ricci |
| 2013/0145279 A1 | 6/2013 | Ricci |
| 2013/0145297 A1 | 6/2013 | Ricci et al. |
| 2013/0145360 A1 | 6/2013 | Ricci |
| 2013/0145401 A1 | 6/2013 | Ricci |
| 2013/0145482 A1 | 6/2013 | Ricci et al. |
| 2013/0147638 A1 | 6/2013 | Ricci |
| 2013/0151031 A1 | 6/2013 | Ricci |
| 2013/0151065 A1 | 6/2013 | Ricci |
| 2013/0151088 A1 | 6/2013 | Ricci |
| 2013/0151288 A1 | 6/2013 | Bowne et al. |
| 2013/0152003 A1 | 6/2013 | Ricci et al. |
| 2013/0154298 A1 | 6/2013 | Ricci |
| 2013/0157640 A1 | 6/2013 | Aycock |
| 2013/0157647 A1 | 6/2013 | Kolodziej |
| 2013/0158778 A1 | 6/2013 | Tengler et al. |
| 2013/0158821 A1 | 6/2013 | Ricci |
| 2013/0166096 A1 | 6/2013 | Jotanovic |
| 2013/0166097 A1 | 6/2013 | Ricci |
| 2013/0166098 A1 | 6/2013 | Lavie et al. |
| 2013/0166152 A1 | 6/2013 | Butterworth |
| 2013/0166208 A1 | 6/2013 | Forstall et al. |
| 2013/0167159 A1 | 6/2013 | Ricci et al. |
| 2013/0173531 A1 | 7/2013 | Rinearson et al. |
| 2013/0179689 A1 | 7/2013 | Matsumoto et al. |
| 2013/0190978 A1 | 7/2013 | Kato et al. |
| 2013/0194108 A1 | 8/2013 | Lapiotis et al. |
| 2013/0197796 A1 | 8/2013 | Obradovich et al. |
| 2013/0198031 A1 | 8/2013 | Mitchell et al. |
| 2013/0198737 A1 | 8/2013 | Ricci |
| 2013/0198802 A1 | 8/2013 | Ricci |
| 2013/0200991 A1 | 8/2013 | Ricci et al. |
| 2013/0203400 A1 | 8/2013 | Ricci |
| 2013/0204455 A1 | 8/2013 | Chia et al. |
| 2013/0204457 A1 | 8/2013 | King |
| 2013/0204466 A1 | 8/2013 | Ricci |
| 2013/0204484 A1 | 8/2013 | Ricci |
| 2013/0204493 A1 | 8/2013 | Ricci et al. |
| 2013/0204943 A1 | 8/2013 | Ricci |
| 2013/0205026 A1 | 8/2013 | Ricci |
| 2013/0205412 A1 | 8/2013 | Ricci |
| 2013/0207794 A1 | 8/2013 | Patel et al. |

(56) References Cited

U.S. PATENT DOCUMENTS

| | | |
|---|---|---|
| 2013/0212065 A1 | 8/2013 | Rahnama |
| 2013/0212659 A1 | 8/2013 | Maher et al. |
| 2013/0215116 A1 | 8/2013 | Siddique et al. |
| 2013/0218412 A1 | 8/2013 | Ricci |
| 2013/0218445 A1 | 8/2013 | Basir |
| 2013/0219039 A1 | 8/2013 | Ricci |
| 2013/0226365 A1 | 8/2013 | Brozovich |
| 2013/0226371 A1 | 8/2013 | Rovik et al. |
| 2013/0226392 A1 | 8/2013 | Schneider et al. |
| 2013/0226449 A1 | 8/2013 | Rovik et al. |
| 2013/0226622 A1 | 8/2013 | Adamson et al. |
| 2013/0227648 A1 | 8/2013 | Ricci |
| 2013/0231784 A1 | 9/2013 | Rovik et al. |
| 2013/0231800 A1 | 9/2013 | Ricci |
| 2013/0232142 A1 | 9/2013 | Nielsen et al. |
| 2013/0238165 A1 | 9/2013 | Garrett et al. |
| 2013/0241720 A1 | 9/2013 | Ricci et al. |
| 2013/0245882 A1 | 9/2013 | Ricci |
| 2013/0250933 A1 | 9/2013 | Yousefi et al. |
| 2013/0261871 A1 | 10/2013 | Hobbs et al. |
| 2013/0261966 A1 | 10/2013 | Wang et al. |
| 2013/0265178 A1 | 10/2013 | Tengler et al. |
| 2013/0274997 A1 | 10/2013 | Chien |
| 2013/0279111 A1 | 10/2013 | Lee |
| 2013/0279491 A1 | 10/2013 | Rubin et al. |
| 2013/0282238 A1 | 10/2013 | Ricci et al. |
| 2013/0282357 A1 | 10/2013 | Rubin et al. |
| 2013/0282946 A1 | 10/2013 | Ricci |
| 2013/0288606 A1 | 10/2013 | Kirsch |
| 2013/0293364 A1 | 11/2013 | Ricci et al. |
| 2013/0293452 A1 | 11/2013 | Ricci et al. |
| 2013/0293480 A1 | 11/2013 | Kritt et al. |
| 2013/0295901 A1 | 11/2013 | Abramson et al. |
| 2013/0295908 A1 | 11/2013 | Zeinstra et al. |
| 2013/0295913 A1 | 11/2013 | Matthews et al. |
| 2013/0300554 A1 | 11/2013 | Braden |
| 2013/0301584 A1 | 11/2013 | Addepalli et al. |
| 2013/0304371 A1 | 11/2013 | Kitatani et al. |
| 2013/0308265 A1 | 11/2013 | Arnouse |
| 2013/0309977 A1 | 11/2013 | Heines et al. |
| 2013/0311038 A1 | 11/2013 | Kim et al. |
| 2013/0325453 A1 | 12/2013 | Levien et al. |
| 2013/0325568 A1 | 12/2013 | Mangalvedkar et al. |
| 2013/0329372 A1 | 12/2013 | Wilkins |
| 2013/0332023 A1 | 12/2013 | Bertosa et al. |
| 2013/0338914 A1 | 12/2013 | Weiss |
| 2013/0339027 A1 | 12/2013 | Dokor et al. |
| 2013/0345929 A1 | 12/2013 | Bowden et al. |
| 2014/0028542 A1 | 1/2014 | Lovitt et al. |
| 2014/0032014 A1 | 1/2014 | DeBiasio et al. |
| 2014/0054957 A1 | 2/2014 | Bellis |
| 2014/0058672 A1 | 2/2014 | Wansley et al. |
| 2014/0066014 A1 | 3/2014 | Nicholson et al. |
| 2014/0067201 A1 | 3/2014 | Visintainer et al. |
| 2014/0067564 A1 | 3/2014 | Yuan |
| 2014/0070917 A1 | 3/2014 | Protopapas |
| 2014/0081544 A1 | 3/2014 | Fry |
| 2014/0088798 A1 | 3/2014 | Himmelstein |
| 2014/0096068 A1 | 4/2014 | Dewan et al. |
| 2014/0097955 A1 | 4/2014 | Lovitt et al. |
| 2014/0109075 A1 | 4/2014 | Hoffman et al. |
| 2014/0109080 A1 | 4/2014 | Ricci |
| 2014/0120829 A1 | 5/2014 | Bhamidipati et al. |
| 2014/0121862 A1 | 5/2014 | Zarrella et al. |
| 2014/0125802 A1 | 5/2014 | Beckert et al. |
| 2014/0143839 A1 | 5/2014 | Ricci |
| 2014/0164611 A1 | 6/2014 | Molettiere et al. |
| 2014/0168062 A1 | 6/2014 | Katz et al. |
| 2014/0168436 A1 | 6/2014 | Pedicino |
| 2014/0169621 A1 | 6/2014 | Burr |
| 2014/0171752 A1 | 6/2014 | Park et al. |
| 2014/0172727 A1 | 6/2014 | Abhyanker et al. |
| 2014/0188533 A1 | 7/2014 | Davidson |
| 2014/0195272 A1 | 7/2014 | Sadiq et al. |
| 2014/0198216 A1 | 7/2014 | Zhai et al. |
| 2014/0200737 A1 | 7/2014 | Lortz et al. |
| 2014/0207328 A1 | 7/2014 | Wolf et al. |
| 2014/0220966 A1 | 8/2014 | Muetzel et al. |
| 2014/0222298 A1 | 8/2014 | Gurin |
| 2014/0223384 A1 | 8/2014 | Graumann |
| 2014/0240089 A1 | 8/2014 | Chang |
| 2014/0244078 A1 | 8/2014 | Downey et al. |
| 2014/0244111 A1 | 8/2014 | Gross et al. |
| 2014/0244156 A1 | 8/2014 | Magnusson et al. |
| 2014/0245277 A1 | 8/2014 | Petro et al. |
| 2014/0245278 A1 | 8/2014 | Zellen |
| 2014/0245284 A1 | 8/2014 | Alrabady et al. |
| 2014/0252091 A1 | 9/2014 | Morse et al. |
| 2014/0257627 A1 | 9/2014 | Hagan, Jr. |
| 2014/0267035 A1 | 9/2014 | Schalk et al. |
| 2014/0277936 A1 | 9/2014 | El Dokor et al. |
| 2014/0278070 A1 | 9/2014 | McGavran et al. |
| 2014/0278071 A1 | 9/2014 | San Filippo et al. |
| 2014/0281971 A1 | 9/2014 | Isbell, III et al. |
| 2014/0282161 A1 | 9/2014 | Cash |
| 2014/0282278 A1 | 9/2014 | Anderson et al. |
| 2014/0282470 A1 | 9/2014 | Buga et al. |
| 2014/0282931 A1 | 9/2014 | Protopapas |
| 2014/0292545 A1 | 10/2014 | Nemoto |
| 2014/0292665 A1 | 10/2014 | Lathrop et al. |
| 2014/0303899 A1 | 10/2014 | Fung |
| 2014/0306799 A1 | 10/2014 | Ricci |
| 2014/0306814 A1 | 10/2014 | Ricci |
| 2014/0306817 A1 | 10/2014 | Ricci |
| 2014/0306826 A1 | 10/2014 | Ricci |
| 2014/0306833 A1 | 10/2014 | Ricci |
| 2014/0306834 A1 | 10/2014 | Ricci |
| 2014/0306835 A1 | 10/2014 | Ricci |
| 2014/0307655 A1 | 10/2014 | Ricci |
| 2014/0307724 A1 | 10/2014 | Ricci |
| 2014/0308902 A1 | 10/2014 | Ricci |
| 2014/0309789 A1 | 10/2014 | Ricci |
| 2014/0309790 A1 | 10/2014 | Ricci |
| 2014/0309804 A1 | 10/2014 | Ricci |
| 2014/0309805 A1 | 10/2014 | Ricci |
| 2014/0309806 A1 | 10/2014 | Ricci |
| 2014/0309813 A1 | 10/2014 | Ricci |
| 2014/0309814 A1 | 10/2014 | Ricci et al. |
| 2014/0309815 A1 | 10/2014 | Ricci et al. |
| 2014/0309838 A1 | 10/2014 | Ricci |
| 2014/0309839 A1 | 10/2014 | Ricci et al. |
| 2014/0309847 A1 | 10/2014 | Ricci |
| 2014/0309849 A1 | 10/2014 | Ricci |
| 2014/0309852 A1 | 10/2014 | Ricci |
| 2014/0309853 A1 | 10/2014 | Ricci |
| 2014/0309862 A1 | 10/2014 | Ricci |
| 2014/0309863 A1 | 10/2014 | Ricci |
| 2014/0309864 A1 | 10/2014 | Ricci |
| 2014/0309865 A1 | 10/2014 | Ricci |
| 2014/0309866 A1 | 10/2014 | Ricci |
| 2014/0309867 A1 | 10/2014 | Ricci |
| 2014/0309868 A1 | 10/2014 | Ricci |
| 2014/0309869 A1 | 10/2014 | Ricci |
| 2014/0309870 A1 | 10/2014 | Ricci et al. |
| 2014/0309871 A1 | 10/2014 | Ricci |
| 2014/0309872 A1 | 10/2014 | Ricci |
| 2014/0309873 A1 | 10/2014 | Ricci |
| 2014/0309874 A1 | 10/2014 | Ricci |
| 2014/0309875 A1 | 10/2014 | Ricci |
| 2014/0309876 A1 | 10/2014 | Ricci |
| 2014/0309877 A1 | 10/2014 | Ricci |
| 2014/0309878 A1 | 10/2014 | Ricci |
| 2014/0309879 A1 | 10/2014 | Ricci |
| 2014/0309880 A1 | 10/2014 | Ricci |
| 2014/0309885 A1 | 10/2014 | Ricci |
| 2014/0309886 A1 | 10/2014 | Ricci |
| 2014/0309891 A1 | 10/2014 | Ricci |
| 2014/0309892 A1 | 10/2014 | Ricci |
| 2014/0309893 A1 | 10/2014 | Ricci |
| 2014/0309913 A1 | 10/2014 | Ricci et al. |
| 2014/0309919 A1 | 10/2014 | Ricci |
| 2014/0309920 A1 | 10/2014 | Ricci |
| 2014/0309921 A1 | 10/2014 | Ricci et al. |
| 2014/0309922 A1 | 10/2014 | Ricci |

(56) References Cited

U.S. PATENT DOCUMENTS

| | | |
|---|---|---|
| 2014/0309923 A1 | 10/2014 | Ricci |
| 2014/0309927 A1 | 10/2014 | Ricci |
| 2014/0309929 A1 | 10/2014 | Ricci |
| 2014/0309930 A1 | 10/2014 | Ricci |
| 2014/0309934 A1 | 10/2014 | Ricci |
| 2014/0309935 A1 | 10/2014 | Ricci |
| 2014/0309982 A1 | 10/2014 | Ricci |
| 2014/0310031 A1 | 10/2014 | Ricci |
| 2014/0310075 A1 | 10/2014 | Ricci |
| 2014/0310103 A1 | 10/2014 | Ricci |
| 2014/0310186 A1 | 10/2014 | Ricci |
| 2014/0310277 A1 | 10/2014 | Ricci |
| 2014/0310379 A1 | 10/2014 | Ricci et al. |
| 2014/0310594 A1 | 10/2014 | Ricci et al. |
| 2014/0310610 A1 | 10/2014 | Ricci |
| 2014/0310702 A1 | 10/2014 | Ricci et al. |
| 2014/0310739 A1 | 10/2014 | Ricci et al. |
| 2014/0310788 A1 | 10/2014 | Ricci |
| 2014/0322676 A1 | 10/2014 | Raman |
| 2014/0347207 A1 | 11/2014 | Zeng et al. |
| 2014/0347265 A1 | 11/2014 | Allen et al. |
| 2015/0007155 A1 | 1/2015 | Hoffman et al. |
| 2015/0012186 A1 | 1/2015 | Horseman |
| 2015/0032366 A1 | 1/2015 | Man et al. |
| 2015/0032670 A1 | 1/2015 | Brazell |
| 2015/0057839 A1 | 2/2015 | Chang et al. |
| 2015/0061895 A1 | 3/2015 | Ricci |
| 2015/0081133 A1 | 3/2015 | Schulz |
| 2015/0081167 A1 | 3/2015 | Pisz et al. |
| 2015/0088423 A1 | 3/2015 | Tuukkanen |
| 2015/0088515 A1 | 3/2015 | Beaumont et al. |
| 2015/0116200 A1 | 4/2015 | Kurosawa et al. |
| 2015/0158499 A1 | 6/2015 | Koravadi |
| 2015/0170287 A1* | 6/2015 | Tirone ............... G06Q 40/08 705/4 |
| 2015/0178034 A1 | 6/2015 | Penilla et al. |
| 2016/0008985 A1 | 1/2016 | Kim et al. |
| 2016/0070527 A1 | 3/2016 | Ricci |
| 2016/0086391 A1 | 3/2016 | Ricci |
| 2016/0269456 A1 | 9/2016 | Ricci |
| 2016/0269469 A1 | 9/2016 | Ricci |
| 2016/0358475 A1 | 12/2016 | Prokhorov |
| 2016/0358477 A1 | 12/2016 | Ansari |
| 2017/0129335 A1 | 5/2017 | Lu et al. |
| 2017/0136842 A1 | 5/2017 | Anderson et al. |
| 2017/0171375 A1 | 7/2017 | Kamata |
| 2017/0236210 A1* | 8/2017 | Kumar ............... G05D 1/0061 705/4 |
| 2017/0292848 A1* | 10/2017 | Nepomuceno ..... G01C 21/3492 |
| 2017/0305418 A1* | 10/2017 | Bae .................. B60W 30/08 |
| 2017/0352215 A1 | 12/2017 | Maiwand et al. |
| 2018/0075538 A1* | 3/2018 | Konrardy ............ G08B 25/08 |
| 2018/0127001 A1* | 5/2018 | Ricci .................. B60W 40/09 |
| 2018/0130347 A1* | 5/2018 | Ricci .................. G08G 1/0112 |
| 2018/0372504 A1* | 12/2018 | Singhal .............. G01C 21/3492 |
| 2019/0041228 A1* | 2/2019 | Singhal .............. G05D 1/0217 |
| 2019/0049256 A1* | 2/2019 | Camp ................ G01C 21/3453 |
| 2019/0049958 A1* | 2/2019 | Liu .................... G01S 17/89 |

FOREIGN PATENT DOCUMENTS

| | | |
|---|---|---|
| CN | 101303878 | 11/2008 |
| CN | 102467827 | 5/2012 |
| EP | 1223567 | 7/2002 |
| EP | 1484729 | 12/2004 |
| EP | 2192015 | 6/2010 |
| JP | 2004-284450 | 10/2004 |
| KR | 2006-0128484 | 12/2006 |
| WO | WO 2007/126204 | 11/2007 |
| WO | WO 2012/102879 | 8/2012 |
| WO | WO 2013/074866 | 5/2013 |
| WO | WO 2013/074867 | 5/2013 |
| WO | WO 2013/074868 | 5/2013 |
| WO | WO 2013/074897 | 5/2013 |
| WO | WO 2013/074899 | 5/2013 |
| WO | WO 2013/074901 | 5/2013 |
| WO | WO 2013/074919 | 5/2013 |
| WO | WO 2013/074981 | 5/2013 |
| WO | WO 2013/074983 | 5/2013 |
| WO | WO 2013/075005 | 5/2013 |
| WO | WO 2013/181310 | 12/2013 |
| WO | WO 2014/014862 | 1/2014 |
| WO | WO 2014/143563 | 9/2014 |
| WO | WO 2014/158667 | 10/2014 |
| WO | WO 2014/158672 | 10/2014 |
| WO | WO 2014/158766 | 10/2014 |
| WO | WO 2014/172312 | 10/2014 |
| WO | WO 2014/172313 | 10/2014 |
| WO | WO 2014/172316 | 10/2014 |
| WO | WO 2014/172320 | 10/2014 |
| WO | WO 2014/172322 | 10/2014 |
| WO | WO 2014/172323 | 10/2014 |
| WO | WO 2014/172327 | 10/2014 |
| WO | WO 2016/145073 | 9/2016 |
| WO | WO 2016/145100 | 9/2016 |

OTHER PUBLICATIONS

Supp Notice of Allowance for U.S. Appl. No. 15/393,137, dated May 29, 2018, 2 pages.
Final Action for U.S. Appl. No. 15/394,489, dated Mar. 1, 2018, 6 pages.
Notice of Allowance for U.S. Appl. No. 15/394,489, dated May 17, 2018, 5 pages.
U.S. Appl. No. 61/567,962, filed Dec. 7, 2011, Baarman et al.
U.S. Appl. No. 15/393,028, filed Dec. 28, 2016, Ricci.
U.S. Appl. No. 15/393,137, filed Dec. 28, 2016, Ricci et al.
U.S. Appl. No. 15/394,489, filed Dec. 29, 2016, Ricci et al.
"Automatic vehicle location," wikipedia.org, available at https://en.m.wikipedia.org/wiki/Automotive_vehicle_location, accessed Dec. 2016, 7 pages.
"Automotive navigation system," wikipedia.org, available at https://en.m.wikipedia.org/wiki/Automotive_navigation_system, accessed Dec. 2016, 15 pages.
"Global positioning system," wikipedia.org, available at https://en.m.wikipedia.org/wiki/Global_Positioning_System, accessed Dec. 2016, 50 pages.
"Map database management," wikipedia.org, available at https://en.m.wikipedia.org/wiki/Map_database_management, accessed Dec. 2016, 9 pages.
"Nexus 10 Guidebook for Android," Google Inc., © 2012, Edition 1.2, 166 pages.
"Self-Driving: Self-Driving Autonomous Cars," available at http://www.automotivetechnologies.com/autonomous-self-driving-cars, accessed Dec. 2016, 9 pages.
"Wireless ad hoc Network," wikipedia.org, available at https://en.m.wikipedia.org/wiki/Wireless_ad_hoc_network, accessed Dec. 2016, 15 pages.
Armor-Segan et al., "Towards the Self Healing Vehicle," Automotive Electronics, Jun. 2007, 2007 3rd Institution of Engineering and Technology Conference, 7 pages.
Bennett, "Meet Samsung's Version of Apple AirPlay," CNET.com, Oct. 10, 2012, 11 pages.
Cairnie et al., "Using Finger-Pointing to Operate Secondary Controls in Automobiles," Proceedings of the IEEE Intelligent Vehicles Symposium 2000, Oct. 3-5, 2000, 6 pages.
Clark, "How Self-Driving Cars Work: The Nuts and Bolts Behind Google's Autonomous Car Program," Feb. 21, 2015, available at http://www.makeuseof.com/tag/how-self-driving-cars-work-the-nuts-and-bolts-behind-googles-autonomous-car-program/, 9 pages.
Deaton et al., "How Driverless Cars Will Work," Jul. 1, 2008, HowStuffWorks.com. <http://auto.howstuffworks.com/under-the-hood/trends-innovations/driverless-car.htm> Sep. 18, 2017, 10 pages.
Dumbaugh, "Safe Streets, Livable Streets: A Positive Approach to urban Roadside Design," Ph.D. dissertation for School of Civil & Environ. Engr., Georgia Inst. of Technology, Dec. 2005, 235 pages.
Fei et al., "A QoS-aware Dynamic Bandwidth Allocation Algorithm for Relay Stations in IEEE 802.16j-based Vehicular Networks,"

(56) References Cited

OTHER PUBLICATIONS

Proceedings of the 2010 IEEE Global Telecommunications Conference, Dec. 10, 2010, 10 pages.
Ge et al., "Optimal Relay Selection in IEEE 802.16j Multihop Relay Vehicular Networks," IEEE. Transactions on Vehicular Technology, 2010, vol. 59(5), pp. 2198-2206.
Guizzo, Erico, "How Google's Self-Driving Car Works," Oct. 18, 2011, available at https://spectrum.ieee.org/automaton/robotics/artificial-intelligence/how-google-self-driving-car-works, 5 pages.
Heer et al., "ALPHA: An Adaptive and Lightweight Protocol for Hop-by-hop Authentication," Proceedings of CoNEXT 2008, Dec. 2008, pp. 1-12.
Jahnich et al., "Towards a Middleware Approach for a Self-Configurable Automotive Embedded System," International Federation for Information Processing, 2008, pp. 55-65.
Persson "Adaptive Middleware for Self-Configurable Embedded Real-Time Systems," KTH Industrial Engineering and Management, 2009, pp. iii-71 and references.
Raychaudhuri et al., "Emerging Wireless Technologies and the Future Mobile Internet," p. 48, Cambridge Press, 2011, 3 pages.
Stephens, Leah, "How Driverless Cars Work," Interesting Engineering, Apr. 28, 2016, available at https://interestingengineering.com/driverless-cars-work/, 7 pages.
Stoller, "Leader Election in Distributed Systems with Crash Failures," Indiana University, 1997, pp. 1-15.
Strunk et al., "The Elements of Style," 3d ed., Macmillan Publishing Co., 1979, 3 pages.
Suwatthikul, "Fault detection and diagnosis for in-vehicle networks," Intech, 2010, pp. 283-286 [retrieved from: www.intechopen.com/books/fault-detection-and-diagnosis-for-in-vehicle-networks].
Walter et al., "The smart car seat: personalized monitoring of vital signs in automotive applications." Personal and Ubiquitous Computing, Oct. 2011, vol. 15, No. 7, pp. 707-715.
Wolf et al., "Design, Implementation, and Evaluation of a Vehicular Hardware Security Module," ICISC'11 Proceedings of the 14th Int'l Conf. Information Security & Cryptology, Springer-Verlag Berlin, Heidelberg, 2011, pp. 302-318.
Official Action for U.S. Appl. No. 15/393,028, dated Jun. 28, 2017, 15 pages.
Official Action for U.S. Appl. No. 15/393,1378, dated Sep. 18, 2017, 13 pages.
Official Action for U.S. Appl. No. 15/394,489, dated Oct. 6, 2017, 13 pages.
Notice of Allowance for U.S. Appl. No. 15/393,028, dated Jan. 3, 2018, 24 pages.
Notice of Allowance for U.S. Appl. No. 15/393,137, dated Jan. 19, 2018, 5 pages.

\* cited by examiner

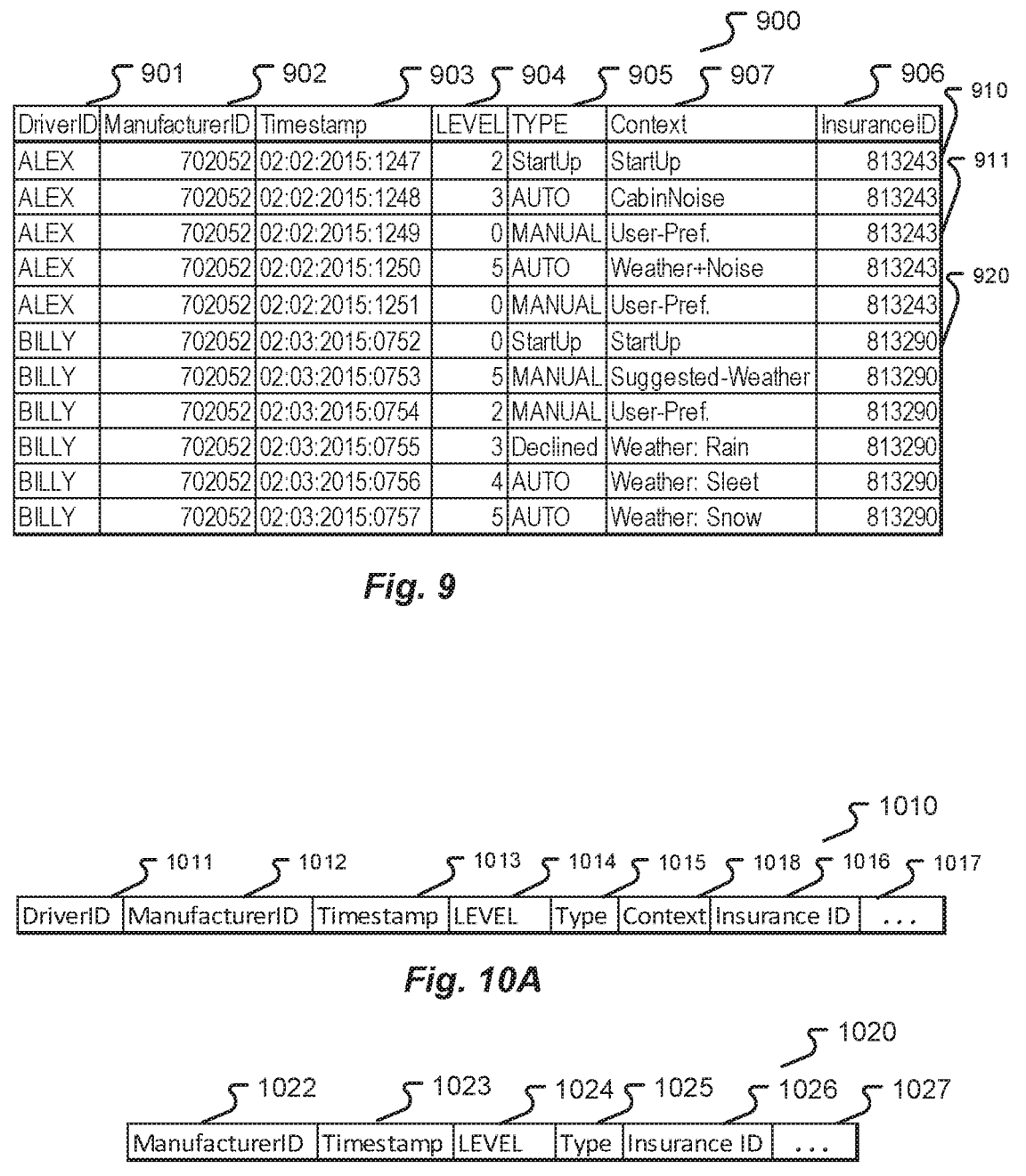

| DriverID | ManufacturerID | Timestamp | LEVEL | TYPE | Context | InsuranceID |
|---|---|---|---|---|---|---|
| ALEX | 702052 | 02:02:2015:1247 | 2 | StartUp | StartUp | 813243 |
| ALEX | 702052 | 02:02:2015:1248 | 3 | AUTO | CabinNoise | 813243 |
| ALEX | 702052 | 02:02:2015:1249 | 0 | MANUAL | User-Pref. | 813243 |
| ALEX | 702052 | 02:02:2015:1250 | 5 | AUTO | Weather+Noise | 813243 |
| ALEX | 702052 | 02:02:2015:1251 | 0 | MANUAL | User-Pref. | 813243 |
| BILLY | 702052 | 02:03:2015:0752 | 0 | StartUp | StartUp | 813290 |
| BILLY | 702052 | 02:03:2015:0753 | 5 | MANUAL | Suggested-Weather | 813290 |
| BILLY | 702052 | 02:03:2015:0754 | 2 | MANUAL | User-Pref. | 813290 |
| BILLY | 702052 | 02:03:2015:0755 | 3 | Declined | Weather: Rain | 813290 |
| BILLY | 702052 | 02:03:2015:0756 | 4 | AUTO | Weather: Sleet | 813290 |
| BILLY | 702052 | 02:03:2015:0757 | 5 | AUTO | Weather: Snow | 813290 |

*Fig. 9*

| DriverID | ManufacturerID | Timestamp | LEVEL | Type | Context | Insurance ID | ... |
|---|---|---|---|---|---|---|---|

*Fig. 10A*

| ManufacturerID | Timestamp | LEVEL | Type | Insurance ID | ... |
|---|---|---|---|---|---|

*Fig. 10B*

| DriverID | VehicleID | Timestamp | LEVEL | TYPE | InsuranceID |
|---|---|---|---|---|---|
| ALEX | 702052 | 02:02:2015:1247 | 2 | StartUp | 813243 |
| ALEX | 702052 | 02:02:2015:1248 | 3 | AUTO | 813243 |
| ALEX | 702052 | 02:02:2015:1249 | 0 | MANUAL | 813243 |
| ALEX | 702052 | 02:02:2015:1250 | 5 | AUTO | 813243 |
| ALEX | 702052 | 02:02:2015:1251 | 0 | MANUAL | 813243 |
| BILLY | 702052 | 02:03:2015:0752 | 0 | StartUp | 813290 |
| BILLY | 702052 | 02:03:2015:0753 | 5 | MANUAL | 813290 |
| BILLY | 702052 | 02:03:2015:0754 | 2 | MANUAL | 813290 |
| BILLY | 702052 | 02:03:2015:0755 | 3 | AUTO | 813290 |
| BILLY | 702052 | 02:03:2015:0756 | 4 | AUTO | 813290 |
| BILLY | 702052 | 02:03:2015:0757 | 5 | AUTO | 813290 |
| GAVIN | 605853 | 02:02:2015:1247 | 3 | AUTO | 418539 |
| GAVIN | 605854 | 02:02:2015:1248 | 4 | AUTO | 418540 |
| GAVIN | 605855 | 02:02:2015:1249 | 5 | AUTO | 418541 |
| GAVIN | 605856 | 02:02:2015:1250 | 1 | MANUAL | 418542 |
| GAVIN | 605857 | 02:02:2015:1251 | 2 | AUTO | 418543 |
| GAVIN | 605858 | 02:02:2015:1252 | 2 | PowerDown | 418544 |

*Fig. 11A*

| ManufacturerID | VehicleID | Timestamp | LEVEL | TYPE | InsuranceID |
|---|---|---|---|---|---|
| 405 | 702052 | 02:02:2015:1247 | 2 | StartUp | 813243 |
| 405 | 702052 | 02:02:2015:1248 | 3 | AUTO | 813243 |
| 405 | 702052 | 02:02:2015:1249 | 0 | MANUAL | 813243 |
| 405 | 702052 | 02:02:2015:1250 | 5 | AUTO | 813243 |
| 405 | 702052 | 02:02:2015:1251 | 0 | MANUAL | 813243 |
| 405 | 702052 | 02:03:2015:0752 | 0 | StartUp | 813290 |
| 405 | 702052 | 02:03:2015:0753 | 5 | MANUAL | 813290 |
| 405 | 702052 | 02:03:2015:0754 | 2 | MANUAL | 813290 |
| 405 | 702052 | 02:03:2015:0755 | 3 | AUTO | 813290 |
| 405 | 702052 | 02:03:2015:0756 | 4 | AUTO | 813290 |
| 405 | 702052 | 02:03:2015:0757 | 5 | AUTO | 813290 |
| 203 | 605853 | 02:02:2015:1247 | 3 | AUTO | 418539 |
| 203 | 605854 | 02:02:2015:1248 | 4 | AUTO | 418540 |
| 203 | 605855 | 02:02:2015:1249 | 5 | AUTO | 418541 |
| 203 | 605856 | 02:02:2015:1250 | 1 | MANUAL | 418542 |
| 203 | 605857 | 02:02:2015:1251 | 2 | AUTO | 418543 |
| 203 | 605858 | 02:02:2015:1252 | 2 | PowerDown | 418544 |

*Fig. 11B*

| Risk Score | Optimum Level | Reaction |
|---|---|---|
| 0 - 10 | AL0 | Suggest |
| 11 - 15 | AL1 | Suggest |
| 16 - 20 | AL1 | Auto-Switch |
| 21 - 25 | AL2 | Suggest |
| 26 - 30 | AL2 | Auto-Switch |
| 31 - 35 | AL3 | Suggest |
| 36 - 40 | AL3 | Auto-Switch |
| 41 - 45 | AL4 | Suggest |
| 46 - 50 | AL4 | Auto-Switch |
| 51 - 55 | AL5 | Suggest |
| 56 - 60 | AL5 | Auto-Switch |

*Fig. 12*

| Sensor ID | S1 | S2 | S3 | S4 | ... |
|---|---|---|---|---|---|
| Measurement | 0.3 | 1.3 | 4.2 | 0.4 | ... |

*Fig. 13*

FEEDBACK PERFORMANCE CONTROL AND TRACKING

CROSS-REFERENCE TO RELATED APPLICATIONS

The present application claims the benefits of and priority, under 35 U.S.C. § 119(e), to U.S. Provisional Application Ser. No. 62/418,620, filed Nov. 7, 2016, entitled "Self-Driving Control Systems for the Next Generation Vehicle." The entire disclosure of the application listed above is hereby incorporated by reference, in its entirety, for all that it teaches and for all purposes.

FIELD OF THE INVENTION

The present disclosure relates generally to vehicle systems and, more particularly, to the use of advanced driver assistance systems and the tracking thereof.

BACKGROUND OF THE INVENTION

A conventional vehicle includes various systems of assisting a driver with the control of the vehicle, thereby increasing driver and passenger safety while increasing road safety in general. Advanced driver assistance ("ADA") systems are developed to increase vehicular safety and allow for better driving ability. Current ADA systems include allowing for keeping drivers in a correct lane and displaying to a driver the contents of a blind spot.

Drivers of conventional vehicles are typically required to carry vehicle insurance. Vehicle insurance may cover damage to the vehicle, to other vehicles, to third parties, and other items. Typically, when a driver is at fault in an accident, he may be liable for any damage caused. This liability is typically paid via an insurance claim. The insurance rates of the at-fault party may increase because of the accident.

In recent years, ADA systems have become more complex, some offering completely autonomous capabilities. While vehicles have become more advanced, drivers have simultaneously become more distracted, some using smartphones and other technology to multi-task while driving. Despite the steady increase in vehicle technology, designed to increase driver safety, the number of motor vehicle crash deaths has not steadily declined. Between the years 2009 and 2014, according to the U.S. Department of Transportation, the number of total deaths in the United States has remained between 32,479 and 33,883. In 2015, the number increased to over 35,000.

With the increase in use of autonomous vehicles, the numbers of drivers at fault in accidents should decrease. In their place, manufacturers of autonomous vehicles may carry the liability for accidents caused by an autonomously-driven vehicle. Accordingly, the use of autonomous vehicles and vehicles utilizing other ADA systems should decrease the average cost of insurance on behalf of the driver, while manufacturers selling autonomous vehicles should carry manufacturer liability insurance. Insurance companies, to accurately adjust insurance rates to compete in the market, must update actuarial models used in the calculation of rates.

Currently, responsible drivers pay inflated insurance premiums because the insurance industry cannot adequately monitor a driver's use of a vehicle. While today's vehicles are equipped with advanced safety features, including ADAS and autonomous driving capabilities, vehicle insurance plans typically fail to take such features into consideration. A conventional insurance plan may simply offer a regular monthly premium. This plan may be offered to drivers of cars with or without such safety features. Such a plan may be offered to drivers of a common vehicle with safety features regardless of whether or not such safety features are actually utilized by the driver. Due to an inability to accurately monitor a driver's use of a vehicle, and due to inadequate actuarial models which do not take into account drivers actual use of safety features, insurance companies are incapable of providing fair and equitable insurance plans to drivers based on actual use of safety features. It is an unfair responsibility for drivers utilizing safety features such as autonomous driving mode to pay insurance premiums the same or similar to those paid by drivers under-utilizing such features.

Additionally, drivers controlling autonomous capable vehicles and vehicles with other ADA systems may under-utilize such capabilities due to a number of factors. For example, ADA systems of a vehicle may be in part deactivated. A driver may be unaware of his or her incapacity to operate the vehicle in the safest manner. ADA systems may be needed to resolve issues such as poor driving abilities or poor driving environments.

Examples of poor driving abilities may include a general lack of skill of the driver, poor road selection, or a lack of skill of the driver in certain scenarios, such as driving over hills, driving around curves, driving in rain, snow, or other bad weather, driving in traffic, driving at night, driving into a bright sun, poor speed selection for a particular condition, or a combination thereof. Other poor driving abilities may be attributed to poor driver behavior, such as looking away from the road, tiredness, sleepiness, distractions in the car (volume levels for entertainment system, other passengers, etc.), or distracting technology, poor interior vehicle lighting, or a combination thereof.

Examples of poor driving environments may include: night time, night time with nearby high intensity city lighting, bad lighting, bright lighting, steep hills, sharp curves, heavy traffic, bad weather (rain, fog, sleet, snow, ice, wind, etc.), high audio levels (from road noise, wind noise, nearby construction, etc.), road conditions (paved, gravel, bumpy, etc.), or a combination thereof.

Due to these and other factors, the safety of drivers and their passengers, as well as the safety of road traffic in general, is inefficiently low. Vehicles with autonomous capabilities and ADA systems of vehicles are also often inadequately under-utilized. Furthermore, when autonomous capabilities and ADA systems of a vehicle are utilized, drivers do not realize the full benefit and typically pay inflated rates for insurance.

While conventional vehicles utilizing autonomous capabilities and ADA systems provide a variety of benefits, typically the drivers of such vehicles are charged more than a fair share for insurance. Meanwhile, insurance companies spend a great deal of time and money researching actuarial science to generate a more accurate rate. Additionally, drivers of cars with autonomous features and other ADA systems do not totally take advantage of such systems, either due to driver choice or unknowingly. As a result, the inclusion of ADA systems in cars is wholly inefficient. Accordingly, what is needed is a system of tracking the use of ADA systems and autonomous capabilities, and a system of engaging such systems and capabilities or otherwise making the use of such systems and capabilities more efficient, thus improving driver experience, lessening driver distraction, and increasing insurance actuarial science. The present disclosure provides such a system.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 9 is a table illustrating an embodiment of a database in accordance with the systems presented herein;

FIG. 10A is a table illustrating an embodiment of a packet in accordance with the systems presented herein;

FIG. 10B is a table illustrating an embodiment of a packet in accordance with the systems presented herein;

FIG. 11A is a table illustrating an embodiment of a database in accordance with the systems presented herein;

FIG. 11B is a table illustrating an embodiment of a database in accordance with the systems presented herein;

FIG. 12 is a table illustrating an embodiment of a database in accordance with the systems presented herein;

FIG. 13 is a table illustrating an embodiment of a database in accordance with the systems presented herein;

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
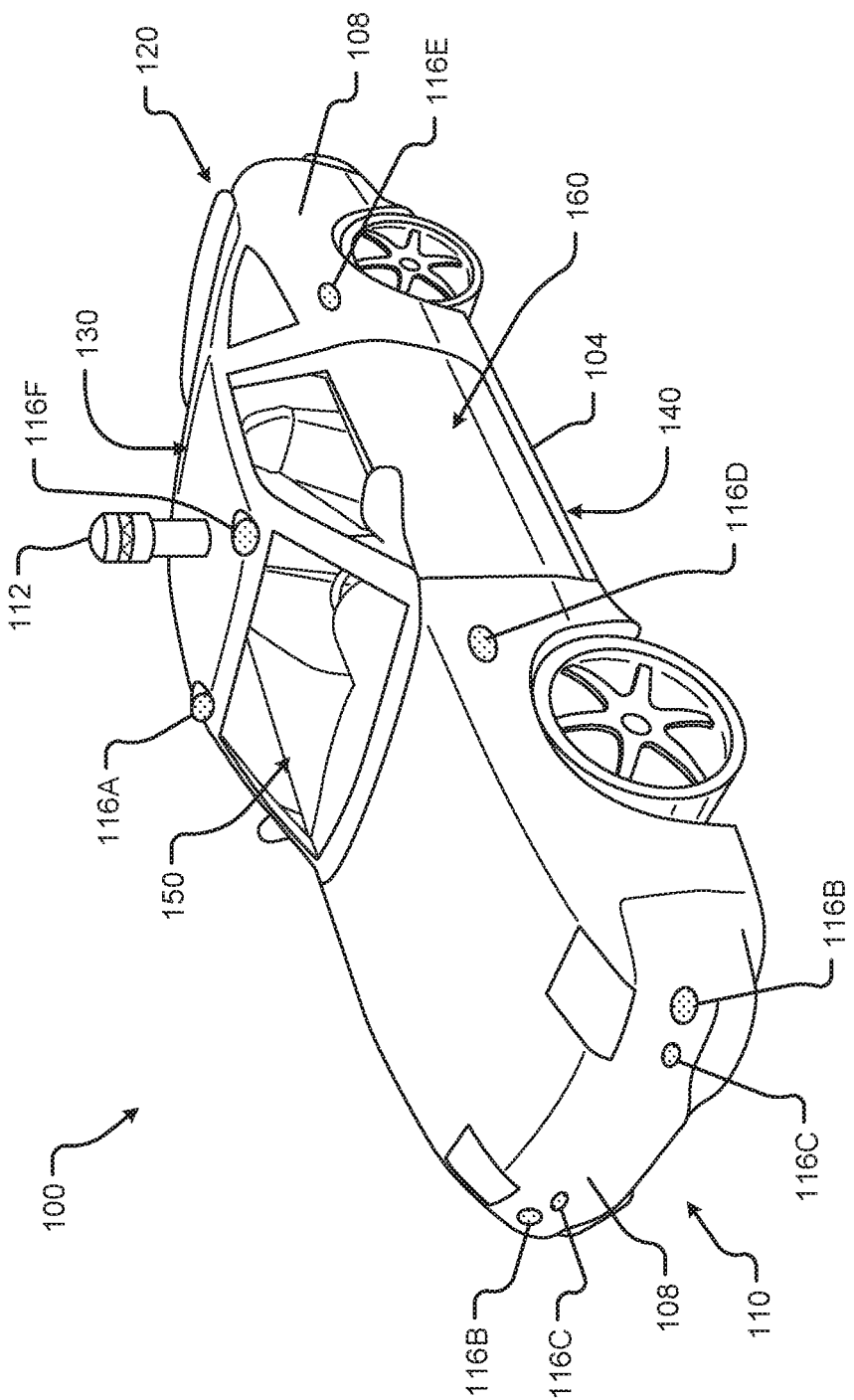
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft or rear 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

An exemplary embodiment is directed towards using various data compiled, detected, or received by a system to analyze factors contributing to an individual's driving behavior and/or habits. In the event that an individual wishes to receive better insurance rates for the use of ADAS or other autonomous abilities of his or her vehicle, the driver may agree to provide insurance tracking information. The insurance tracking system may consider one or more of an amount and level of ADAS or other autonomous driving modes, etc., in order to determine fair and equitable insurance plan terms established by the insurance company.

In accordance with another exemplary aspect, in addition to the system being able to allow drivers to receive insurance rates which take into consideration actual use of vehicle safety features, the system can also be used to dynamically provide feedback on optimal Automation Levels and automatically change between Automation Levels, which can be based on an analysis of information from one or more sensors. This feedback can be given in real-time, such as via a display installed in or associated with the vehicle (or even a multi-screen device), through the speakers, tactile feedback, such as through the seat, steering wheel, the driver's phone (such as a vibration), or the like.

In addition to providing dynamic information to a driver's insurance company, the information may also be used by a vehicle manufacturer to provide information to the manufacturer's insurance carrier. This information may be used, for example, to perhaps lower a manufacturer insurance premium in the case of evidence showing drivers foregoing the use of vehicle autonomous capabilities. For example, a driver using autonomous mode at all times should theoretically avoid any liability for accidents caused by such autonomous driving. The liability instead would be placed on the vehicle manufacturer. In this scenario, a vehicle manufacturer may have a higher probability of liability and thus would expect higher insurance premiums. At the same time, a second driver, driving perhaps the same car, who does not utilize the autonomous capabilities of the vehicle should incur all liability in the event of an accident of his fault. In which case the manufacturer should see less liability for such an accident.

In accordance with an exemplary embodiment, some of the information and/or data that can be monitored are perimeter information, G-force information, proximity information, GPS location information, time and date information, biometric information, law and/or regulation information, behavior information from one or more of the driver and passenger(s), mileage information, as well as vehicle information, such as any information acquirable from, for example, on-board diagnostics (such as OBD-II) as well as lighting information, such as turn signals, headlights, radio information, Bluetooth® information, braking information, turning information, acceleration information, and in general any information related to a vehicle's operation.

In accordance with another exemplary embodiment, a insurance-data-tracking module can be located in one or more of the vehicle and remotely, such as at an insurance company premise, the insurance-data-tracking module, cooperating with a communication module, is able to not only transfer data collected from the various sensors, and/or a simple analysis decision from the vehicle to the insurance company, but also allows feedback, such as instructions, incentive, or disincentive information, to be relayed to the driver of the vehicle with the cooperation of a communication module and, as discussed, one or more of a display, speakers and tactile feedback devices.

It is anticipated that automation level use data may be compiled by the vehicle and/or associated systems. Alternatively, or in addition, vehicle operators may report Automation Level use by sending a signal to a central repository. This central repository may analyze the reported data and cause at least one driver's Automation Level use to be reflected in a Automation Level use grade.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.). The vehicle may also include a number of microphones which may be used to monitor internal and/or external sounds.

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally, or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. The level of autonomous driving may correspond to the levels as defined by the U.S. Department of Transportation's National Highway Traffic Safety Administration (NHTSA). These levels may also correspond to the levels defined and described by the Society of Automobile Engineers (SAE) in the SAE International's J3016 document, wherein the revised version was published Sep. 30, 2016, which document is incorporated herein by reference for all that it teaches and for all purposes. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" or a "Fully-Manual" level. Level 0 may be equivalent to a modern vehicle with an automatic, or semi-automatic, transmission and without automated driving capabilities.

At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level.

At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring in some way the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level.

At Level 4, the driver may be separated from controlling all the driving operations of the vehicle and the vehicle may control driving operations even when a user fails to respond to a request to intervene. Level 4 may be referred to as a "High Automation" level.

At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

The levels of driving operation may be manually selected or shifted by the driver through via a user interface in the vehicle.

The levels of driving operation may also be selected automatically for a driver by a processor of the vehicle. This automatic selection may be executed based on a number of factors. For example, noise inside the vehicle cabin could signify a distracting environment and when detected may provoke an initiation of a forced switch to an autonomous driving mode.

When a processor of the vehicle selects a driving operation level for the driver, the vehicle may automatically change into that driving operation level. Alternatively, the vehicle may present the driver with a notification suggesting such a change. For example, a user interface display may display a window suggesting the change along with a button for the driver to quickly select the new driving level.

The driving level used by the vehicle may be tracked and recorded and stored for statistical analysis or other purposes as discussed herein.

As shown in FIG. 1, the vehicle 100 may, for example, include at least one of a ranging and imaging system 112 (e.g., LIDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIGS. 1 and 2 may be disposed in, on, and/or about the vehicle 100 in any position, area, and/or zone of the vehicle 100.

Figure 2:
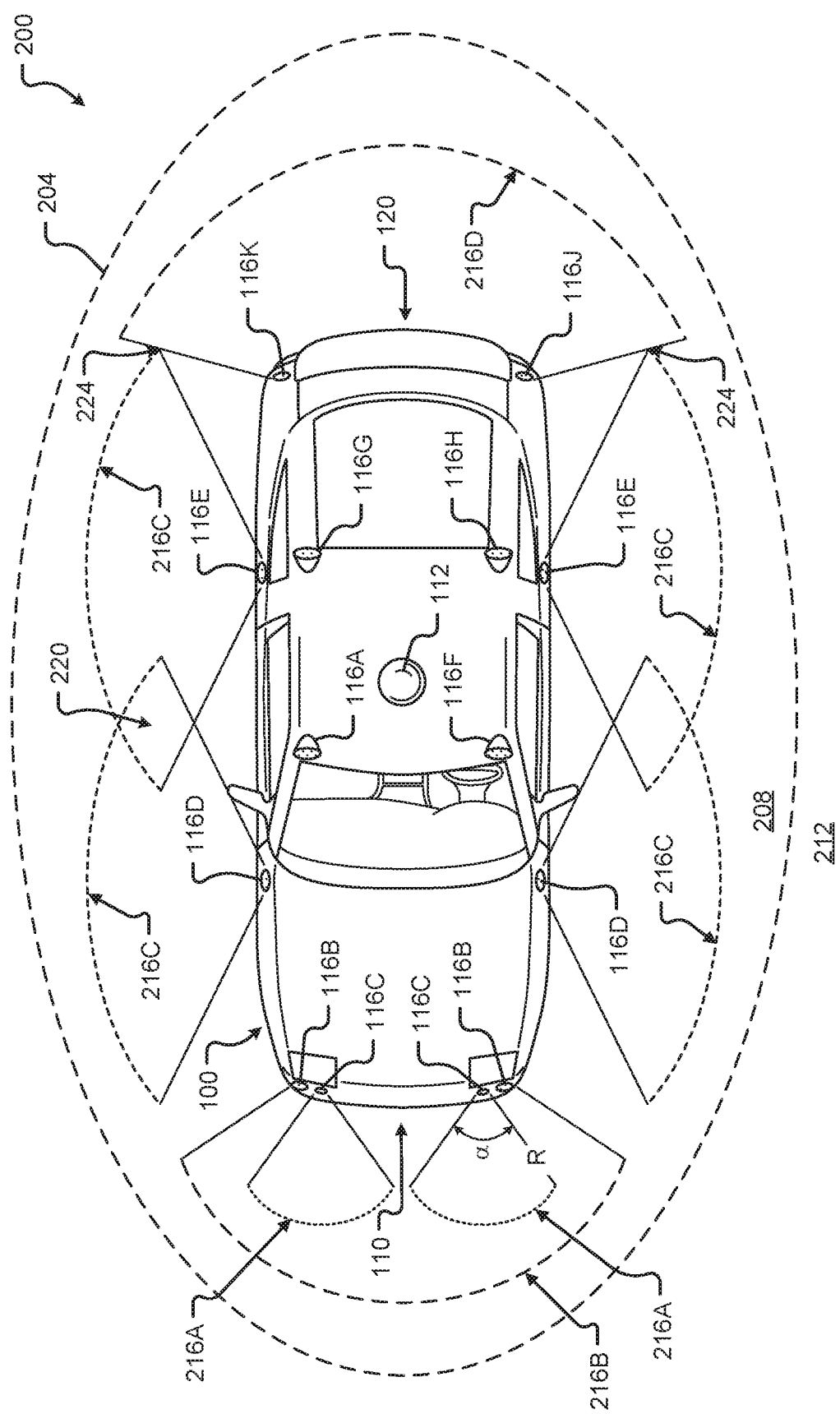
FIG. 2 shows a plan view of the vehicle in accordance with at least some embodiments of the present disclosure.

Referring now to FIG. 2, a plan view of a vehicle 100 will be described in accordance with embodiments of the present disclosure. In particular, FIG. 2 shows a vehicle sensing environment 200 at least partially defined by the sensors and systems 116A-K, 112 disposed in, on, and/or about the vehicle 100. Each sensor 116A-K may include an operational detection range R and operational detection angle α. The operational detection range R may define the effective detection limit, or distance, of the sensor 116A-K. In some cases, this effective detection limit may be defined as a distance from a portion of the sensor 116A-K (e.g., a lens, sensing surface, etc.) to a point in space offset from the sensor 116A-K. The effective detection limit may define a distance, beyond which, the sensing capabilities of the sensor 116A-K deteriorate, fail to work, or are unreliable. In some embodiments, the effective detection limit may define a distance, within which, the sensing capabilities of the sensor 116A-K are able to provide accurate and/or reliable detection information. The operational detection angle α may define at least one angle of a span, or between horizontal and/or vertical limits, of a sensor 116A-K. As can be appreciated, the operational detection limit and the operational detection angle α of a sensor 116A-K together may define the effective detection zone 216A-D (e.g., the effective detection area, and/or volume, etc.) of a sensor 116A-K.

In some embodiments, the vehicle 100 may include a ranging and imaging system 112 such as LIDAR, or the like. The ranging and imaging system 112 may be configured to detect visual information in an environment surrounding the vehicle 100. The visual information detected in the environment surrounding the ranging and imaging system 112 may be processed (e.g., via one or more sensor and/or system processors, etc.) to generate a complete 360-degree view of an environment 200 around the vehicle. The ranging and imaging system 112 may be configured to generate changing 360-degree views of the environment 200 in real-time, for instance, as the vehicle 100 drives. In some cases, the ranging and imaging system 112 may have an effective detection limit 204 that is some distance from the center of the vehicle 100 outward over 360 degrees. The effective detection limit 204 of the ranging and imaging system 112 defines a view zone 208 (e.g., an area and/or volume, etc.) surrounding the vehicle 100. Any object falling outside of the view zone 208 is in the undetected zone 212 and would not be detected by the ranging and imaging system 112 of the vehicle 100.

Sensor data and information may be collected by one or more sensors or systems 116A-K, 112 of the vehicle 100 monitoring the vehicle sensing environment 200. This information may be processed (e.g., via a processor, computer-vision system, etc.) to determine targets (e.g., objects, signs, people, markings, roadways, conditions, etc.) inside one or more detection zones 208, 216A-D associated with the vehicle sensing environment 200. In some cases, information from multiple sensors 116A-K may be processed to form composite sensor detection information. For example, a first sensor 116A and a second sensor 116F may correspond to a first camera 116A and a second camera 116F aimed in a forward traveling direction of the vehicle 100. In this example, images collected by the cameras 116A, 116F may be combined to form stereo image information. This composite information may increase the capabilities of a single sensor in the one or more sensors 116A-K by, for example, adding the ability to determine depth associated with targets in the one or more detection zones 208, 216A-D. Similar image data may be collected by rear view cameras (e.g., sensors 116G, 116H) aimed in a rearward traveling direction vehicle 100.

In some embodiments, multiple sensors 116A-K may be effectively joined to increase a sensing zone and provide increased sensing coverage. For instance, multiple RADAR sensors 116B disposed on the front 110 of the vehicle may be joined to provide a zone 216B of coverage that spans across an entirety of the front 110 of the vehicle. In some cases, the multiple RADAR sensors 116B may cover a detection zone 216B that includes one or more other sensor detection zones 216A. These overlapping detection zones may provide redundant sensing, enhanced sensing, and/or provide greater detail in sensing within a particular portion (e.g., zone 216A) of a larger zone (e.g., zone 216B). Additionally or alternatively, the sensors 116A-K of the vehicle 100 may be arranged to create a complete coverage, via one or more sensing zones 208, 216A-D around the vehicle 100. In some areas, the sensing zones 216C of two or more sensors 116D, 116E may intersect at an overlap zone 220. In some areas, the angle and/or detection limit of two or more sensing zones 216C, 216D (e.g., of two or more sensors 116E, 116J, 116K) may meet at a virtual intersection point 224.

The vehicle 100 may include a number of sensors 116E, 116G, 116H, 116J, 116K disposed proximal to the rear 120 of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 116E, 116G, 116H, 116J, 116K may detect targets near or approaching the rear of the vehicle 100. For example, another vehicle approaching the rear 120 of the vehicle 100 may be detected by one or more of the ranging and imaging system (e.g., LIDAR) 112, rear-view cameras 116G, 116H, and/or rear facing RADAR sensors 116J, 116K. As described above, the images from the rear-view cameras 116G, 116H may be processed to generate a stereo view (e.g., providing depth associated with an object or environment, etc.) for targets visible to both cameras 116G, 116H. As another example, the vehicle 100 may be driving and one or more of the ranging and imaging system 112, front-facing cameras 116A, 116F, front-facing RADAR sensors 116B, and/or ultrasonic sensors 116C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 112, and/or the side-facing sensors 116D, 116E (e.g., RADAR, ultrasonic, camera, combinations thereof, and/or other type of sensor), may detect targets at a side of the vehicle 100. It should be appreciated that the sensors 116A-K may detect a target that is both at a side 160 and a front 110 of the vehicle 100 (e.g., disposed at a diagonal angle to a centerline of the vehicle 100 running from the front 110 of the vehicle 100 to the rear 120 of the vehicle). Additionally or alternatively, the sensors 116A-K may detect a target that is both, or simultaneously, at a side 160 and a rear 120 of the vehicle 100 (e.g., disposed at a diagonal angle to the centerline of the vehicle 100).

Figure 3A:
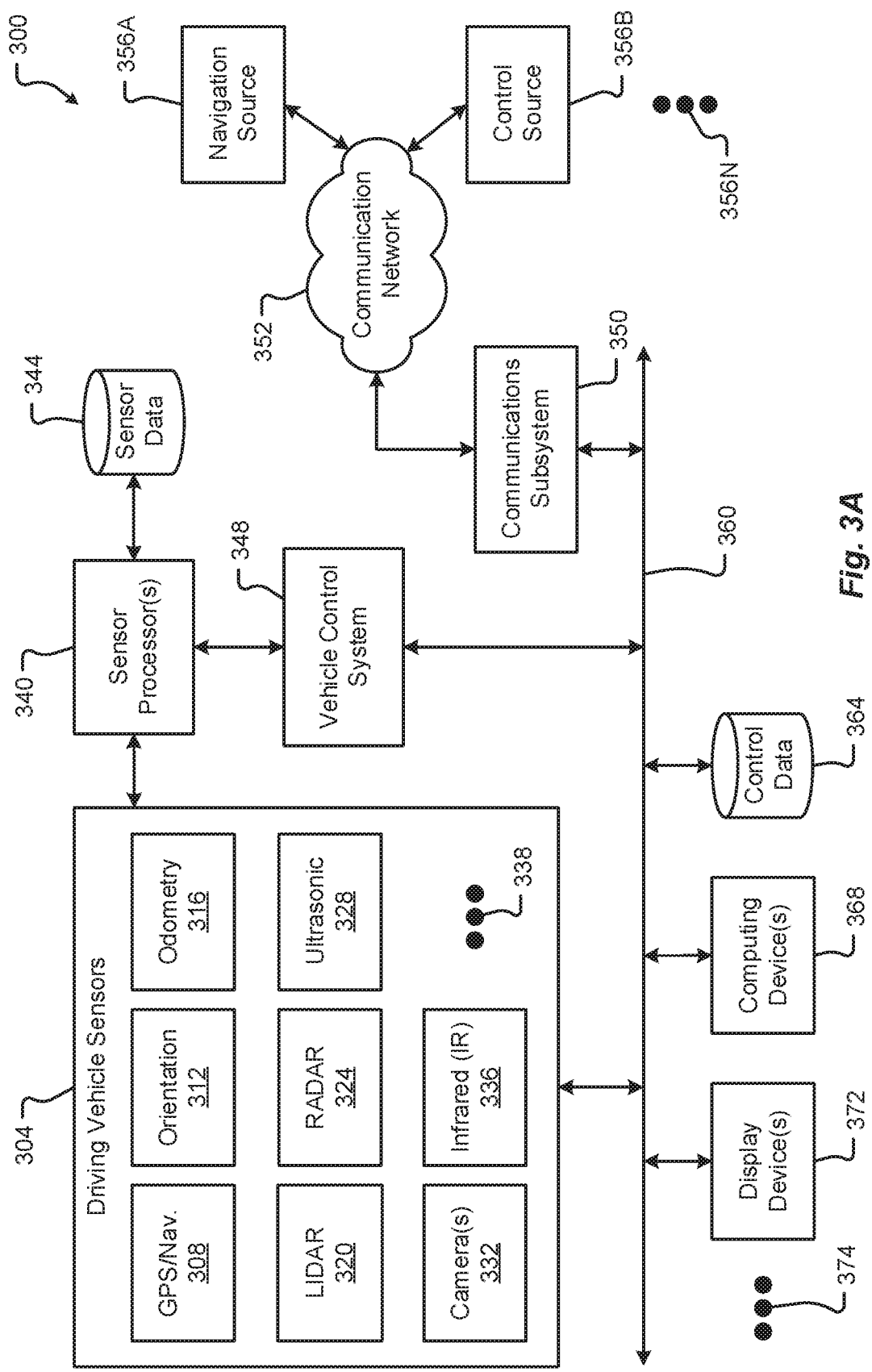
FIG. 3A is a block diagram of an embodiment of a communication environment of the vehicle in accordance with embodiments of the present disclosure.

FIG. 3A is a block diagram of an embodiment of a communication environment 300 of the vehicle 100 in accordance with embodiments of the present disclosure. The communication system 300 may include one or more vehicle driving vehicle sensors and systems 304, sensor processors 340, sensor data memory 344, vehicle control system 348, communications subsystem 350, control data 364, computing devices 368, display devices 372, and other components 374 that may be associated with a vehicle 100. These associated components may be electrically and/or communicatively coupled to one another via at least one bus 360. In some embodiments, the one or more associated components may send and/or receive signals across a communication network 352 to at least one of a navigation source 356A, a control source 356B, or some other entity 356N.

In accordance with at least some embodiments of the present disclosure, the communication network 352 may comprise any type of known communication medium or collection of communication media and may use any type of protocols, such as SIP, TCP/IP, SNA, IPX, AppleTalk, and the like, to transport messages between endpoints. The communication network 352 may include wired and/or wireless communication technologies. The Internet is an example of the communication network 352 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 may comprise a number of different communication media such as coaxial cable, copper cable/wire, fiber-optic cable, antennas for transmitting/receiving wireless messages, and combinations thereof.

The driving vehicle sensors and systems 304 may include at least one navigation 308 (e.g., global positioning system (GPS), etc.), orientation 312, odometry 316, LIDAR 320, RADAR 324, ultrasonic 328, camera 332, infrared (IR) 336, and/or other sensor or system 338. These driving vehicle sensors and systems 304 may be similar, if not identical, to the sensors and systems 116A-K, 112 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100. Examples of the navigation sensor 308 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18xOEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 312 may include one or more sensors configured to determine an orientation of the vehicle 100 relative to at least one reference point. In some embodiments, the orientation sensor 312 may include at least one pressure transducer, stress/strain gauge, accelerometer, gyroscope, and/or geomagnetic sensor. Examples of the navigation sensor 308 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, and may perform orientation detection and/or determination functions using any known or future-developed standard and/or architecture.

The odometry sensor and/or system 316 may include one or more components that is configured to determine a change in position of the vehicle 100 over time. In some embodiments, the odometry system 316 may utilize data from one or more other sensors and/or systems 304 in determining a position (e.g., distance, location, etc.) of the vehicle 100 relative to a previously measured position for the vehicle 100. Additionally or alternatively, the odometry sensors 316 may include one or more encoders, Hall speed sensors, and/or other measurement sensors/devices configured to measure a wheel speed, rotation, and/or number of revolutions made over time. Examples of the odometry sensor/system 316 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Mangnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 320 may include one or more components configured to measure distances to targets using laser illumination. In some embodiments, the LIDAR sensor/system 320 may provide 3D imaging data of an environment around the vehicle 100. The imaging data may be processed to generate a full 360-degree view of the environment around the vehicle 100. The LIDAR sensor/system 320 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 320 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 320 may detect when light from the plurality of laser beams emitted into the measurement environment returns (e.g., reflected echo) to the LIDAR sensor/system 320. The LIDAR sensor/system 320 may calculate, based on a time associated with the emission of light to the detected return of light, a distance from the vehicle 100 to the illuminated target. In some embodiments, the LIDAR sensor/system 320 may generate over 2.0 million points per second and have an effective operational range of at least 100 meters. Examples of the LIDAR sensor/system 320 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets. Examples of the RADAR sensors 324 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets. Examples of the ultrasonic sensors 328 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 332 may include one or more components configured to detect image information associated with an environment of the vehicle 100. In some embodiments, the camera sensors 332 may include a lens, filter, image sensor, and/or a digital image processor. It is an aspect of the present disclosure that multiple camera sensors 332 may be used together to generate stereo images providing depth measurements. Examples of the camera sensors 332 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 336 may include one or more components configured to detect image information associated with an environment of the vehicle 100. The IR sensors 336 may be configured to detect targets in low-light, dark, or poorly-lit environments. The IR sensors 336 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.). Examples of IR sensors 336 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

The driving vehicle sensors and systems 304 may also include a precipitation sensor. The precipitation sensor may be operable to detect or sense precipitation of a varying degree. Preferably, the precipitation sensor is capable of sensing a level of precipitation, allowing the system to accurately determine a measurement of rainfall or other precipitation.

The driving vehicle sensors and systems 304 may also include an external temperature sensor. The external temperature sensor may operate to determine an ambient temperature of the environment outside the vehicle. The external temperature sensor may operate in combination with the precipitation sensor to determine a likelihood of icy road conditions, snowfall, sleet, or rain.

The driving vehicle sensors and systems 304 may also include a vehicle vibration sensor. A vibration sensor may be operable to monitor an amount of vibration of the drivetrain or tires of the vehicle. The sensor may return a road-bumpiness factor to be used to survey factors such as road damage, potholes, road material, etc.

The driving vehicle sensors and systems 304 may also include a plurality of microphones placed inside and around the exterior of the vehicle. Microphones may be operable to measure external ambience noise levels as well as internal, cabin-noise.

The driving vehicle sensors and systems 304 may also include a passenger detection behavior sensor module. A passenger detection behavior sensor module may allow one or more passenger and driver behaviors to be sensed via, for example, one or more of a camera, passenger presence detector in the seats, or via any other sensor that is capable of determining whether or not a passenger, or a pet, is also present in the vehicle with the driver. The passenger detection and behavior sensor module allows, for example, one or more of the monitoring of the driver watching the road, falling asleep, texting, talking on the phone, being distracted by food or entertainment options, or in general is capable of monitoring any behavior of one or more of the drivers, passengers, pets or cargo in the vehicle.

In some embodiments, the driving vehicle sensors and systems 304 may include other sensors 338 and/or combinations of the sensors 308-336 described above. Additionally or alternatively, one or more of the sensors 308-336 described above may include one or more processors configured to process and/or interpret signals detected by the one or more sensors 308-336. In some embodiments, the processing of at least some sensor information provided by the vehicle sensors and systems 304 may be processed by at least one sensor processor 340. Raw and/or processed sensor data may be stored in a sensor data memory 344 storage medium. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random access memory ("RAM") and/or a read-only memory ("ROM"), which can be programmable, flash-updateable, and/or the like.

In accordance with another exemplary embodiment, this data can be monitored remotely, via an app or on a PC, or the like, in real-time or near real-time, by a parent or other entity to keep track of a new driver's use of Automation Levels. As with the other embodiments discussed herein, any of the information that is monitored by the vehicle can be forwarded to this remote location for monitoring with this remote location optionally being able to provide feedback to the vehicle and the driver.

The vehicle control system 348 may receive processed sensor information from the sensor processor 340 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle. In some embodiments, the vehicle control system 348 may correspond to one or more computing systems that control driving operations of the vehicle 100 in accordance with the Levels of driving autonomy described above. In one embodiment, the vehicle control system 348 may operate a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

The vehicle control system 348 may periodically monitor operation of the vehicle using one or more of the sensors as previously described. The frequency of the monitoring may be on the order of minutes, seconds, milliseconds, or some other time period. Different sensors may be monitored on the same or different frequencies. The frequency of monitoring may vary depending on current or recent sensor levels. For example, an internal microphone may be frequently reading a very low, or quiet, level. Such microphone may be monitored at a lower frequency as a result, while a precipitation sensor may have recently detected rain and may be monitored at a higher frequency as a result.

The vehicle control system 348 may communicate, in real-time, with the driving sensors and systems 304 forming a feedback loop. In particular, upon receiving sensor information describing a condition of targets in the environment surrounding the vehicle 100, the vehicle control system 348 may autonomously make changes to a driving operation of the vehicle 100. The vehicle control system 348 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 304, vehicle control system 348, display devices 372, etc.) may communicate across the communication network 352 to one or more entities 356A-N via a communications subsystem 350 of the vehicle 100. Embodiments of the communications subsystem 350 are described in greater detail in conjunction with FIG. 5. For instance, the navigation sensors 308 may receive global positioning, location, and/or navigational information from a navigation source 356A. In some embodiments, the navigation source 356A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 348 may receive control information from one or more control sources 356B. The control source 356 may provide vehicle control information including autonomous driving control commands, vehicle operation override control commands, and the like. The control source 356 may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356 across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 3B:
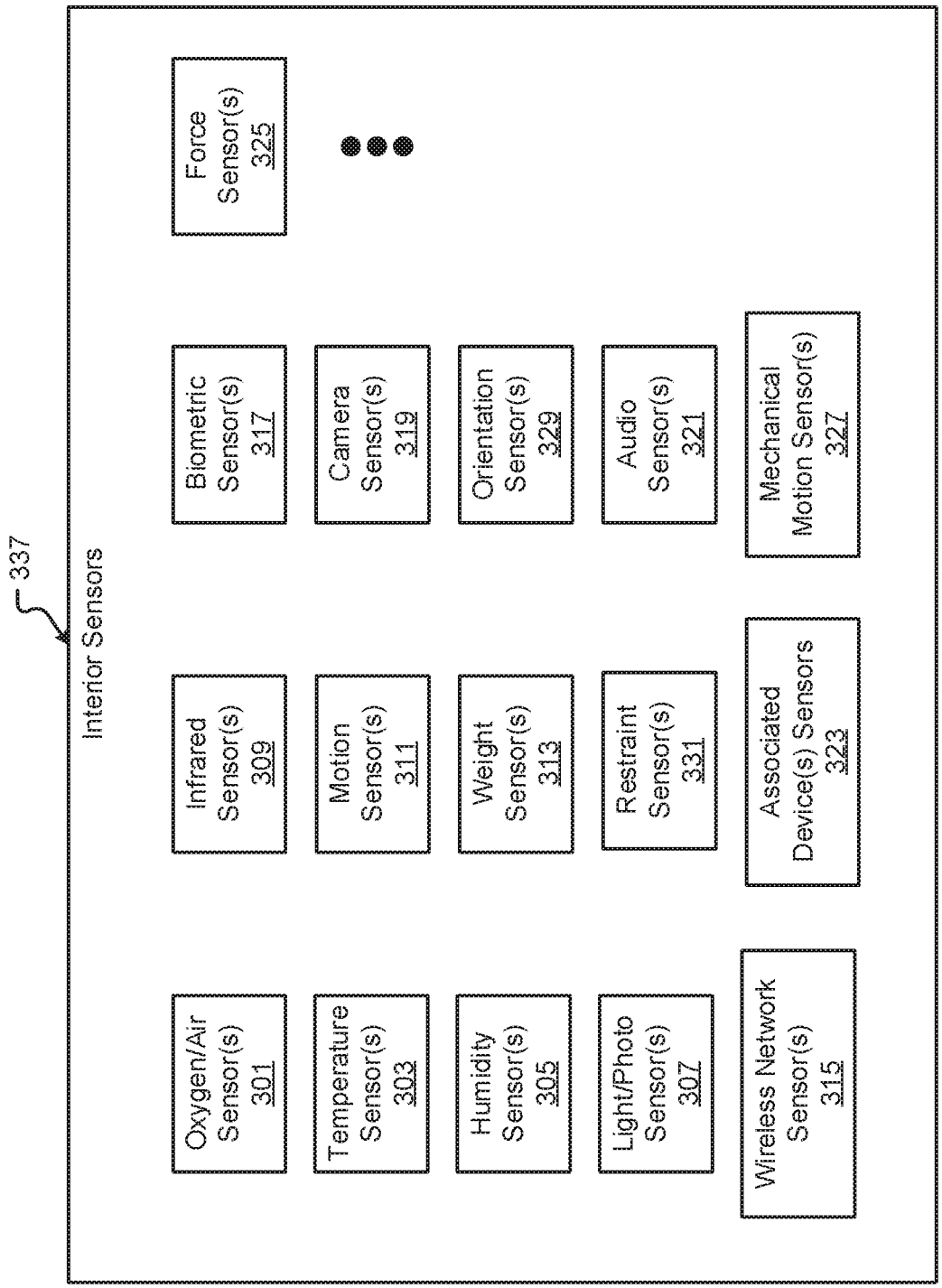
FIG. 3B is a block diagram of an embodiment of interior sensors within the vehicle in accordance with embodiments of the present disclosure.

FIG. 3B shows a block diagram of an embodiment of interior sensors 337 for a vehicle 100. The interior sensors 337 may be arranged into one or more groups, based at least partially on the function of the interior sensors 337. For example, the interior space of a vehicle 100 may include environmental sensors, a user interface sensors, and/or safety sensors. Additionally or alternatively, there may be sensors associated with various devices inside the vehicle (e.g., smart phones, tablets, mobile computers, wearables, etc.)

Environmental sensors may comprise sensors configured to collect data relating to the internal environment of a vehicle 100. Examples of environmental sensors may include one or more of, but are not limited to: oxygen/air sensors 301, temperature sensors 303, humidity sensors 305, light/photo sensors 307, and more. The oxygen/air sensors 301 may be configured to detect a quality or characteristic of the air in the interior space 108 of the vehicle 100 (e.g., ratios and/or types of gasses comprising the air inside the vehicle 100, dangerous gas levels, safe gas levels, etc.). Temperature sensors 303 may be configured to detect temperature readings of one or more objects, users 216, and/or areas of a vehicle 100. Humidity sensors 305 may detect an amount of water vapor present in the air inside the vehicle 100. The light/photo sensors 307 can detect an amount of light present in the vehicle 100. Further, the light/photo sensors 307 may be configured to detect various levels of light intensity associated with light in the vehicle 100.

User interface sensors may comprise sensors configured to collect data relating to one or more users (e.g., a driver and/or passenger(s)) in a vehicle 100. As can be appreciated, the user interface sensors may include sensors that are configured to collect data from users 216 in one or more areas of the vehicle 100. Examples of user interface sensors may include one or more of, but are not limited to: infrared sensors 309, motion sensors 311, weight sensors 313, wireless network sensors 315, biometric sensors 317, camera (or image) sensors 319, audio sensors 321, and more.

Infrared sensors 309 may be used to measure IR light irradiating from at least one surface, user, or another object in the vehicle 100. Among other things, the Infrared sensors 309 may be used to measure temperatures, form images (especially in low light conditions), identify users 216, and even detect motion in the vehicle 100.

The motion sensors 311 may detect motion and/or movement of objects inside the vehicle 104. Optionally, the motion sensors 311 may be used alone or in combination to detect movement. For example, a user may be operating a vehicle 100 (e.g., while driving, etc.) when a passenger in the rear of the vehicle 100 unbuckles a safety belt and proceeds to move about the vehicle 10. In this example, the movement of the passenger could be detected by the motion sensors 311. In response to detecting the movement and/or the direction associated with the movement, the passenger may be prevented from interfacing with and/or accessing at least some of the vehicle control features. As can be appreciated, the user may be alerted of the movement/motion such that the user can act to prevent the passenger from interfering with the vehicle controls. Optionally, the number of motion sensors in a vehicle may be increased to increase an accuracy associated with motion detected in the vehicle 100.

Weight sensors 313 may be employed to collect data relating to objects and/or users in various areas of the vehicle 100. In some cases, the weight sensors 313 may be included in the seats and/or floor of a vehicle 100. Optionally, the vehicle 100 may include a wireless network sensor 315. This sensor 315 may be configured to detect one or more wireless network(s) inside the vehicle 100. Examples of wireless networks may include, but are not limited to, wireless communications utilizing Bluetooth®, Wi-Fi™, ZigBee, IEEE 802.11, and other wireless technology standards. For example, a mobile hotspot may be detected inside the vehicle 100 via the wireless network sensor 315. In this case, the vehicle 100 may determine to utilize and/or share the mobile hotspot detected via/with one or more other devices associated with the vehicle 100.

Biometric sensors 317 may be employed to identify and/or record characteristics associated with a user. It is anticipated that biometric sensors 317 can include at least one of image sensors, IR sensors, fingerprint readers, weight sensors, load cells, force transducers, heart rate monitors, blood pressure monitors, and the like as provided herein.

The camera sensors 319 may record still images, video, and/or combinations thereof. Camera sensors 319 may be used alone or in combination to identify objects, users, and/or other features, inside the vehicle 100. Two or more camera sensors 319 may be used in combination to form, among other things, stereo and/or three-dimensional (3D) images. The stereo images can be recorded and/or used to determine depth associated with objects and/or users in a vehicle 100. Further, the camera sensors 319 used in combination may determine the complex geometry associated with identifying characteristics of a user. For example, the camera sensors 319 may be used to determine dimensions between various features of a user's face (e.g., the depth/distance from a user's nose to a user's cheeks, a linear distance between the center of a user's eyes, and more). These dimensions may be used to verify, record, and even modify characteristics that serve to identify a user. The camera sensors 319 may also be used to determine movement associated with objects and/or users within the vehicle 100. It should be appreciated that the number of image sensors used in a vehicle 100 may be increased to provide greater dimensional accuracy and/or views of a detected image in the vehicle 100.

The audio sensors 321 may be configured to receive audio input from a user of the vehicle 100. The audio input from a user may correspond to voice commands, conversations detected in the vehicle 100, phone calls made in the vehicle 100, and/or other audible expressions made in the vehicle 100. Audio sensors 321 may include, but are not limited to, microphones and other types of acoustic-to-electric transducers or sensors. Optionally, the interior audio sensors 321 may be configured to receive and convert sound waves into an equivalent analog or digital signal. The interior audio sensors 321 may serve to determine one or more locations associated with various sounds in the vehicle 100. The location of the sounds may be determined based on a comparison of volume levels, intensity, and the like, between sounds detected by two or more interior audio sensors 321. For instance, a first audio sensor 321 may be located in a first area of the vehicle 100 and a second audio sensor 321 may be located in a second area of the vehicle 100. If a sound is detected at a first volume level by the first audio sensors 321 A and a second, higher, volume level by the second audio sensors 321 in the second area of the vehicle 100, the sound may be determined to be closer to the second area of the vehicle 100. As can be appreciated, the number of sound receivers used in a vehicle 100 may be increased (e.g., more than two, etc.) to increase measurement accuracy surrounding sound detection and location, or source, of the sound (e.g., via triangulation, etc.).

The safety sensors may comprise sensors configured to collect data relating to the safety of a user and/or one or more components of a vehicle 100. Examples of safety sensors may include one or more of, but are not limited to: force sensors 325, mechanical motion sensors 327, orientation sensors 329, restraint sensors 331, and more.

The force sensors 325 may include one or more sensors inside the vehicle 100 configured to detect a force observed in the vehicle 100. One example of a force sensor 325 may include a force transducer that converts measured forces (e.g., force, weight, pressure, etc.) into output signals. Mechanical motion sensors 327 may correspond to encoders, accelerometers, damped masses, and the like. Optionally, the mechanical motion sensors 327 may be adapted to measure the force of gravity (i.e., G-force) as observed inside the vehicle 100. Measuring the G-force observed inside a vehicle 100 can provide valuable information related to a vehicle's acceleration, deceleration, collisions, and/or forces that may have been suffered by one or more users in the vehicle 100. Orientation sensors 329 can include accelerometers, gyroscopes, magnetic sensors, and the like that are configured to detect an orientation associated with the vehicle 100.

The restraint sensors 331 may correspond to sensors associated with one or more restraint devices and/or systems in a vehicle 100. Seatbelts and airbags are examples of restraint devices and/or systems. As can be appreciated, the restraint devices and/or systems may be associated with one or more sensors that are configured to detect a state of the device/system. The state may include extension, engagement, retraction, disengagement, deployment, and/or other electrical or mechanical conditions associated with the device/system.

The associated device sensors 323 can include any sensors that are associated with a device in the vehicle 100. As previously stated, typical devices may include smart phones, tablets, laptops, mobile computers, and the like. It is anticipated that the various sensors associated with these devices can be employed by the vehicle control system 348. For example, a typical smart phone can include, an image sensor, an IR sensor, audio sensor, gyroscope, accelerometer, wireless network sensor, fingerprint reader, and more. It is an aspect of the present disclosure that one or more of these associated device sensors 323 may be used by one or more subsystems of the vehicle 100.

Figure 3C:
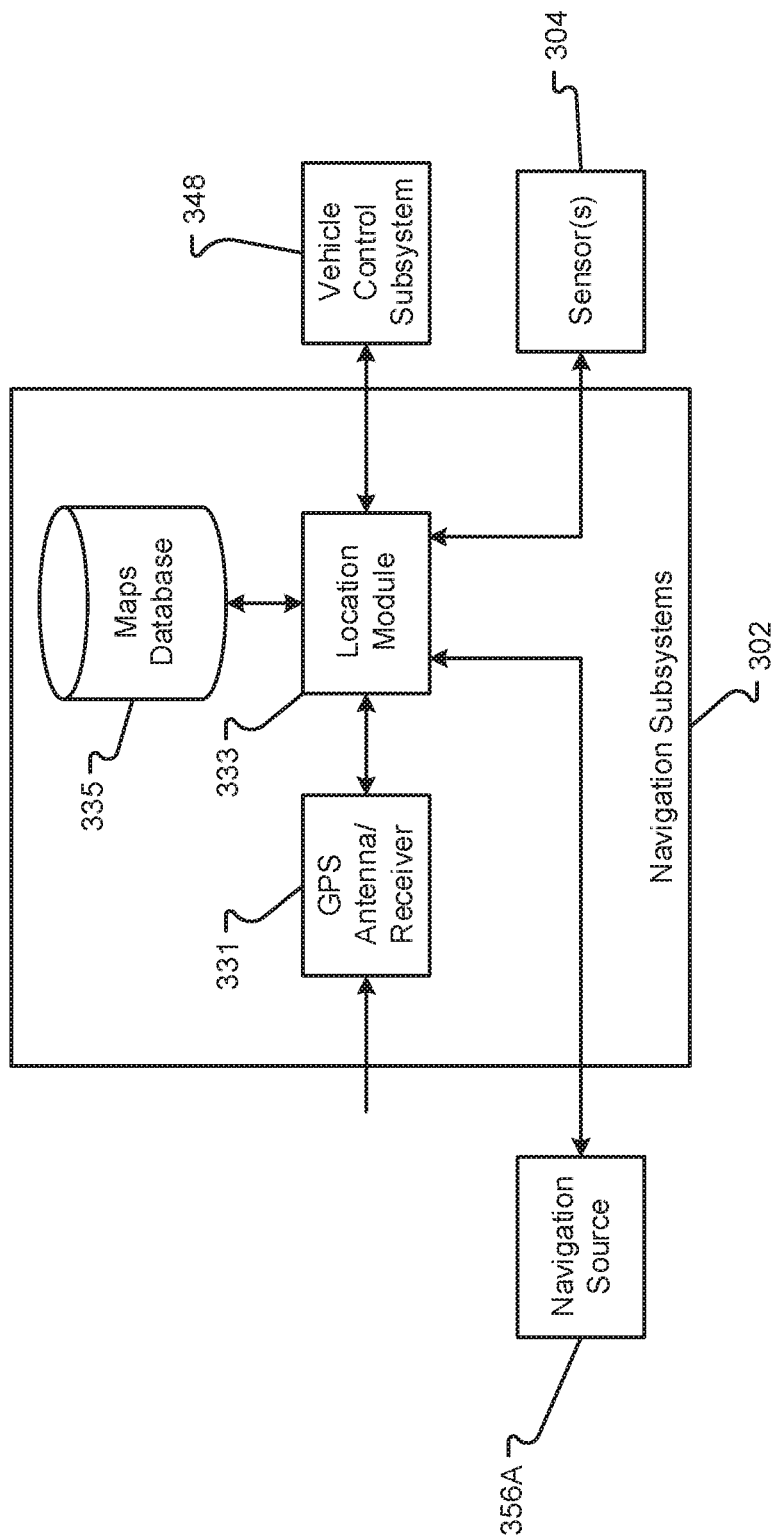
FIG. 3C is a block diagram of an embodiment of a navigation system of the vehicle in accordance with embodiments of the present disclosure.

FIG. 3C illustrates a GPS/Navigation subsystem(s) 302. The navigation subsystem(s) 302 can be any present or future-built navigation system that may use location data, for example, from the Global Positioning System (GPS), to provide navigation information or control the vehicle 100. The navigation subsystem(s) 302 can include several components, such as, one or more of, but not limited to: a GPS Antenna/receiver 331, a location module 333, a maps database 335, etc. Generally, the several components or modules 331-335 may be hardware, software, firmware, computer readable media, or combinations thereof.

A GPS Antenna/receiver 331 can be any antenna, GPS puck, and/or receiver capable of receiving signals from a GPS satellite or other navigation system. The signals may be demodulated, converted, interpreted, etc. by the GPS Antenna/receiver 331 and provided to the location module 333. Thus, the GPS Antenna/receiver 331 may convert the time signals from the GPS system and provide a location (e.g., coordinates on a map) to the location module 333. Alternatively, the location module 333 can interpret the time signals into coordinates or other location information.

The location module 333 can be the controller of the satellite navigation system designed for use in the vehicle 100. The location module 333 can acquire position data, as from the GPS Antenna/receiver 331, to locate the user or vehicle 100 on a road in the unit's map database 335. Using the road database 335, the location module 333 can give directions to other locations along roads also in the database 335. When a GPS signal is not available, the location module 333 may apply dead reckoning to estimate distance data from sensors 304 including one or more of, but not limited to, a speed sensor attached to the drive train of the vehicle 100, a gyroscope, an accelerometer, etc. Additionally or alternatively, the location module 333 may use known locations of Wi-Fi hotspots, cell tower data, etc. to determine the position of the vehicle 100, such as by using time difference of arrival (TDOA) and/or frequency difference of arrival (FDOA) techniques.

The maps database 335 can include any hardware and/or software to store information about maps, geographical information system (GIS) information, location information, etc. The maps database 335 can include any data definition or other structure to store the information. Generally, the maps database 335 can include a road database that may include one or more vector maps of areas of interest. Street names, street numbers, house numbers, and other information can be encoded as geographic coordinates so that the user can find some desired destination by street address. Points of interest (waypoints) can also be stored with their geographic coordinates. For example, a point of interest may include speed cameras, fuel stations, public parking, and "parked here" (or "you parked here") information. The maps database 335 may also include road or street characteristics, for example, speed limits, location of stop lights/stop signs, lane divisions, school locations, etc. The map database contents can be produced or updated by a server connected through a wireless system in communication with the Internet, even as the vehicle 100 is driven along existing streets, yielding an up-to-date map.

Figure 4:
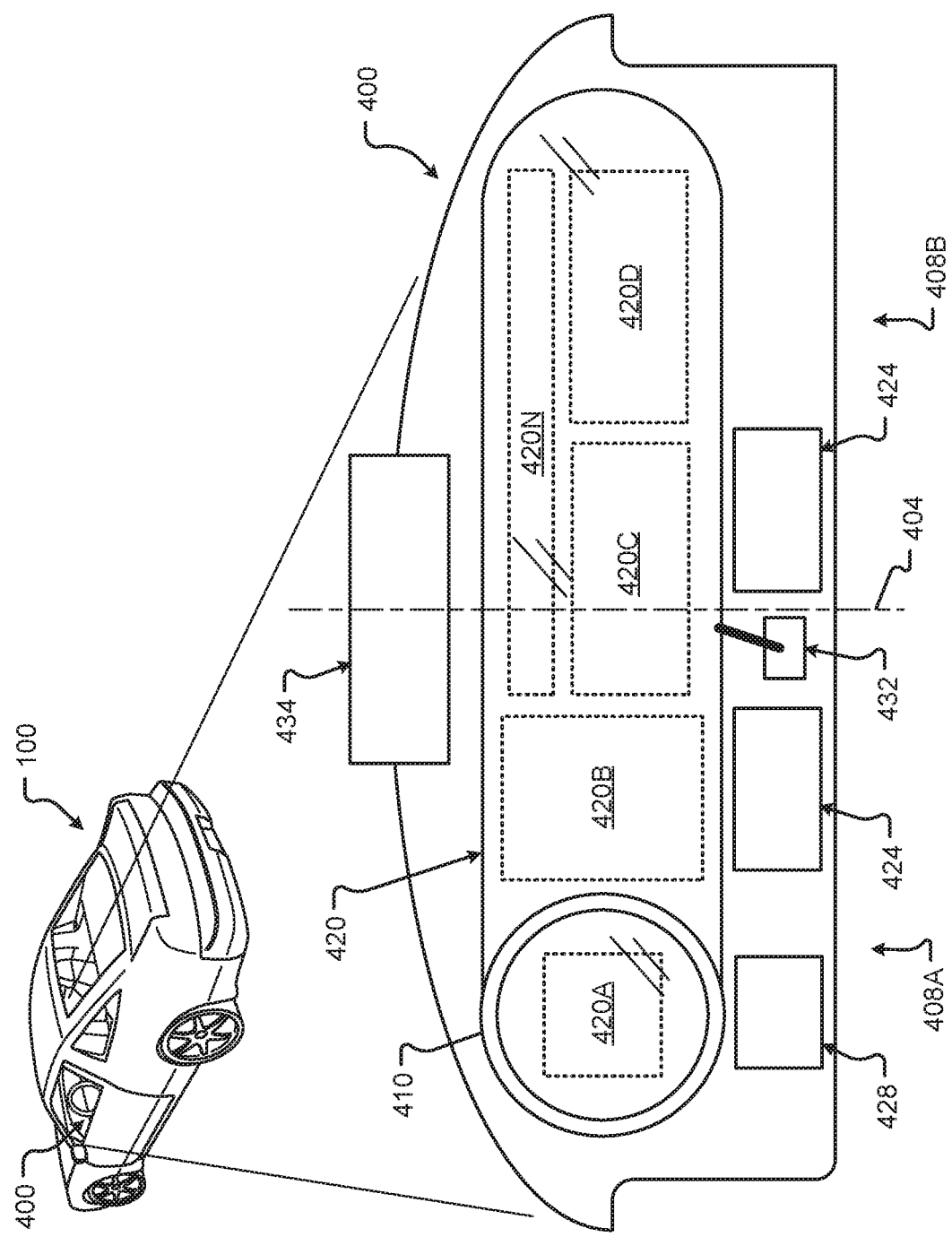
FIG. 4 shows an embodiment of the instrument panel of the vehicle according to one embodiment of the present disclosure.

FIG. 4 shows one embodiment of the instrument panel 400 of the vehicle 100. The instrument panel 400 of vehicle 100 comprises a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information such as route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some embodiments, the input device 432 may be used to manually maneuver a portion of the vehicle 100 into a charging position (e.g., moving a charging plate to a desired separation distance, etc.).

While one or more of displays of instrument panel 400 may be touch-screen displays, it should be appreciated that the vehicle operational display may be a display incapable of receiving touch input. For instance, the operational display 420 that spans across an interior space centerline 404 and across both a first zone 408A and a second zone 408B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 400 may be mobile devices and/or applications residing on a mobile device such as a smart phone. Additionally or alternatively, any of the information described herein may be presented to one or more portions 420A-N of the operational display 420 or other display 424, 428, 434. In one embodiment, one or more displays of the instrument panel 400 may be physically separated or detached from the instrument panel 400. In some cases, a detachable display may remain tethered to the instrument panel.

The portions 420A-N of the operational display 420 may be dynamically reconfigured and/or resized to suit any display of information as described. Additionally or alternatively, the number of portions 420A-N used to visually present information via the operational display 420 may be dynamically increased or decreased as required, and are not limited to the configurations shown.

Figure 5:
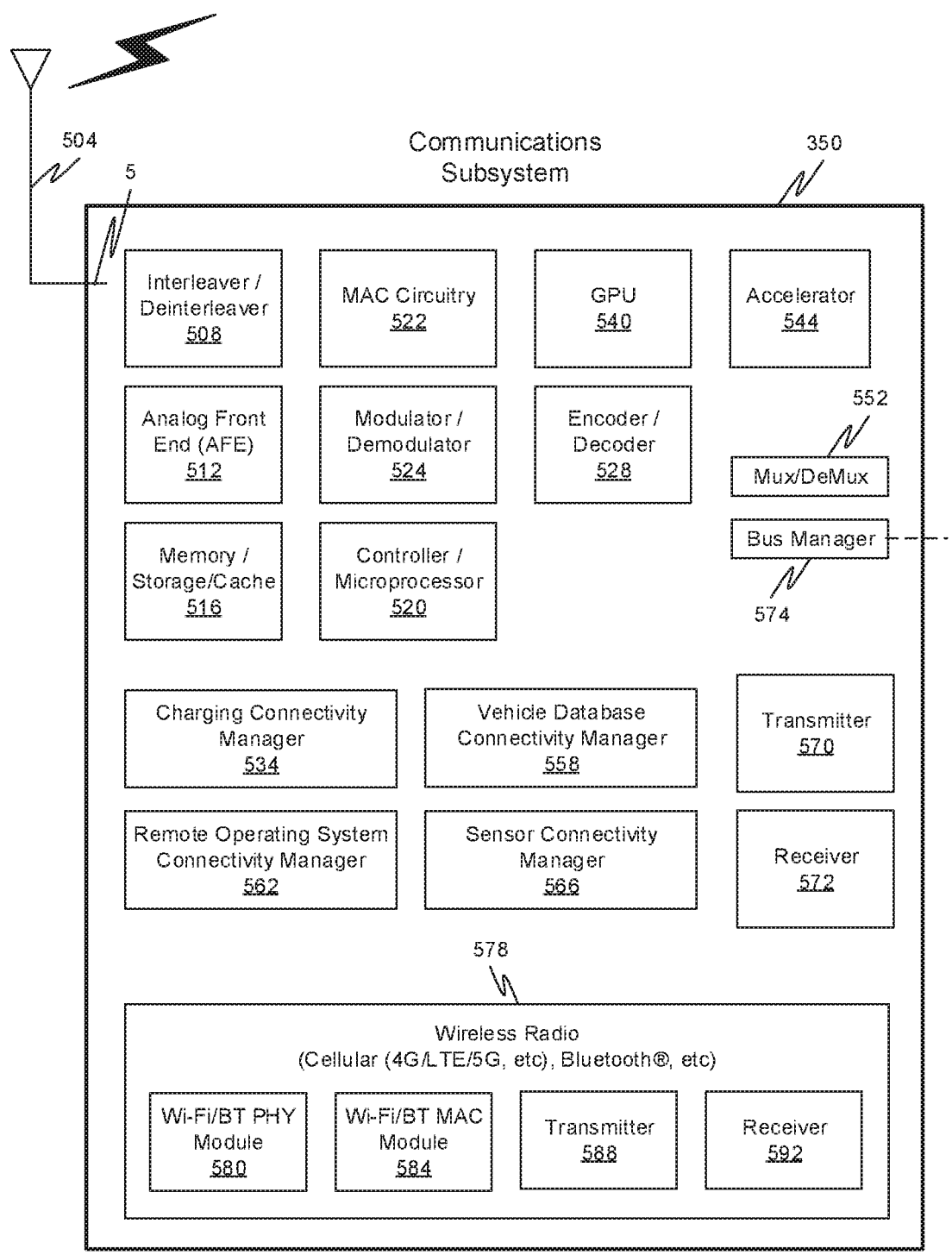
FIG. 5 is a block diagram of an embodiment of a communications subsystem of the vehicle.

FIG. 5 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem 350 can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem 350 can include one or more communications links (that can be wired or wireless) and/or communications busses (managed by the bus manager 574), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem 350 enables communications between any if the inter-vehicle systems and subsystems as well as communications with non-collocated resources, such as those reachable over a network such as the Internet.

The communications subsystem 350, in addition to well-known componentry (which has been omitted for clarity), includes interconnected elements including one or more of: one or more antennas 504, an interleaver/deinterleaver 508, an analog front end (AFE) 512, memory/storage/cache 516, controller/microprocessor 520, MAC circuitry 522, modulator/demodulator 524, encoder/decoder 528, a plurality of connectivity managers 534, 558, 562, 566, GPU 540, accelerator 544, a multiplexer/demultiplexer 552, transmitter 570, receiver 572 and wireless radio 578 components such as a Wi-Fi PHY/Bluetooth® module 580, a Wi-Fi/BT MAC module 584, transmitter 588 and receiver 592. The various elements in the device 350 are connected by one or more links/busses 5 (not shown, again for sake of clarity).

The device 350 can have one more antennas 504, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 504 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 504 generally interact with the Analog Front End (AFE) 512, which is needed to enable the correct processing of the received modulated signal and signal conditioning for a transmitted signal. The AFE 512 can be functionally located between the antenna and a digital baseband system in order to convert the analog signal into a digital signal for processing and vice-versa.

The subsystem 350 can also include a controller/microprocessor 520 and a memory/storage/cache 516. The subsystem 350 can interact with the memory/storage/cache 516 which may store information and operations necessary for configuring and transmitting or receiving the information described herein. The memory/storage/cache 516 may also be used in connection with the execution of application programming or instructions by the controller/microprocessor 520, and for temporary or long term storage of program instructions and/or data. As examples, the memory/storage/cache 520 may comprise a computer-readable device, RAM, ROM, DRAM, SDRAM, and/or other storage device(s) and media.

The controller/microprocessor 520 may comprise a general purpose programmable processor or controller for executing application programming or instructions related to the subsystem 350. Furthermore, the controller/microprocessor 520 can perform operations for configuring and transmitting/receiving information as described herein. The controller/microprocessor 520 may include multiple processor cores, and/or implement multiple virtual processors. Optionally, the controller/microprocessor 520 may include multiple physical processors. By way of example, the controller/microprocessor 520 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 350 can further include a transmitter 570 and receiver 572 which can transmit and receive signals, respectively, to and from other devices, subsystems and/or other destinations using the one or more antennas 504 and/or links/busses. Included in the subsystem 350 circuitry is the medium access control or MAC Circuitry 522. MAC circuitry 522 provides for controlling access to the wireless medium. In an exemplary embodiment, the MAC circuitry 522 may be arranged to contend for the wireless medium and configure frames or packets for communicating over the wired/wireless medium.

The subsystem 350 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 350 also includes a GPU 540, an accelerator 544, a Wi-Fi/BT/BLE PHY module 580 and a Wi-Fi/BT/BLE MAC module 584 and wireless transmitter 588 and receiver 592. In some embodiments, the GPU 540 may be a graphics processing unit, or visual processing unit, comprising at least one circuit and/or chip that manipulates and changes memory to accelerate the creation of images in a frame buffer for output to at least one display device. The GPU 540 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 534, 558, 562, 566 manage and/or coordinate communications between the subsystem 350 and one or more of the systems disclosed herein and one or more other devices/systems. The connectivity managers 534, 558, 562, 566 include a charging connectivity manager 534, a vehicle database connectivity manager 558, a remote operating system connectivity manager 562, and a sensor connectivity manager 566.

The charging connectivity manager 534 can coordinate not only the physical connectivity between the vehicle 100 and a charging device/vehicle, but can also communicate with one or more of a power management controller, one or more third parties and optionally a billing system(s). As an example, the vehicle 100 can establish communications with the charging device/vehicle to one or more of coordinate interconnectivity between the two (e.g., by spatially aligning the charging receptacle on the vehicle with the charger on the charging vehicle) and optionally share navigation information. Once charging is complete, the amount of charge provided can be tracked and optionally forwarded to, for example, a third party for billing. In addition to being able to manage connectivity for the exchange of power, the charging connectivity manager 534 can also communicate information, such as billing information to the charging vehicle and/or a third party. This billing information could be, for example, the owner of the vehicle, the driver/occupant(s) of the vehicle, company information, or in general any information usable to charge the appropriate entity for the power received.

The vehicle database connectivity manager 558 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general any information stored in the vehicle database can optionally be shared with any one or more other devices optionally subject to any privacy or confidentially restrictions.

The remote operating system connectivity manager 562 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 566 facilitates communications between any one or more of the vehicle sensors (e.g., the driving vehicle sensors and systems 304, etc.) and any one or more of the other vehicle systems. The sensor connectivity manager 566 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (internet protocol) address(es), associated with the vehicle and one or other system or subsystems or components therein. These identifiers can be used in conjunction with any one or more of the connectivity managers as discussed herein.

Figure 6:
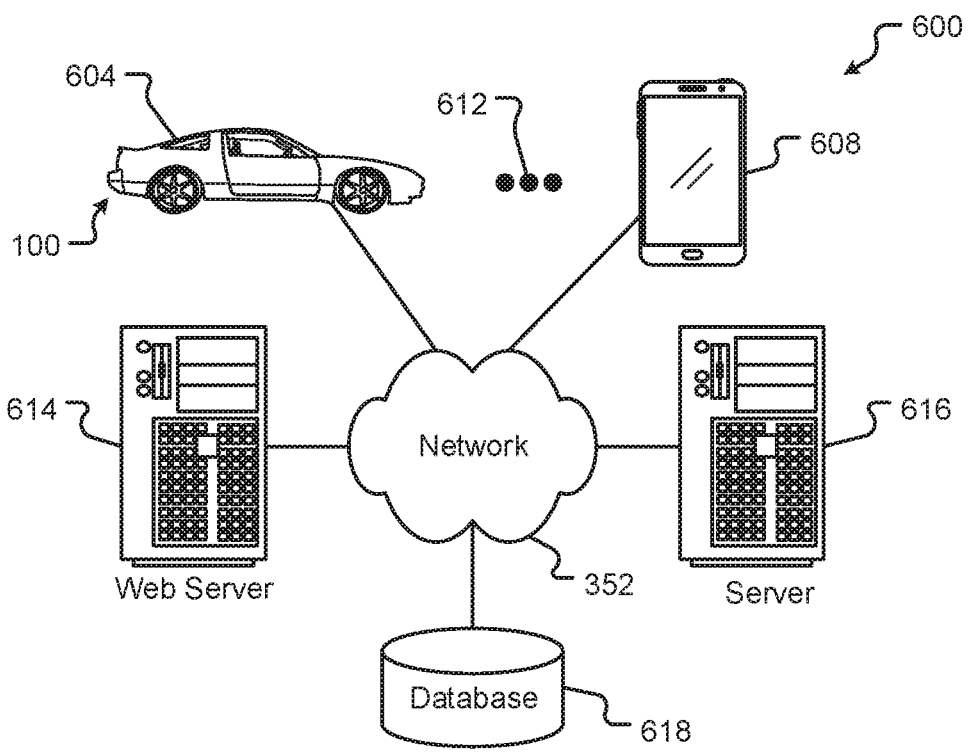
FIG. 6 is a block diagram of a computing environment associated with the embodiments presented herein.

FIG. 6 illustrates a block diagram of a computing environment 600 that may function as the servers, user computers, or other systems provided and described herein. The computing environment 600 includes one or more user computers, or computing devices, such as a vehicle computing device 604, a communication device 608, and/or more 612. The computing devices 604, 608, 612 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 604, 608, 612 may also have any of a variety of applications, including for example, database client and/or server applications, and web browser applications. Alternatively, the computing devices 604, 608, 612 may be any other electronic device, such as a thin-client computer, Internet-enabled mobile telephone, and/or personal digital assistant, capable of communicating via a network 352 and/or displaying and navigating web pages or other types of electronic documents. Although the exemplary computing environment 600 is shown with two computing devices, any number of user computers or computing devices may be supported.

The computing environment 600 may also include one or more servers 614, 616. In this example, server 614 is shown as a web server and server 616 is shown as an application server. The web server 614, which may be used to process requests for web pages or other electronic documents from computing devices 604, 608, 612. The web server 614 can be running an operating system including any of those discussed above, as well as any commercially-available server operating systems. The web server 614 can also run a variety of server applications, including SIP (Session Initiation Protocol) servers, HTTP(s) servers, FTP servers, CGI servers, database servers, Java servers, and the like. In some instances, the web server 614 may publish operations available operations as one or more web services.

The computing environment 600 may also include one or more file and or/application servers 616, which can, in addition to an operating system, include one or more applications accessible by a client running on one or more of the computing devices 604, 608, 612. The server(s) 616 and/or 614 may be one or more general purpose computers capable of executing programs or scripts in response to the computing devices 604, 608, 612. As one example, the server 616, 614 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 616 may also include database servers, including without limitation those commercially available from Oracle®, Microsoft®, Sybase®, IBM® and the like, which can process requests from database clients running on a computing device 604, 608, 612.

The web pages created by the server 614 and/or 616 may be forwarded to a computing device 604, 608, 612 via a web (file) server 614, 616. Similarly, the web server 614 may be able to receive web page requests, web services invocations, and/or input data from a computing device 604, 608, 612 (e.g., a user computer, etc.) and can forward the web page requests and/or input data to the web (application) server 616. In further embodiments, the server 616 may function as a file server. Although for ease of description, FIG. 6 illustrates a separate web server 614 and file/application server 616, those skilled in the art will recognize that the functions described with respect to servers 614, 616 may be performed by a single server and/or a plurality of specialized servers, depending on implementation-specific needs and parameters. The computer systems 604, 608, 612, web (file) server 614 and/or web (application) server 616 may function as the system, devices, or components described in FIGS. 1-6.

The computing environment 600 may also include a database 618. The database 618 may reside in a variety of locations. By way of example, database 618 may reside on a storage medium local to (and/or resident in) one or more of the computers 604, 608, 612, 614, 616. Alternatively, it may be remote from any or all of the computers 604, 608, 612, 614, 616, and in communication (e.g., via the network 352) with one or more of these. The database 618 may reside in a storage-area network ("SAN") familiar to those skilled in the art. Similarly, any necessary files for performing the functions attributed to the computers 604, 608, 612, 614, 616 may be stored locally on the respective computer and/or remotely, as appropriate. The database 618 may be a relational database, such as Oracle 20i®, that is adapted to store, update, and retrieve data in response to SQL-formatted commands.

Figure 7:
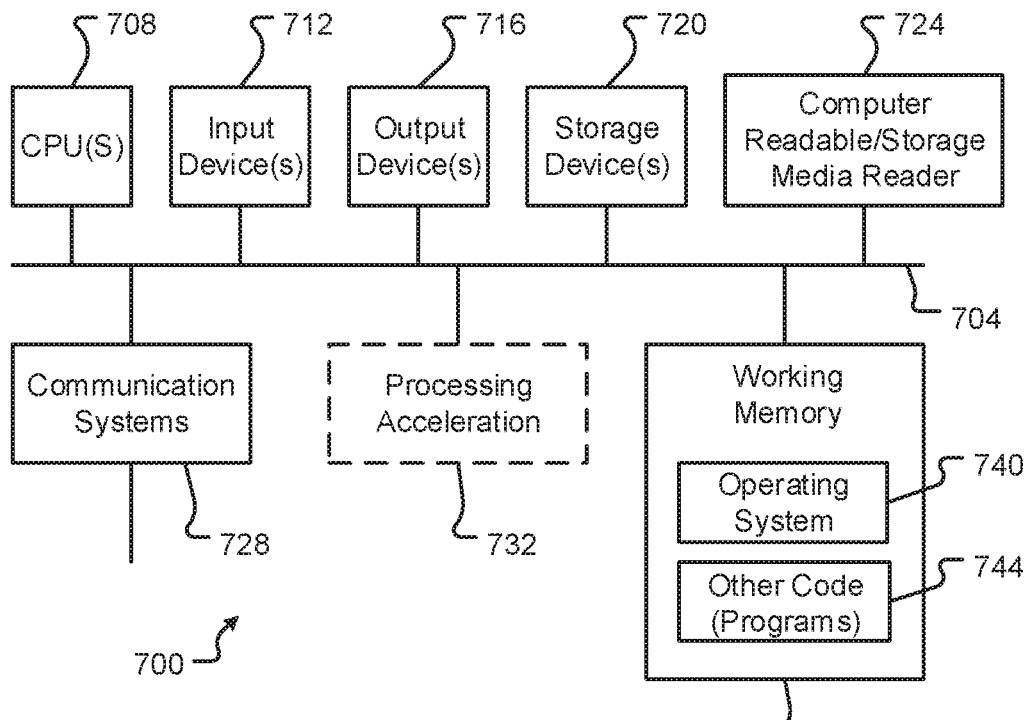
FIG. 7 is a block diagram of a computing device associated with one or more components described herein.

FIG. 7 illustrates one embodiment of a computer system 700 upon which the servers, user computers, computing devices, or other systems or components described above may be deployed or executed. The computer system 700 is shown comprising hardware elements that may be electrically coupled via a bus 704. The hardware elements may include one or more central processing units (CPUs) 708; one or more input devices 712 (e.g., a mouse, a keyboard, etc.); and one or more output devices 716 (e.g., a display device, a printer, etc.). The computer system 700 may also include one or more storage devices 720. By way of example, storage device(s) 720 may be disk drives, optical storage devices, solid-state storage devices such as a random access memory ("RAM") and/or a read-only memory ("ROM"), which can be programmable, flash-updateable and/or the like.

The computer system 700 may additionally include a computer-readable storage media reader 724; a communications system 728 (e.g., a modem, a network card (wireless or wired), an infra-red communication device, etc.); and working memory 736, which may include RAM and ROM devices as described above. The computer system 700 may also include a processing acceleration unit 732, which can include a DSP, a special-purpose processor, and/or the like.

The computer-readable storage media reader 724 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 728 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 736, including an operating system 740 and/or other code 744. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 340, 708 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The disclosure presented herein provides a means for a vehicle system to detect a need for a change in the Driver Level as discussed herein, automatically initiate a change in the Driver Level or suggest the manual-initiation of a suggested Driver Level to a user, track the use of each Driver Level, and/or inform third-party entities regarding the use of each Driver Level.

Automation Levels

As discussed above, the vehicle may include a number of sensors, devices, and/or systems that are capable of assisting in driving operations. The vehicle sensors and systems may be selected and/or configured to suit a level of operation associated with the vehicle. Among other things, the sensors and systems may be part of one or more advanced driver assistance systems (ADAS) associated with a vehicle. In any event, the sensors and systems may be used to provide driving assistance at any level of operation (e.g., ranging between fully-manual to fully-autonomous operations and variations there-between, etc.) as described herein.

The various levels of vehicle control and/or operation may be described as corresponding to a level of autonomy associated with a vehicle for vehicle driving operations. For instance, as discussed above, at Automation Level 0, or fully-manual driving operations, a driver (e.g., a human driver) may be responsible for all the driving control operations (e.g., steering, accelerating, braking, etc.) associated with the vehicle. Automation Level 0 may be referred to as a "No Automation" or a "Fully-Manual" level.

At Automation Level 1, the vehicle may be responsible for a limited number of the driving operations associated with the vehicle, while the driver is still responsible for most driving control operations. An example of a vehicle operating at Automation Level 1 may include a vehicle in which the throttle control and/or braking operations may be controlled by the vehicle (e.g., cruise control operations, etc.). Automation Level 1 may be referred to as a "Driver Assistance" level.

At Automation Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 Automation Level, the driver may be required to perform other aspects of driving operations not controlled by the vehicle. Automation Level 2 may be referred to as a "Partial Automation" level. It should be appreciated that Automation Levels 0-2 all involve the driver monitoring in some way the driving operations of the vehicle.

At Automation Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level.

At Automation Level 4, the driver may be separated from controlling all the driving operations of the vehicle and the vehicle may control driving operations even when a user fails to respond to a request to intervene. Automation Level 4 may be referred to as a "High Automation" level.

At Automation Level 5, the vehicle can control all the driving operations associated with the vehicle in all driving modes. The vehicle in Level 5 may continually monitor traffic, vehicular, roadway, and/or environmental conditions while driving the vehicle. In Automation Level 5, there is no human driver interaction required in any driving mode. Accordingly, Automation Level 5 may be referred to as a "Full Automation" level. It should be appreciated that in Automation Levels 3-5 the vehicle, and/or one or more automated driving systems associated with the vehicle, monitors the driving operations of the vehicle and the driving environment.

The levels of driving operation may be manually selected or shifted by the driver through via a user interface in the vehicle.

The levels of driving operation may also be selected automatically for a driver by a processor of the vehicle. This automatic selection may be executed based on a number of factors. For example, a risk score may be assigned and adjusted during travel. The risk score may be preassigned to particular stretches of road based on GPS information. The risk score may be adjusted based on information gathered from onboard sensors. For example, if precipitation is detected, the risk score for the current time may be increased. Likewise, if heavy traffic is detected, the risk score may be increased. The risk score may be adjusted based on information gathered via an internet connection. For example, a connection to Google Maps may show heavy traffic, or a connection to a weather website may inform the onboard computer of rain, ice or snow.

When a processor of the vehicle selects a driving operation level for the driver, the vehicle may automatically change into that driving operation level. Alternatively, the vehicle may present the driver with a notification suggesting such a change. For example, a user interface display may display a window suggesting the change along with a button for the driver to quickly select the new driving level.

The Automation Level used by the vehicle may be tracked and recorded and stored for statistical analysis or other purposes as discussed herein. The vehicle system may be operable to detect particular scenarios in which a particular Automation Level may be desirable.

By automatically switching between Automation Levels or by suggesting to a driver a particular Automation Level, a vehicle may be operated in a more efficient and safe manner. For example, a driver may be unaware of his inability to properly control the vehicle. Vehicles requiring manual initiation of an ADA system will likely result in an under-utilization of ADA capabilities. On the other hand, if a vehicle forces a driver into autonomous mode, the vehicle may be over-utilizing its ADA capabilities, severely impacting a driver's enjoyment of driving the vehicle.

As a first example, in good weather and on straight and flat roads or smooth roads with easy curves, a driver may enjoy using the vehicle in a fully manual mode, or Automation Level 0 as discussed above.

At Automation Level 0, or fully-manual driving operations, a driver (e.g., a human driver) may be responsible for all the driving control operations (e.g., steering, accelerating, braking, etc.) associated with the vehicle. Automation Level 0 may be referred to as a "No Automation" or a "Fully-Manual" level. As an example, if a driver is operating a vehicle at a higher Automation Level, e.g. Automation Level 4, in a high risk scenario, e.g. down a hill during a rainstorm, if the sensors onboard the vehicle detect the road has flattened out and the rain has stopped, the vehicle system may suggest a change to Automation Level 0 in which the Driver may regain full control of the vehicle.

As a second example, in some less than ideal situations the vehicle may suggest or automatically change to Automation Level 1. At Automation Level 1, the vehicle may be responsible for a limited number of the driving operations associated with the vehicle, while the driver is still responsible for most driving control operations. An example of a vehicle operating at Automation Level 1 may include a vehicle in which the throttle control and/or braking operations may be controlled by the vehicle (e.g., cruise control operations, etc.). Automation Level 1 may be referred to as a "Driver Assistance" level.

Automation Level 1 may be triggered when a scenario such as a steep incline or steep decline is detected via the onboard sensors. If a driver of a vehicle using Automation Level 0 approaches a steep hill, the vehicle may suggest or automatically switch to Automation Level 1. Whether the vehicle automatically switches or merely suggests the change may depend on a number of factors, for example, a user may set settings or the vehicle system may be operable to detect the severity of the situation. As an example, a vehicle travelling at a high speed towards a steep incline, as detected by the onboard sensors, may determine a driver will lack sufficient time to review the suggestion and the vehicle system may determine the optimal response would be to automatically switch to the new Automation Level.

In some situations, the vehicle system may determine Automation Level 2 is optimal based on a determined scenario. As discussed above, at Automation Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 Automation Level, the driver may be required to perform aspects of driving operations not controlled by the vehicle. Automation Level 2 may be referred to as a "Partial Automation" level. It should be appreciated that Automation Levels 0-2 all involve the driver monitoring in some way the driving operations of the vehicle.

In other situations, the vehicle system may determine Automation Level 3 is optimal based on a determined scenario. At Automation Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level.

In other situations, the vehicle system may determine Automation Level 4 is optimal based on a determined scenario. At Automation Level 4, the driver may be separated from controlling all the driving operations of the vehicle and the vehicle may control driving operations even when a user fails to respond to a request to intervene. Automation Level 4 may be referred to as a "High Automation" level.

Finally, in extreme scenarios, a driver may be provided a suggestion to switch into fully autonomous mode, or Automation Level 5. At Automation Level 5, a vehicle may take over all aspects of driving and operate without any expectation of input from a driver. In the most extreme scenarios, a vehicle may automatically switch into Automation Level 5, without first suggesting the switch to the user.

At Automation Level 5, the vehicle can control all the driving operations associated with the vehicle in all driving modes. The vehicle in Level 5 may continually monitor traffic, vehicular, roadway, and/or environmental conditions while driving the vehicle. In Automation Level 5, there is no human driver interaction required in any driving mode. Accordingly, Automation Level 5 may be referred to as a "Full Automation" level. It should be appreciated that in Automation Levels 3-5 the vehicle, and/or one or more automated driving systems associated with the vehicle, monitors the driving operations of the vehicle and the driving environment.

An optimum Automation Level may be determined by assigning a risk score to particular sensor measurements and detected situations. For example, a straight and flat road as detected by onboard sensors may be assigned a risk score of 0, while moderate rain as detected by onboard precipitation sensors may be assigned a risk score of 15. Other sources of information may be used to gather data affecting risk scores. For example, an internet connection may access a weather information source and determine roads are icy. Alternatively, an internet connection may access a traffic information source and determine, in combination with infomraiton from the GPS, that the vehicle is travelling through heavy traffic. Icy roads may be assigned, for example, a risk score of 40, while heavy traffic may be assigned a risk score of 20. The magnitude of various risk scores may be adjusted based on user preference via an onboard user interface. By totaling the risk scores as determined by the onboard sensors and other sources of information, a total risk score may be calculated. As illustrated in FIG. 12, further described below, this risk score may be used to select an optimum Automation Level.

The vehicle system may, after determining an optimal Automation Level, determine whether to suggest a change to the driver or automatically change to the optimal Automation Level. In some embodiments, a change from a higher Automation Level to a lower Automation Level may never be made automatically. For example, a vehicle travelling in Automation Level 5 may not automatically change to Automation Level 0 as a driver may not be aware of the situation. In those circumstances, a driver may be presented with a notification on a HUD display stating the optimum Automation Level and a button may be presented to the driver allowing for a quick change into the optimum Automation Level.

As illustrated in FIG. 12, further described below, the risk score may be used both to select an optimum Automation Level as well as determine whether to automatically switch to the optimum Automation Level or to merely suggest to the user to make the switch. The risk scores and levels amounting to a particular optimum Automation Level may be customized by a driver based on his or her personal preferences.

Typically a large increase in risk score would result in an auto-switch, regardless of the total risk score. For example, switching from risk score 20 to risk score 52, based on weather and noise levels in the car, while the chart shows a reaction of suggest AL5, the system may simply auto-switch. Smaller increases, for example from risk score 50 to risk score 56 would likely be a suggestion as opposed to auto-switch.

Database and Communication

The use by a driver of Automation Levels may be tracked and recorded by the vehicle system. For example, a database may be created and stored on a memory device onboard the vehicle.

In some embodiments, upon vehicle startup, a database entry may be created, recording a timestamp, a Driver Identification (Driver ID), an Automation Level, and a change type (e.g., vehicle startup, a manual change made by the driver, a suggested change accepted by the driver, a suggested changed declined by the driver, or an automatic change initiated by the vehicle system). Other data may be included in each database entry, for example, vehicle manufacturer information and/or driver insurance information.

Figure 8:
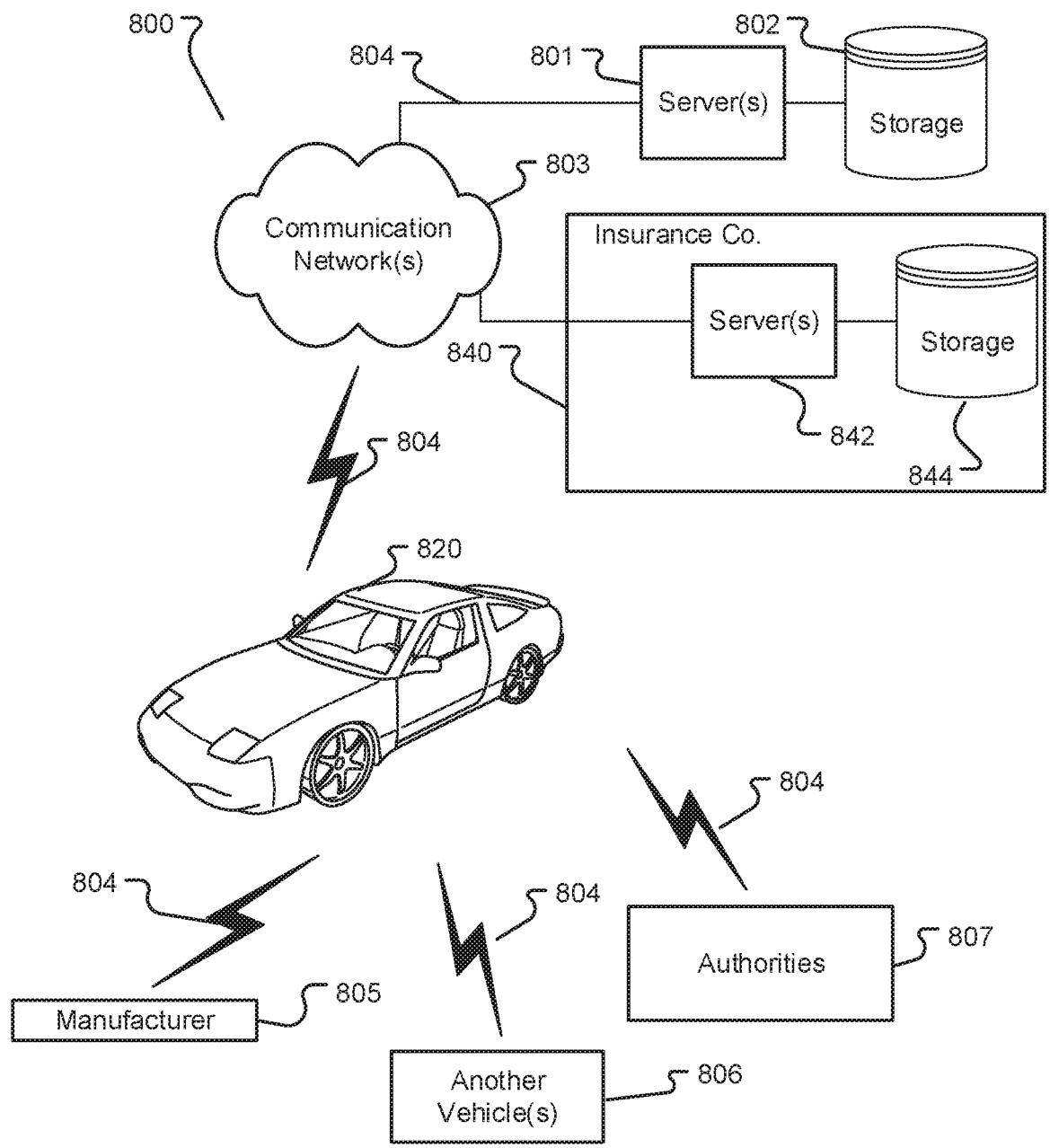
FIG. 8 is a block diagram of an embodiment of a communications system of the vehicle.

FIG. 8 illustrates an exemplary vehicle monitoring system 800. The vehicle monitoring system 800 may include a vehicle 820, an insurance entity 840, one or more optional servers 801 and storage 802, optionally one or more other vehicles 806, and optionally authorities, all of which can be interconnected via one or more wired or wireless links 804 and communication network(s) 803. Alternatively, or additionally, a manufacturer 805 may communicate with the vehicle 820 via the communication network(s) 803 in order to receive analytical data regarding use of Automation Levels as well as communicate updates to the vehicle system, etc.

The vehicle 820 may be as illustrated in FIG. 1 and comprise one or more of the driving vehicle sensors as described in FIG. 3A-C.

The insurance company or entity 840 includes one or more servers 842 and storage 844 all interconnected via one or more links. The servers 801 and storage 802 can be associated with any of the exemplary entities that are capable of accessing information in the vehicle and/or the insurance company being law enforcement agencies, other insurance entities, other drivers, or the like. As will be appreciated, however, some of the information stored in the various storage locations may be sensitive and therefore access thereto may be limited.

In accordance with an optional exemplary embodiment, the vehicle 820 can transmit its information to one or more other entities, such as the insurance company 840, at a predetermined time during the day, such as during low network-traffic times in the middle of the night, and/or utilize, for example, a high-speed network communication link associated with the driver's home for uploading the data. For example, upon the vehicle 820 returning to the driver's home, the communication module as described in FIG. 3A can detect that the driver's home Wi-Fi is range and commence the appropriate procedures to logon to the Wi-Fi and begin transmission of one or more portions of the data stored in storage to another entity, such as insurance company 840.

In accordance with another exemplary embodiment, instead of this information being forwarded to the other entity, the reputation information is stored in storage onboard the vehicle 820, and at a later time, and in cooperation with the communication module illustrated in FIG. 3A, sent to, for example, a central repository that can optionally be queried by one or more entities. The information stored in the central repository could also optionally be pushed to the vehicle that the reputation information was associated with and optionally stored in that vehicle's storage.

In some embodiments, a database of Automation Levels may be shared with a third party. For example, it may be beneficial for data to be shared with an insurance company.

FIG. 9 illustrates an example database 900 which may be used to monitor the use of automated driving modes. Such a database may be stored in memory or memory storage on the vehicle or stored remotely and updated by the vehicle system via a network connection.

A database 900 may comprise information including a Driver ID 901 used to identify a driver of the vehicle. The driver may be identified automatically based on information such as weight, driving characteristics, a retina scan, fingerprint data, voice profile, or other biometric data, or manually via a login system, such as a button pressed by the driver identifying him or herself.

The database 900 may further comprise Manufacturer ID information 902 which may be used by third parties to identify a make and/or model of the vehicle.

The database 900 may further comprise a timestamp 903 indicating the day and/or time of a change in driving mode. Such information may be used to determine the amount of time spent in each driving mode.

The database 900 may further comprise an entry for a level information 904 indicating the level of automation or driving level initiated at the time of the entry.

The database 900 may further comprise an entry for a type information 905 indicating a type of switch in the driving level. For example, upon the vehicle starting up, a database entry may be generated indicating the driving level being used at the time the vehicle starts. An "AUTO" entry may signify the switch was made automatically, while a "MANUAL" entry may indicate the entry was made manually by the driver. The "TYPE" information may also include whether a suggested change was accepted or declined by the driver. For example, an entry may state a level and under a column for TYPE, the information may state "Declined." This may be used by a manufacturer to determine whether the suggestions are being accepted by users, and by insurance companies to determine whether the drivers are operating vehicles in the most safe manner.

The database 900 may further comprise an entry for an insurance ID 906. For example, each driver may have a personal insurance policy. By including an insurance ID information with each database entry, an insurance company or other third party may more easily identify relevant information.

The database 900 may further comprise an entry for a context 907 of the driving level change. For example, upon vehicle startup, the context may merely show that the change was made due to a startup of the vehicle. Other changes may be labelled for historical and analytical purposes, such as in entry 910, discussed below, when a level was auto changed to automation level 3 due to cabin noise as indicated in the context column. Insurance companies may use this information to determine whether a driver was in some way responsible for the automatic or suggested change in automation level and whether the driver accepted the suggested change.

The database 900 may comprise a number of database entries, for example database entry 910 may show that a driver "ALEX" started the car at driver level 2 on Feb. 2, 2015 at 12:47 and that the driver "ALEX" has an insurance policy associated with the insurance ID of 813243. Database entry 911 may show that driver "ALEX" manually switched into driver level 0, or "fully-manual" at 12:49 as a result of user preference. Database entry 920 may show that a driver "BILLY" started the vehicle on Feb. 3, 2015 at 7:52 in the fully manual driver level.

FIGS. 10A and 10B illustrate exemplary data packets which may be sent from a vehicle via a network to a third party to update an externally stored database.

For example in FIG. 10A, a packet 1010 may comprise a driver ID entry 1011, a manufacturer ID entry 1012, a timestamp entry 1013, a driver level 1014, a switch type entry 1015, a driver context 1018 of the switch, an insurance ID entry 1016, and possibly entries 1017 for other information.

FIG. 10B illustrates an exemplary packet 1020 for use by a manufacturer or an insurance company representing a manufacturer. Such a packet 1020 may operate to update a database without "Driver ID" information for privacy reasons. Such a packet 1020 may comprise a manufacturer ID entry 1022, a timestamp entry 1023, a driver level 1024, a switch type entry 1025, an insurance ID entry 1026 and possibly entries 1027 for other information.

FIGS. 11A and 11B illustrate exemplary databases which may be stored and accessible by third parties. Such databases may comprise data associated with the driving modes/levels used by a number of drivers of a number of vehicles. For example, FIG. 11A illustrates an exemplary database which may comprise information associated with a driver ID entry 1111, a vehicle ID entry 1112, a timestamp entry 1113, a driver level 1114, a switch type entry 1115, and an insurance ID entry 1116.

FIG. 11B illustrates an exemplary database associated with information regarding a vehicle manufacturer insurance policy. Such a database may comprise information associated with a manufacturer ID entry 1121, a vehicle ID entry 1122, a timestamp entry 1123, a driver level 1124, a switch type entry 1125, an insurance ID entry 1126.

Data may be collected such that roads which appear to be normal may be identified as especially dangerous in one way or another. FIG. 12 illustrates an example table 1200 which may be used to determine a response to a vehicle entering a segment of road with a particular risk score. For example, the table may comprise data fields for a risk score range 1201, an optimum driving level 1202, and a reaction 1203. For example, a vehicle determining a current road segment is within a range of risk scores from 0-10 (a low risk category of road) may suggest to a driver to switch to an automation level of 0, or fully manual. If a vehicle system determines a current road segment is within a higher category of risk, e.g. 31-35, the vehicle system may suggest the driver switch to automation level 3. If a vehicle system determines the current category of risk is very high, e.g. 56-60, the system may determine the proper reaction is to automatically switch to automation level 5 (i.e. fully automated).

The risk scores may be calculated by measuring readings from a number of onboard sensors either alone or in combination with information from other sources. FIG. 13 illustrates an exemplary table 1300 of current sensor readings showing a number of sensors 1301 and their associated measurements 1302. As illustrated in FIG. 13, a sensor ID of S3 reads 4.2. Each sensor may have its own range of thresholds and risk categories. For example, a sensor monitoring internal cabin noise of a vehicle may have a number of ranges such as 0-10 indicating a quiet cabin, 11-20 indicating a typically noisy cabin, and 21-30 indicating an unusually noisy cabin. The range 0-10 may be assigned a risk modifier of +0, while the range 11-20 may be assigned a risk modifier of +10 and the range 21-30 may be assigned a risk modifier of +20. Such modifiers may be applied to an overall risk score used to determine the optimum driving level.

Figure 14A:
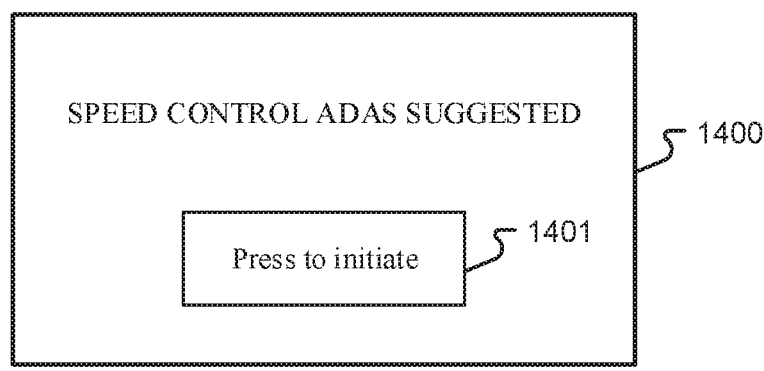
FIG. 14A is an illustration of an exemplary user interface in accordance with the systems presented herein.
Figure 14B:
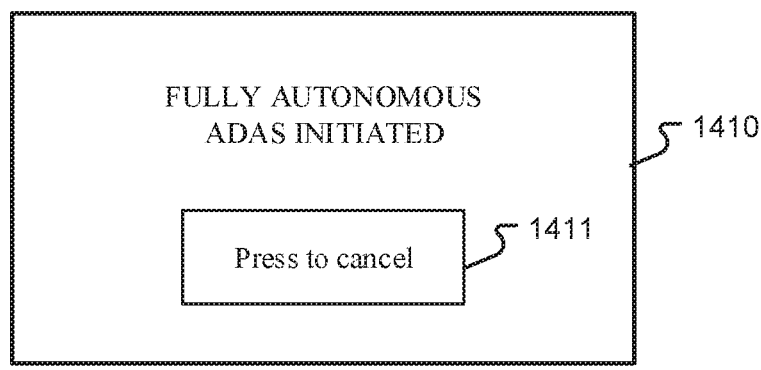
FIG. 14B is an illustration of an exemplary user interface in accordance with the systems presented herein.

FIGS. 14A and 14B illustrate exemplary embodiments of user interface presentations displaying driver level switch information on a display. Such a presentation may be displayed on a display as for example one or more of the displays illustrated in FIG. 4.

As illustrated in FIG. 14A, when a vehicle system determines a new driver level should be suggested to the driver, a UI display 1400 may appear on a screen in view of the driver. Via the UI display 1400, the driver may be able to select a button 1401 to initiate the suggested driver level.

As illustrated in FIG. 14B, when a vehicle system determines a new driver level should be automatically initiated, a UI display 1410 may appear on a screen in view of the driver. Via the UI display 1410, the driver may be able to select a button 1411 to cancel the automatic initiation of the determined driver level.

Figure 15:
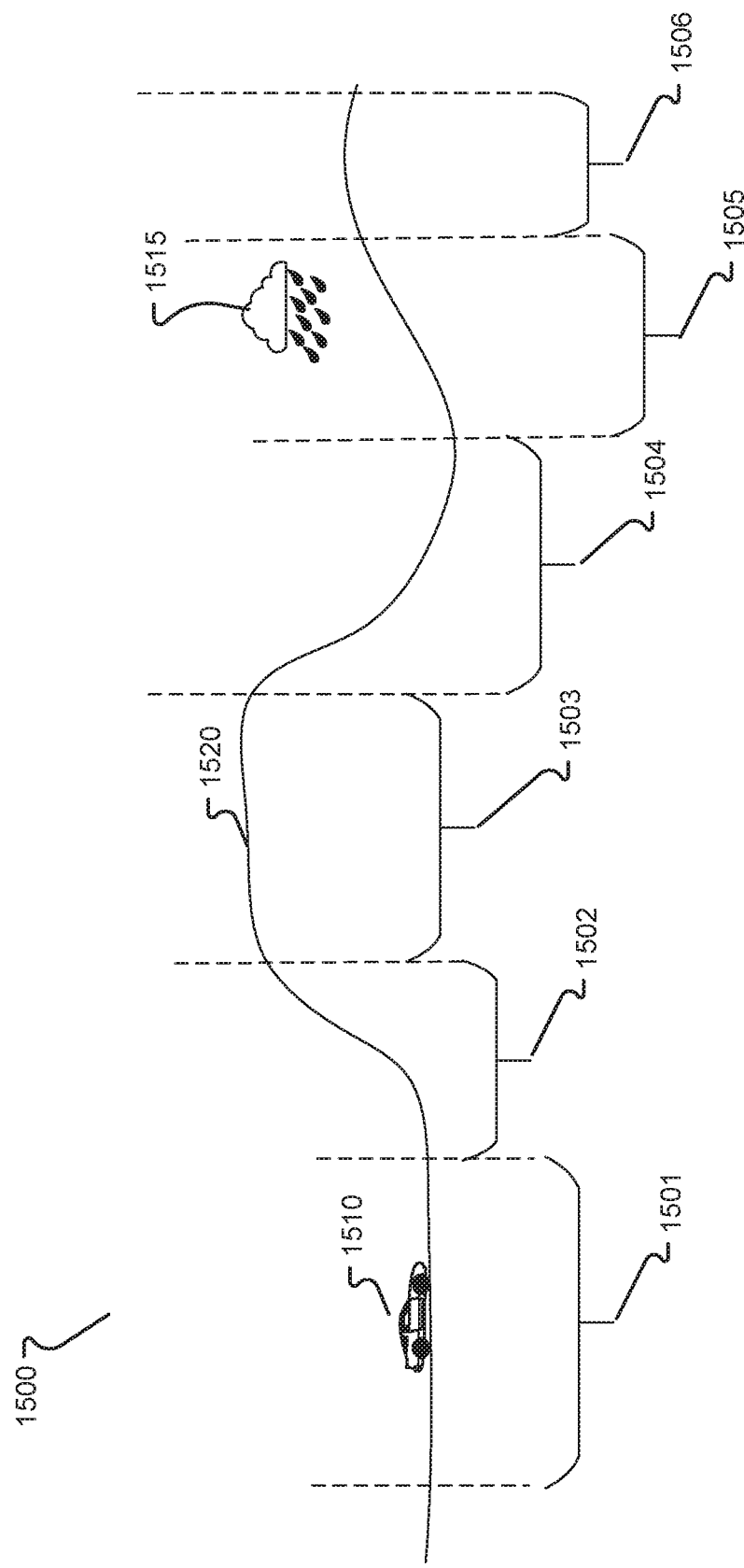
FIG. 15 is a diagram of a road segment risk assessment in accordance with the systems presented herein.

FIG. 15 illustrates an example scenario of a vehicle 1510 driving through an environment 1500. The vehicle system may determine particular stretches of a road 1520 may be more or less risky for a driver of a vehicle 1510. For example, a flat portion of road, e.g. segment 1501, may be a low risk portion, while a portion of road comprising a steep incline, e.g. segment 1502, may be a higher risk portion. Risk levels may be calculated from a number of information sources, for example onboard sensors as described herein may provide information to be used alone or in combination to information gathered from external sources, such as a maps database or a weather information source.

A vehicle system of a vehicle 1510 may divide a road into segments (1501-1506) and calculate a risk score based on a variety of factors. For example, a segment of road 1520 determined to be moderately steep and to be in a rainstorm, e.g. segment 1505, may be assigned a higher risk score than a relatively flat portion of road with no identifiable extreme weather, e.g. segment 1503.

Figure 16:
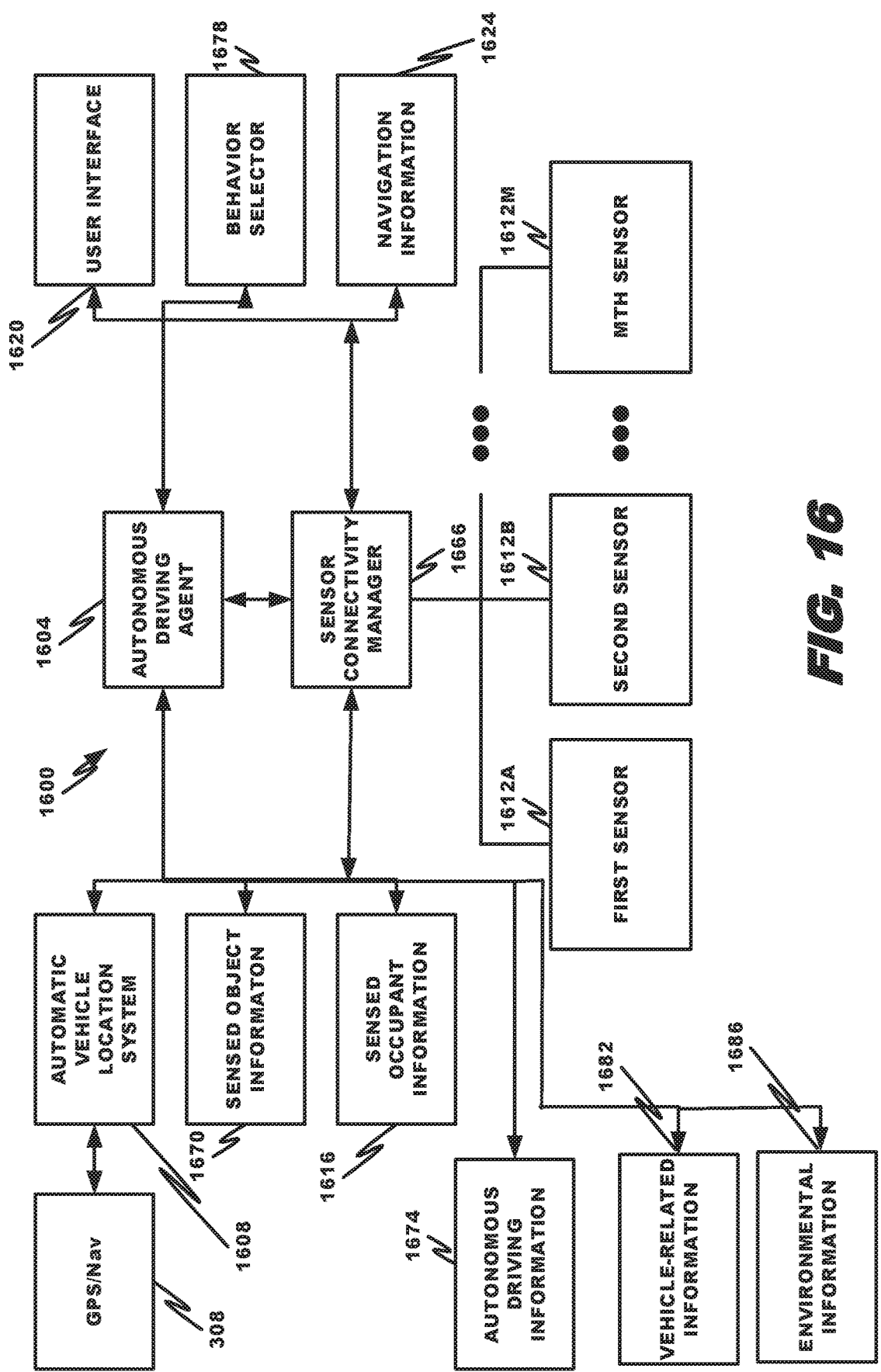
FIG. 16 is a block diagram of an autonomous driving vehicle system according to an embodiment.

With reference to FIG. 16, an onboard autonomous driving system 1600 in the vehicle 100 is depicted that employs one or more of the foregoing features. The autonomous driving system 1600 includes an autonomous driving agent 1604 in communication with an automatic vehicle location system 1608, sensor connectivity manager 1666 and associated first, second, . . . Mth sensors 1612A-M, user interface 1620, and behavior selector system 1678, and having access to the sensed object information 1670, sensed occupant information 1616, learned autonomous driving information 1674, vehicle-related information 1682, exterior environmental information 1686, and navigation information 1624.

The automatic vehicle location system 1608 is in communication with the GPS/Nav sensor 308 to acquire current vehicle position coordinates, which position coordinates are then correlated by the map database manager 1612 to a position on a road. Dead reckoning using distance data from one or more sensors attached to the drive train, a gyroscope sensor 312 and/or an accelerometer sensor 312 can be used for greater reliability, as GPS signal loss and/or multipath can occur due to the map database manager 1812, illustrated in FIG. 18, such as due to a cellular signal dead or low signal strength area or passage of the vehicle through a tunnel.

The first, second, . . . mth sensors 1612a-m can collect the sensed object information 1670, sensed occupant information 1616, vehicle-related information 1682, and exterior environmental information 1686. The first, second, . . . mth sensors 1612A-M include the sensors or systems 116A-K, 112, 312, 316, 320, 324, 328, 332, 336, and 338 discussed above, a camera to capture images of interior objects (such as occupants), a seat belt sensor to determine seat belt settings (e.g., closed or open), a seat weight sensor settings, a microphone to capture audio within the vehicle (such as occupant comments which are then input into a speech-to-text engine to determine or identify one or more words spoken by an occupant), a wireless network node that receives unique identifiers of occupant portable computing devices (which identifiers can be associated with a corresponding occupant to identify the occupant), and the like. In some applications, a portable computing device of the occupant can be employed as a sensor that tracks occupant behavior while the occupant is in the vehicle. The information collected by the sensors is received by the sensor connectivity manager 1666 and provided to the autonomous driving agent 1604 and/or to the control source 356B.

The user interface 1620 receives user commands and other input, such as user selections, preferences, and settings that are used in configuring, determining, and selecting vehicle parameters, settings, or operations, such as navigation route selection, acceptable rates of acceleration and deceleration, acceptable minimum inter-object spacing distance, and acceptable steering lines, and stimuli or events triggering associated rule-based actions. The user interface 1620 can be one or more of vehicle instrument panel 400, vehicle operational display 420, heads-up display 434, and power management display 428. It can also be a portable computational or communication device of an occupant.

The behavior selector 1678 determines which behavior logic and other autonomous driving information is to be employed by the vehicle. The behavior selector 1678 can determine therefore which locally stored (e.g., in working memory 736) learned behavior or other autonomous driving information 1674 is to be executed or implemented and which identified or learned behavior of other autonomous driving information is to be executed or implemented.

The autonomous driving agent 1604 controls the driving behavior of the vehicle, such as whether to execute an accelerate event, acceleration rate, decelerate event, deceleration rate, steering angle selected relative to a selected reference axis, and selected inter-object spacing magnitude in response to the current vehicle location, sensed object information 1670, sensed occupant information 1616, vehicle-related information 1682, exterior environmental information 1686, and navigation information 1624 in accordance with the autonomous driving information selected by the behavior selector 1678 and implemented by the autonomous driving agent 1604. In a typical implementation, the autonomous driving agent, based on feedback from certain sensors, specifically the LIDAR and radar sensors positioned around the circumference of the vehicle, constructs a three-dimensional map in spatial proximity to the vehicle that enables the autonomous driving agent to identify and spatially locate animate and inanimate objects. Other sensors, such as inertial measurement units, gyroscopes, wheel encoders, sonar sensors, motion sensors to perform odometry calculations with respect to nearby moving objects, and exterior facing cameras (e.g., to perform computer vision processing) can provide further contextual information for generation of a more accurate three-dimensional map. The navigation information is combined with the three-dimensional map to provide short, intermediate and long range course tracking and route selection. The autonomous driving system processes real-world information as well as GPS data, and driving speed to determine accurately the precise position of each vehicle, down to a few centimeters all while making corrections for nearby animate and inanimate objects.

The autonomous driving agent 1604 processes in real time the aggregate mapping information and models behavior of occupants of the current vehicle and other nearby animate objects relying on the behavior selector's selected autonomous driving information. The autonomous driving information can be generically applied to multiple types, models, and manufacturer of vehicles or specific to a specific type, model, or manufacturer of vehicle. The applicability of the respective set of identified autonomous driving information can be stored as part of the data structures comprising the identified autonomous driving information.

In some applications, the behavior selector 1678 selects between learned and identified autonomous driving information for a nearby object in the sensed object information 1670. The selected autonomous driving information is used to model the behavior of the nearby object and therefore determining a behavior of the selected vehicle to be implemented by the autonomous driving agent.

The autonomous driving agent, based on the learned and autonomous driving information, issues appropriate commands regarding implementing an accelerate event, acceleration rate, deceleration event, deceleration rate, inter-object spacing distance, and steering angle magnitude. While some commands are hard-coded into the vehicle, such as stopping at red lights and stop signs, other responses are learned and recorded by the control source or autonomous driving agent based on previous driving experiences.

The learning ability of the control source is based on monitoring the behavior of multiple vehicles and of the autonomous driving agent is based on monitoring the behavior of the selected vehicle hosting the autonomous driving agent. Examples of learned behavior include a slow-moving or stopped vehicle or emergency vehicle in a right lane suggests a higher probability that the car following it will attempt to pass, a pot hole, rock, or other foreign object in the roadway equates to a higher probability that a driver will swerve to avoid it, and traffic congestion in one lane means that other drivers moving in the same direction will have a higher probability of passing in an adjacent lane or by driving on the shoulder.

Figure 17:
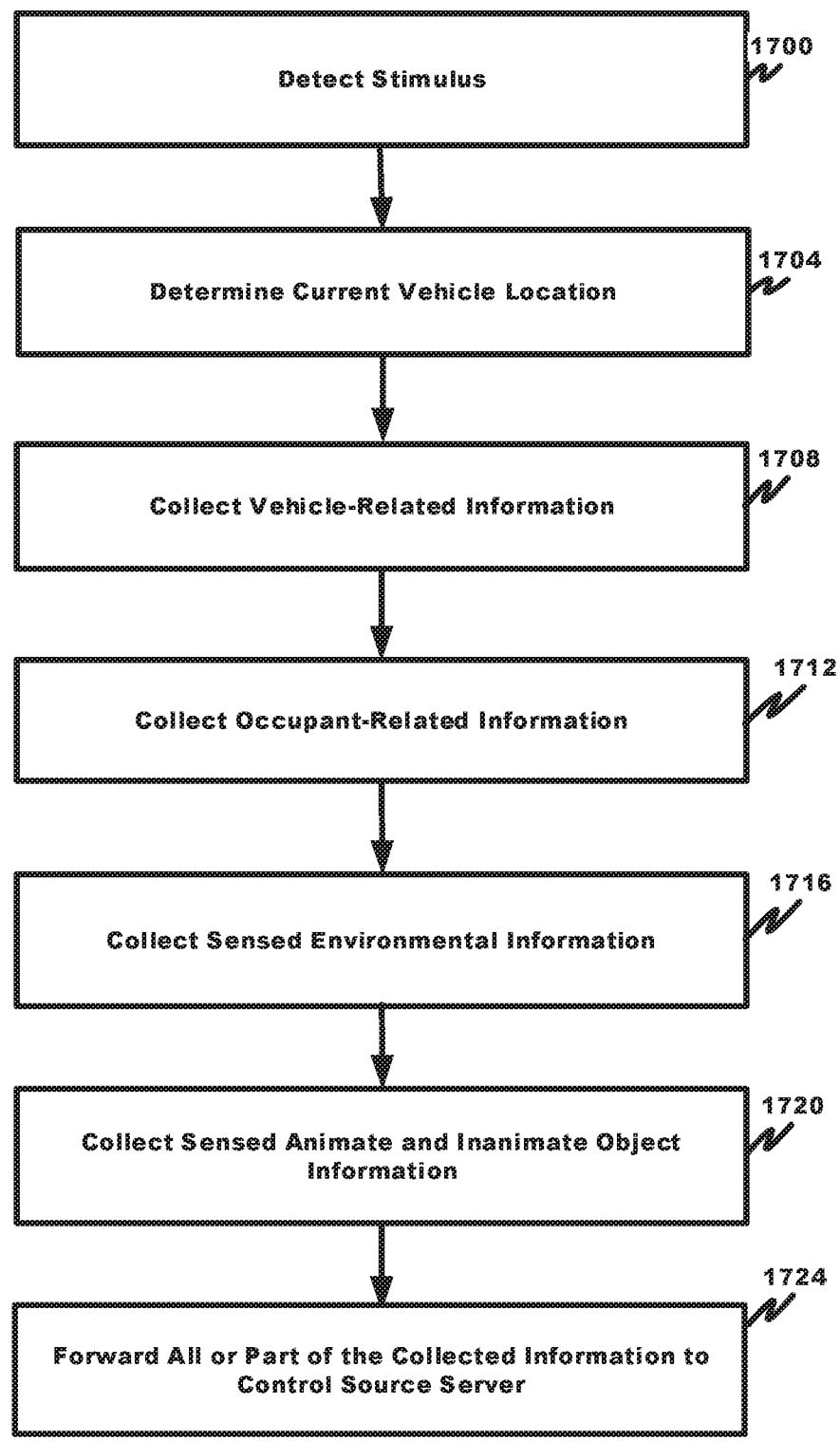
FIG. 17 is a flow chart associated with one or more embodiments presented herein.

With reference to FIG. 17, the autonomous driving agent 1604, in step 1700, detects a stimulus, such as any set forth above, and commences execution of the instructions. Exemplary stimuli include, for example, detection of a change in any of the previously sensed vehicle location, sensed object information 1670, sensed occupant information 1616, vehicle-related information 1682, exterior environmental information 1686, and/or navigation information 1624 and/or in learned autonomous driving information 1674.

In step 1704, the autonomous driving agent 1604 determines from the automatic vehicle location system 1608 the current geographical location of the vehicle 100.

In step 1708, the autonomous driving agent 1604 collects vehicle-related information 1682 from the sensor connectivity manager 1666.

In step 1712, the autonomous driving agent 1604 collects occupant-related information 1616, such as the information set forth above. This includes, for example, the identities of the vehicle occupants, the roles of each identified occupant (e.g., driver or passenger), a current activity of each occupant (e.g., operating vehicle, operating portable computing device, interacting with an on board vehicle user interface, and the like), gaze detection of an occupant, and the like.

In step 1716, the autonomous driving agent 1604 collects sensed exterior environmental information 1686 from the sensor connectivity manager 1666.

In step 1720, the autonomous driving agent 908 collects sensed animate and inanimate object information 1670 from the sensor connectivity manager 1666.

In step 1724, the autonomous driving agent 1608 forwards all or part of the foregoing collected information to the navigation or control source as appropriate. As noted, how much of the collected information is transmitted can depend on whether or not the vehicle of the autonomous driving agent is the master or slave vehicle in the ad hoc network comprising the vehicle. In general, the types of collected information unique to the vehicle, including sensed occupant information 1616, vehicle location, and vehicle-related information 1682 is always transmitted by the vehicle, whether acting as a master or slave vehicle, while the types of collected information that are common to the vehicles in the network, including sensed object information 1670 and environmental information 1686, is generally transmitted by the master vehicle and not the slave vehicles.

Figure 18:
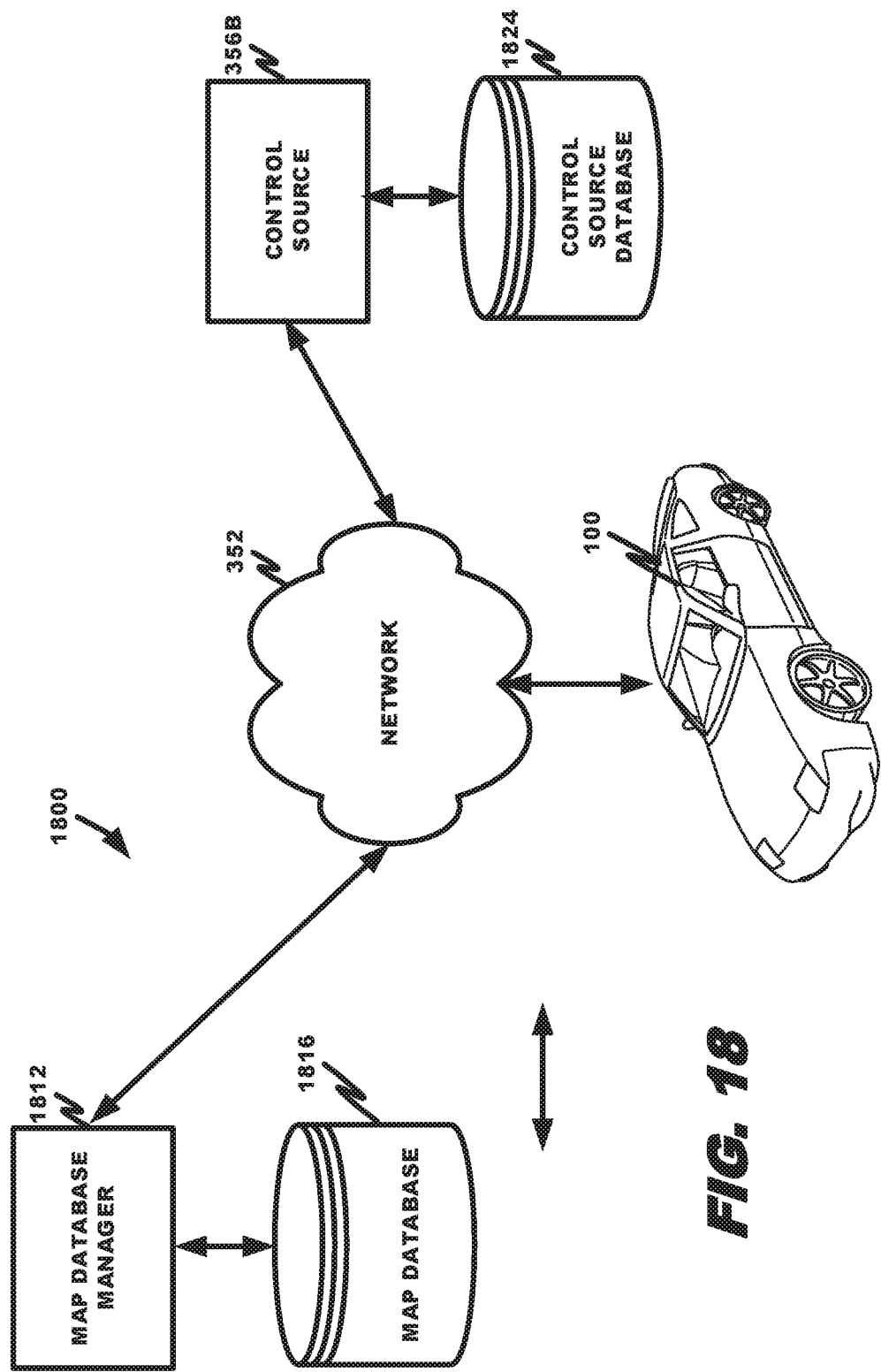
FIG. 18 is block diagram of a computational system in a vehicle and associated with one or more components described herein.

With reference to FIGS. 3 and 17-18, the vehicle 100 is in wireless communication, via network 352, with navigation source 356A comprising a map database manager 1812 and associated map database 1816 and the control source 356B having an associated control source database 1824.

The map database manager 1812 and map database 1816 interact with the navigation sensor 308 (which is part of the automatic vehicle location system 1608 discussed below) in the vehicle 100 to provide navigation or map output to an autonomous driving agent 1604 in the vehicle 100.

The map database manager 1812 stores and recalls navigation information from the map database 1816.

Figure 19:
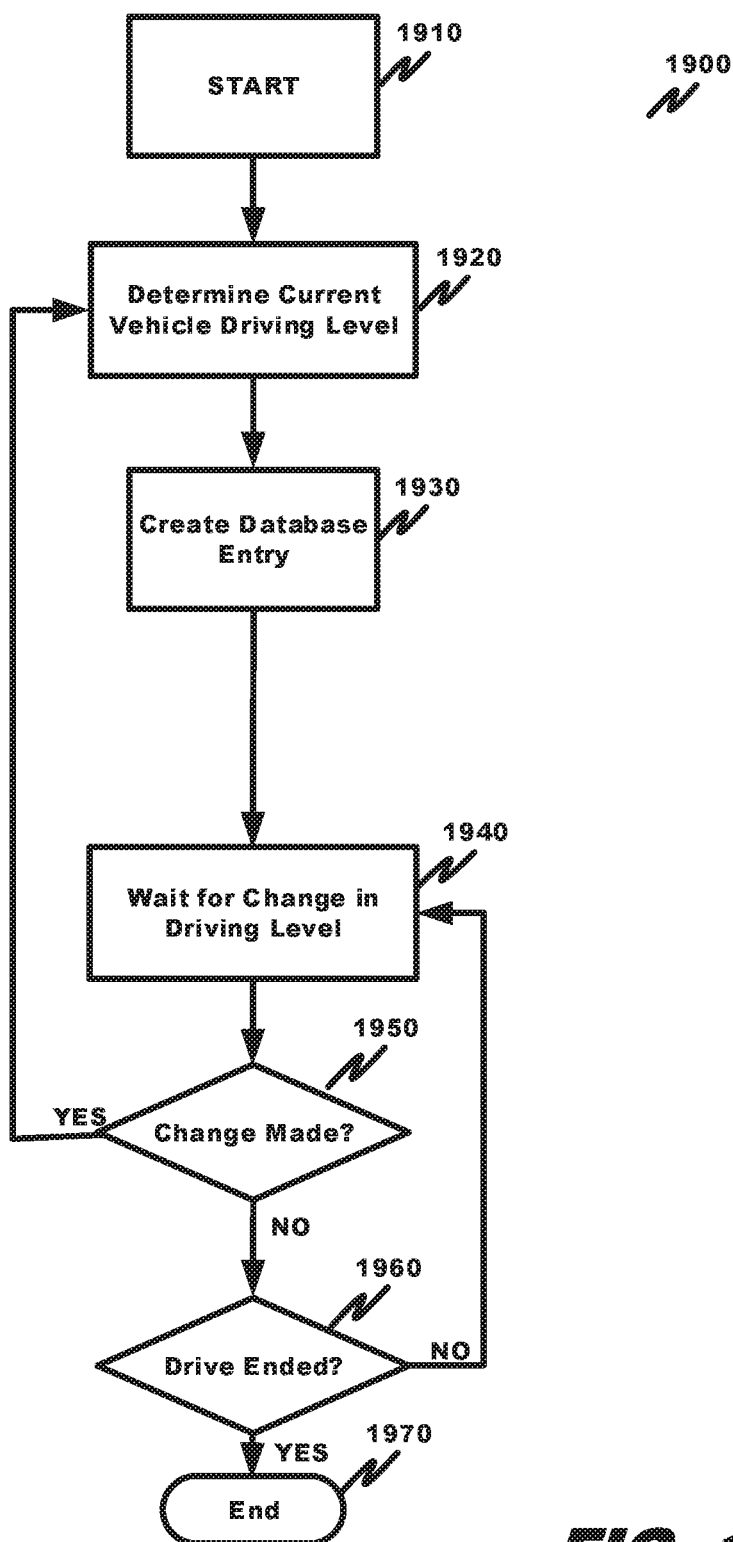
FIG. 19 is a flow chart associated with one or more embodiments presented.

With reference to FIG. 19, an embodiment of a method 1900 for dynamically creating database entries based on changes in driving level is illustrated. Generally, the method 1900 starts with a start operation 1910. The method 1900 can include more or fewer steps or can arrange the order of the steps differently than those shown in FIG. 19. The method 1900 can be executed as a set of computer-executable instructions executed by a computer system or processor and encoded or stored on a computer-readable medium. In other configurations, the method 1000 may be executed by a series of components, circuits, gates, etc. created in a hardware device, such as a System-on-Chip (SOC), Application Specific Integrated Circuit (ASIC), and/or a Field Programmable Gate Array (FPGA). Hereinafter, the method 1900 shall be explained with reference to the systems, components, circuits, modules, software, data structures, signaling processes, models, environments, vehicles, etc. described in conjunction with FIGS. 1-18.

Upon vehicle startup, or otherwise an initiation of the database entry generation system, the method may begin with a start process in step 1910. At this point, the vehicle control system 348 may determine a current vehicle autonomous driving level at step 1920. For example, upon vehicle startup, the vehicle may be in fully-manual mode. Before a driver is able to switch into an autonomous mode, the vehicle system may first determine the current/initial driving level.

At step 1930 a database entry may be created. For example, upon determining a current vehicle driving level, the vehicle system may determine associated information, e.g. a driver ID, a current timestamp, a manufacturer ID, a driver insurance ID, a change type (after startup the type may be "StartUp" or "Initiation", etc.), and/or a vehicle ID.

The database entry may be initially stored on memory onboard the vehicle, or immediately transferred via a communication system to a network location. The database entry may be transmitted to a number of entities and used as a part of a number of databases. For example, an entry may be accessed by an insurance company collecting information on the driver, or a manufacturer collecting information on the vehicle itself, or an insurance company collecting information on the manufacturer and the vehicle. The database entry may be one of any of the types shown in FIGS. 9-13.

The vehicle control system 348 may at step 1940 wait until a change in the driving level has been made. This change may be a result of an automatic change or a manual change by the user either at the result of a suggestion by the vehicle control system 348 or a preference of the user. Upon a change in the driving level being made, the method returns to step 1920 in which the current vehicle driving level is determined. At step 1930, when a database entry is created, the vehicle control system 348 may note in the database entry the type of change made. For example, whether the change was made automatically or manually and whether a manual change was the result of a suggestion or simply a user's choice.

At step 1950, the vehicle system may determine whether a change was made. If a change is determined to have been made, the method may return to step 1920, in which the current (newly changed) vehicle driving level is determined. If no change is determined to have been made in step 1950, the method may move to step 1960 in which the vehicle system may determine whether the drive has ended. If the drive has ended, the method may move to step 1970 and end the method. Alternatively, if the drive has not ended, the method may return to step 1940 and continue waiting for a change in driving level.

Figure 20:
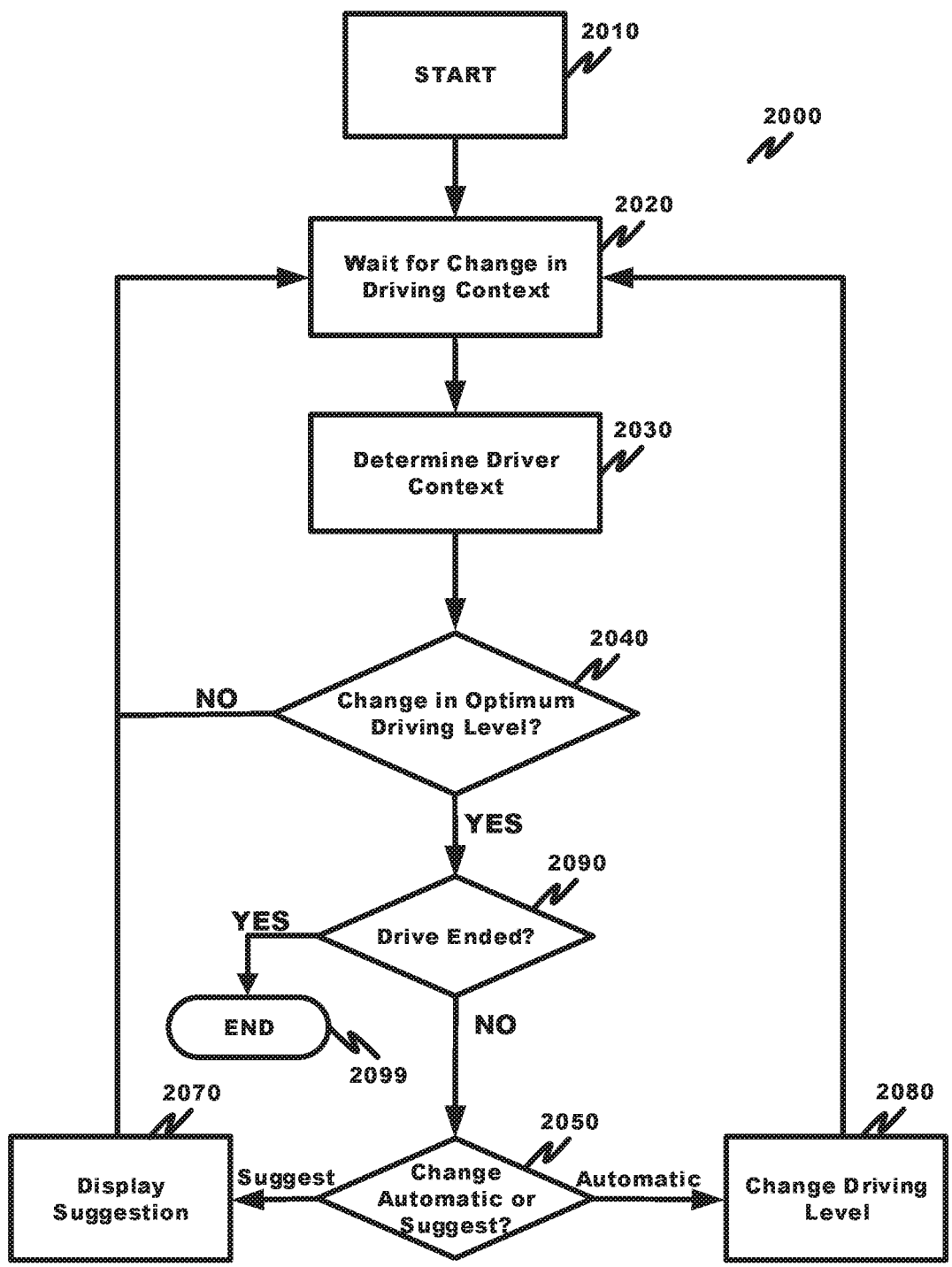
FIG. 20 is a flow chart associated with one or more embodiments presented.

An embodiment of a method 2000 for dynamically changing or suggesting a change of driving level based on a change in driving context may be as shown in FIG. 20. Generally, the method 2000 begins with a start operation 2010. The method 2000 can include more or fewer steps or can arrange the order of the steps differently than those shown in FIG. 20. The method 2000 can be executed as a set of computer-executable instructions executed by a computer system or processor and encoded or stored on a computer readable medium. In other configurations, the method 2000 may be executed by a series of components, circuits, gates, etc. created in a hardware device, such as a System-on-Chip (SOC), Application Specific Integrated Circuit (ASIC), and/or a Field Programmable Gate Array (FPGA). Hereinafter, the method 2000 shall be explained with reference to the systems, components, circuits, modules, software, data structures, signaling processes, models, environments, vehicles, etc. described in conjunction with FIGS. 1-19.

At step 2020, the vehicle system may monitor sensor data and external information via the communication system to detect a change in driving context. The driving context may comprise any relevant information which may affect driving conditions. For example, road conditions (including, but not limited to, road surface quality, road incline/decline, road curves), weather conditions (including, but not limited to, ice, rain, sleet, mud, snow), time of day factors (including, but not limited to, sunset, bright light, night-time, darkness), vehicle cabin conditions (including, but not limited to, driver health, driver sobriety, driver sleepiness, cabin noise level, cabin light level). The information used to gather information relevant to driving context may be sourced from any number of the sensors described above, or from external sources, such as a weather database or navigation system database.

At step 2030, the vehicle system may determine the driver context. This step may comprise determining a level of driver context, for example a level of driver distraction, or a level of inclement weather. The system may also attribute the change in overall driver context to a particular sensor or source of database information. For example, if interior cabin noise is the factor causing a change in overall driving context, the vehicle system may note this determination to be stored in a database entry along with the driver level change information.

At step 2040, the vehicle system may determine whether the optimum vehicle driving level has changed as a result of the change in driver context. For example, the driver context may be measured as a risk score. Risk scores may be split into a number of threshold ranges making up a number of risk score categories. For example as illustrated in FIG. 12 a risk score of 9 may be in a different risk score category from a risk score of 11. The vehicle system may determine the optimum vehicle driving level based on the current driver context. This determination may be made based on a current risk score associated with the current driver context. For example, as illustrated in FIG. 12, if a current driver context is associated with a risk score of 31, the vehicle system may determine the optimum vehicle driving level is automation level 3.

At step 2050, the vehicle system may determine whether the vehicle driving level should be changed to the optimum vehicle driving level automatically, or whether a suggestion should be made to the driver. This determination may also be made based on a current risk score associated with the current driver context.

This determination may also be made on the current driving level as compared to the determined optimum driving level. For example, if a driver is operating a vehicle in automation level 1 and the vehicle system determines automation level 4 is optimum, the vehicle system may determine that an increase in driving level of more than one level should be made automatically.

Alternatively, if the current driving level is at automation level 2 and the vehicle system determines the optimum driving level is automation level 3, the vehicle system may determine the change should only be suggested to the driver.

Alternatively, or in addition to the above, if the optimum driving level is below the current level, i.e. the optimum driving level is a level with less automation than the current driving level, the vehicle system may determine the ideal response is a suggestion to the driver as opposed to automatically switching to a lower driver level.

If the vehicle system determines in step 2050 that the change should be made automatically, at step 2080, the vehicle system may automatically change the vehicle driving level to the optimum driving level. Such a change may be made without any notification made to the driver. Alternatively, a UI display may be presented to the driver notifying him or her of the automatic change.

If the vehicle system determines in step 2050 that the change should only be suggested to the driver, at step 2070, the vehicle system may suggest the vehicle driving level to the driver via a user interface menu as discussed above.

Following both of steps 2070 and 2080, the vehicle system may return to step 2020 and wait for a second change in driving context and repeat the method.

The method 2000 may include a ending process, wherein following a detection of a change in optimum driving level at step 2040, the system may determine whether the drive has ended in a step 2090. If the drive is not determined to have ended, the method may proceed to step 2050. If, alternatively, the drive is determined to have ended at step 2090, the method may end at step 2099.

Maps are commonly stored as graphs, or two or three dimensional arrays of objects with attributes of location and category, where some common categories include parks, roads, cities, and the like. A map database commonly represents a road network along with associated features, with the road network corresponding to a selected road network model. Commonly, such a model comprises basic elements (nodes, links and areas) of the road network and properties of those elements (location coordinates, shape, addresses, road class, speed range, etc.). The basic elements are referred to as features and the properties as attributes. Other information associated with the road network can also be included, such as points of interest, waypoints, building shapes, and political boundaries. Geographic Data Files (GDF) is a standardized description of such a model. Each node within a map graph represents a point location of the surface of the Earth and can be represented by a pair of longitude (lon) and latitude (lat) coordinates. Each link can represent a stretch of road between two nodes, and be represented by a line segment (corresponding to a straight section of road) or a curve having a shape that is generally described by intermediate points (called shape points) along the link. However, curves can also be represented by a combination of centroid (point or node), with a radius, and polar coordinates to define the boundaries of the curve. Shape points can be represented by longitude and latitude coordinates as are nodes, but shape points generally do not serve the purpose of connecting links, as do nodes. Areas are generally two- or three-dimensional shapes that represent things like parks, cities, blocks and are defined by their boundaries (usually formed by a closed polygon).

Auxiliary data can be attached by the map database manager 1812 to the features and/or attributes. The auxiliary data can be not only various navigational functions, involving active safety, and driver assistance but also identified autonomous driving information relating to an autonomous vehicle or other object to be sensed by passing autonomous vehicles, such as observed behaviors of other autonomous vehicles or an object at the map location, to be applied at the corresponding geographic locations. The auxiliary data, for example, can comprise identified embedded autonomous driving information, such as commands to the receiving autonomous driving agent, requests to the receiving autonomous driving agent, warnings to the receiving autonomous driving agent, (e.g., of potential hazards such as potholes, hazardous objects in or near the roadway, poor roadway conditions (such as icy or wet), heavy traffic warning, emergency vehicle or personnel-related warning, vehicle wreck warning, road construction warning, bridge or roadway out warning, high water or flood warning, and the like) logic, instructions or rules to be employed by the receiving autonomous driving agent, references, identifiers, observed behaviors, or links to locally or remote stored autonomous driving rules, logic or instructions to be employed the receiving autonomous driving agent, in the navigation information provided by the navigation source 356A.

The identified autonomous driving information embedded in the navigation information as auxiliary data can include temporal, spatial, or event-limitations learned by the control system monitoring the behaviors of multiple autonomous vehicles. The identified autonomous driving information can be limited in application by temporal limitations (e.g., identified behavior application start and end times), spatial limitations (e.g., sets of geographical coordinates defining an area in or location at which the identified autonomous driving information is to be applied), or event limitations (e.g., a defined event (such as a weather storm event, ambient temperature range (such as below freezing), set of road conditions, etc.) during which the identified autonomous driving information is to be applied but after which the autonomous driving information is not to be applied).

The auxiliary data fields can include a flag to indicate the existence of such identified embedded autonomous driving information relating to an autonomous vehicle or other object to be sensed by passing autonomous vehicles. When the flag is set, the autonomous vehicle driving agent accesses the field(s) dedicated to identified embedded autonomous driving information and, when the flag is not set, the autonomous vehicle driving agent does not access the field(s) as they are deemed not to contain identified autonomous driving information.

The functions and other auxiliary data can be cross-referenced with the entities and attributes of the main map database 1816. Since the auxiliary data is not necessarily compiled with the main map database 1816 some other means is generally needed to establish cross-referencing, or attaching of the auxiliary data. The common approaches are function-specific referencing tables and generic referencing.

Function-specific referencing tables provide a technique for attaching function-specific data, such as embedded identified autonomous driving information relating to an autonomous vehicle or other object to be sensed by passing autonomous vehicles, to the map database 1816. Such a table can be collaboratively produced by the navigation source 356A and control source 356B to support a specific function or class of functions involving location-based behaviors or embedded identified autonomous driving information. It will generally include a list of map elements of a specific type (e.g., links, intersections, point-of-interest locations, etc.) along with identifying attributes (e.g., street names, longitude/latitude coordinates, etc.). Additionally, each entry in the table can be assigned a unique identifier. As a practical matter, the result will represent a small subset of the elements of the given type that are available in the map databases and will include those that are more important to the application area.

Generic referencing attaches data, such as observed behaviors and embedded identified autonomous driving information relating to an autonomous vehicle or other object to be sensed by passing autonomous vehicles, to any map database by discovering reference information through a form of map matching. The function-specific data items can be assigned to elements, such as points, links or areas, that likely only approximate the corresponding map elements in a specific map database 1816. A search of the map database can be made for the best fit. To enhance the search process, neighboring elements can be strategically appended to each given element to help ensure that the correct solution is found in each case. For example, if the map element is a link connecting two intersections, then one or both cross streets could be appended for the sake of the search thereby making an incorrect match unlikely.

By way of illustration, the Navigation Data Standard (NDS) is a standardized format for automotive-grade navigation databases. NDS uses the SQLLite Database File Format. An NDS database can have several product databases, and each product database may be divided further into update regions. This concept supports a flexible and consistent versioning concept for NDS databases and makes it possible to integrate databases from different database suppliers into one NDS database. The inner structure of databases complying with Navigation Data Standard is further characterized by building blocks, levels and the content itself. An update region represents a geographic area in a database that can be subject to an update. All navigation data in an NDS database belongs a specific building block. Each building block addresses specific functional aspects of navigation, such as names for location input, routing, or map display.

Alternatively, the control source 356B can push the identified autonomous driving information directly to the autonomous driving agent based on the selected vehicle location and not incorporate or reference the identified autonomous driving information in the navigation information.

The control source 356B and control source database 1824 interact with the autonomous driving agent 1604 in each vehicle 100 to receive various types of information regarding vehicle behavior and the behaviors of nearby objects, such as other vehicles and pedestrians, identify specific behaviors and other autonomous driving information, and directly or indirectly provide the autonomous driving information to selected vehicles for use in determining and selecting various autonomous vehicle commands or settings, particularly acceleration rate of the vehicle, deceleration (e.g., braking) rate of the vehicle, steering angle of the vehicle (e.g., for turns and lane changes), and inter-object spacing (e.g., end-to-end or side-to-side spacing between the vehicle and a nearby object).

The map and control source databases 1816 and 1824 can be constructed according to any data model, whether conceptual, logical, or physical, such as a flat model, hierarchical model, network model, relational model, object-relational model, star schema, entity-relationship model, geographic model, generic model, semantic model, and the like.

Each learned or identified behavior (or other autonomous driving information) is described typically by output behavior and associated with a corresponding set of limitations. By way of illustration, the output behavior is typically a driving behavior of the car, such as use a specified lane, slow to a selected speed, gently apply brakes, turn lights on, use inter-vehicle spacing of X meters, transition from a lower level of automation to a higher level or vice versa, and the like. The learned or identified behavior can be further described with reference to a set of sensed inputs.

The sensed inputs can vary by corresponding object type but include one or more of geographic or spatial vehicle location, sensed object information 1670 (with examples being animate objects such as animals and attributes thereof (e.g., animal type, current spatial location, current activity, etc.), and pedestrians and attributes thereof (e.g., identity, age, sex, current spatial location, current activity, etc.), and the like and inanimate objects and attributes thereof such as other vehicles (e.g., current vehicle state or activity (parked or in motion or level of automation currently employed), occupant or operator identity, vehicle type (truck, car, etc.), vehicle spatial location, etc.), curbs (topography and spatial location), potholes (size and spatial location), lane division markers (type or color and spatial locations), signage (type or color and spatial locations such as speed limit signs, yield signs, stop signs, and other restrictive or warning signs), traffic signals (e.g., red, yellow, blue, green, etc.), buildings (spatial locations), walls (height and spatial locations), barricades (height and spatial location), and the like), sensed occupant information 916 (with examples being number and identities of occupants and attributes thereof (e.g., seating position, age, sex, gaze direction, biometric information, authentication information, preferences, historic behavior patterns (such as current or historical user driving behavior, historical user route, destination, and waypoint preferences), nationality, ethnicity and race, language preferences (e.g., Spanish, English, Chinese, etc.), current occupant role (e.g., operator or passenger), occupant priority ranking (e.g., vehicle owner is given a higher ranking than a child occupant), electronic calendar information (e.g., Outlook™), medical information and history, etc.), selected vehicle-related information 1682 (with examples being vehicle manufacturer, type, model, year of manufacture, current geographic location, current vehicle state or activity (parked or in motion or level of automation currently employed), vehicle specifications and capabilities, currently sensed operational parameters for the vehicle, and other information), exterior environmental information 1686 (with examples being road type (pavement, gravel, brick, etc.), road condition (e.g., wet, dry, icy, snowy, etc.), weather condition (e.g., outside temperature, pressure, humidity, wind speed and direction, etc.), ambient light conditions (e.g., time-of-day), degree of development of vehicle surroundings (e.g., urban or rural), and the like), occupant commands or other input, and other information.

The identified behavior or other autonomous driving information can be based on observations of repetitive behavior of multiple vehicles observed at a specific map location or area or in response to an event (e.g., any of the sensed object information 1670 or sensed environmental information 1686) or during a specified time-of-day.

The application or usage of the identified behavior can be limited temporally, spatially, or by occurrence or duration of an event. While the application or usage of the identified behavior is permitted by the corresponding limitation, the identified behavior and other autonomous driving information is used instead of learned behaviors and other autonomous driving information of the vehicle. When the application or usage of the identified behavior and other autonomous driving information is not permitted by the corresponding limitation (e.g., the vehicle is outside the spatially limited area, the time duration of the behavior is expired, or the event has terminated or otherwise ended), the learned behavior and other autonomous driving information of the vehicle is employed.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a method for tracking activation of an advanced driver assistance ("ADA") system of a vehicle, the method comprising: a sensor detecting a driving context, wherein the driver context comprises one or more of an environmental condition and/or a driver behavior; a processor determining, based on the detected driving context, an optimum driving level of the ADA system; the processor initiating the optimum driving level of the ADA system; based on initiating the optimum driving level, the processor creating a first entry in a database, wherein the database entry comprises information associated with the initiation of the driving level of the ADA system; and a communication system transmitting the first entry in the database to a third party via a network.

Aspects of the above method include wherein a second entry in the database is created upon a manual initiation of a second driver level of the ADA system.

Aspects of the above method include wherein a second entry in the database comprises information associated with a second driving level of the ADA system, wherein the second driving level of the ADA system is determined at a startup of the vehicle.

Aspects of the above method include wherein the third party comprises a manufacturer of the vehicle.

Aspects of the above method include wherein the sensor comprises a global positioning system (GPS), a LIDAR sensor, a RADAR sensor, a camera, and/or a microphone.

Aspects of the above method include suggesting initiation of a second driving level of the ADA system, wherein suggesting initiation comprises presenting a notification displayed on a user-interface in the vehicle.

Aspects of the above method include wherein the driving level of the ADA system comprises one or more of a steering-assist system, an accelerating-assist system, and a braking-assist system.

Aspects of the above method include wherein the database comprises a level of autonomy, a driver context description, a timestamp associated with an ADA system initiation, and/or a driver identification.

Aspects of the above method include: the sensor detecting a change in the driver context; determining, based on the change in the driver context, a second optimum driving level of the ADA system; and the processor initiating the second optimum driving level of the ADA system; based on initiating the optimum driving level, the processor creating a second entry in the database, wherein the database entry comprises information associated with the initiation of the second optimum driving level of the ADA system; and a communication system transmitting the second entry in the database to the third party via the network.

Embodiments further include a system comprising: a processor; and a memory coupled to the processor and comprising computer-readable program code that when executed by the processor causes the processor to perform operations, the operations comprising: detecting an advantageous situation for the initiation of one or more of a plurality of ADA systems; performing one or more of: suggesting initiation of the one or more of the plurality of ADA systems; and initiating the one or more of the plurality of ADA systems; creating a first entry in a database, wherein the database entry comprises information associated with the initiation of the one or more of the plurality of ADA systems; and transmitting one or more entries of the database to a third party via a network.

Aspects of the above system include wherein a second entry in the database is created upon a manual initiation of a second one or more of the plurality of ADA systems.

Aspects of the above system include wherein a second entry in the database is created upon vehicle startup.

Aspects of the above system include wherein a second entry in the database is created upon vehicle power-down.

Aspects of the above system include wherein the advantageous situation is detected via one or more of a global positioning system (GPS), a LIDAR sensor, a RADAR sensor, a camera, and a microphone.

Embodiments further include a computer program product comprising: a non-transitory computer-readable storage medium having computer-readable program code embodied therewith, the computer-readable program code configured, when executed by a processor, to: detect an advantageous situation for the initiation of one or more of a plurality of ADA systems; perform one or more of: suggest initiation of the one or more of the plurality of ADA systems; and initiate the one or more of the plurality of ADA systems; create a first entry in a database, wherein the database entry comprises information associated with the initiation of the one or more of the plurality of ADA systems; and transmit one or more entries of the database to a third party via a network.

Aspects of the above computer program product include wherein a second entry in the database is created upon a manual initiation of a second one or more of the plurality of ADA systems.

Aspects of the above computer program product include wherein a second entry in the database is created upon vehicle startup.

Aspects of the above computer program product include wherein a second entry in the database is created upon vehicle power-down Aspects of the above computer program product include wherein the advantageous situation is detected via one or more of a global positioning system (GPS), a LIDAR sensor, a RADAR sensor, a camera, and a microphone.

Embodiments further include a method of correcting actuarial models for a vehicle equipped with autonomous or partial-automation capabilities, the method comprising: receiving a database entry from the vehicle via a network; updating, based on the database entry, a database associated with a first driver; determining, based on the database, a risk score associated with the first driver; updating, based on the risk score, a risk profile associated with the first driver; and modifying, based on the risk profile, an insurance premium associated with the first driver.

Any one of the methods discussed above, wherein the database comprises data fields associated with one or more a level of autonomy, a timestamp associated with an advanced driver assistance ("ADA") system initiation, and a driver identification.

Any one of the methods discussed above, wherein the database entry is received via the vehicle.

Any one of the methods discussed above, wherein an actuarial model is updated based on the database entry.

Any one of the methods discussed above, wherein the database entry comprises data associated with one or more of a global positioning system ("GPS"), a LIDAR sensor, a RADAR sensor, a camera, and a microphone.

Any one of the methods discussed above, wherein a second database comprises data associated with a second driver of the vehicle.

Any one of the methods discussed above, wherein the database entry comprises data associated with one or more of a plurality of advanced driver assistance ("ADA") systems.

Any one of the methods discussed above, wherein the plurality of ADA systems comprises one or more of a steering-assist system, an accelerating-assist system, and a braking-assist system Any one of the methods discussed above, further comprising transmitting feedback to the vehicle, wherein the feedback is associated with the insurance premium associated with the first driver.

Any one of the methods discussed above, further comprising: updating, based on the database entry, a database associated with a manufacturer of the vehicle; determining, based on the database, a risk score associated with the manufacturer; updating, based on the risk score, a risk profile associated with the manufacturer; and modifying, based on the risk profile, an insurance premium associated with the manufacturer.

A system of correcting actuarial models for a vehicle equipped with autonomous or partial-automation capabilities, the system comprising: a processor; and a memory coupled to the processor and comprising computer-readable program code that when executed by the processor causes the processor to perform operations, the operations comprising: receiving a database entry from the vehicle via a network; updating, based on the database entry, a database associated with a first driver; determining, based on the database, a risk score associated with the first driver; updating, based on the risk score, a risk profile associated with the first driver; and modifying, based on the risk profile, an insurance premium associated with the first driver.

Any one of the methods discussed above, wherein the database comprises data fields associated with one or more a level of autonomy, a timestamp associated with an advanced driver assistance ("ADA") system initiation, and a driver identification.

Any one of the methods discussed above, wherein the database entry is received via the vehicle.

Any one of the methods discussed above, wherein an actuarial model is updated based on the database entry.

Any one of the methods discussed above, wherein the operations further comprise: updating, based on the database entry, a database associated with a manufacturer of the vehicle; determining, based on the database, a risk score associated with the manufacturer; updating, based on the risk score, a risk profile associated with the manufacturer; and modifying, based on the risk profile, an insurance premium associated with the manufacturer.

A computer program product for of correcting actuarial models for a vehicle equipped with autonomous or partial-automation capabilities, the computer program product comprising: a non-transitory computer-readable storage medium having computer-readable program code embodied therewith, the computer-readable program code configured, when executed by a processor, to: receive a database entry from the vehicle via a network; update, based on the database entry, a database associated with a first driver; determine, based on the database, a risk score associated with the first driver; update, based on the risk score, a risk profile associated with the first driver; and modify, based on the risk profile, an insurance premium associated with the first driver.

Any one of the methods discussed above, wherein the database comprises data fields associated with one or more a level of autonomy, a timestamp associated with an advanced driver assistance ("ADA") system initiation, and a driver identification.

Any one of the methods discussed above, wherein the database entry is received via the vehicle.

Any one of the methods discussed above, wherein an actuarial model is updated based on the database entry.

Any one of the methods discussed above, the computer-readable program code further configured, when executed by the processor, to: update, based on the database entry, a database associated with a manufacturer of the vehicle; determine, based on the database, a risk score associated with the manufacturer; update, based on the risk score, a risk profile associated with the manufacturer; and modify, based on the risk profile, an insurance premium associated with the manufacturer.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A method for tracking activation of an advanced driver assistance ("ADA") system of a vehicle, the method comprising:
    detecting a driving context with a plurality of sensors, wherein detecting the driving context comprises detecting current vehicle-related information, current occupant-related information, and exterior environmental and object information;
    at a first time, determining, with a processor, a first optimum automation level of a plurality of automation levels of the ADA system, the plurality of automation levels comprising Automation Level 0, Automation Level 1, Automation Level 2, Automation Level 3, Automation Level 4, and Automation Level 5, wherein the first optimum automation level is determined based on a risk score based on each of the current vehicle-related information, current occupant-related information, exterior environmental information, and exterior object information;
    initiating, with the processor, a first automation level of the ADA system;
    determining, with the processor, a change type associated with the initiating of the first automation level;
    in response to initiating the first automation level, creating, with the processor, a first entry in a database, wherein the first entry comprises a timestamp associated with the initiation of the first automation level of the ADA system, an indication of the change type associated with the initiating of the first automation level, and an indication of which level of the plurality of automation levels was initiated; and
    transmitting, with a communication system, the first entry in the database to a third party via a communication network.

2. The method of claim 1, further comprising:
    at a second later time, determining, with the processor, based on the detected driving context, a second optimum automation level of the plurality of automation levels of the ADA system, the second optimum automation level being different from the first optimum automation level;
    initiating, with the processor, the second optimum automation level of the ADA system;
    in response to initiating the second optimum automation level, creating, with the processor, a second entry in a database, wherein the second entry comprises a second timestamp associated with the initiation of the second optimum automation level of the ADA system and a description of the second optimum automation level; and
    transmitting, with the communication system, the second entry to the third party via the communication network.

3. The method of claim 2, wherein the first automation level is one of Automation Levels 0, 1, and 2 and the second optimum automation level is one of Automation Levels 3, 4, and 5 and wherein the processor:
    determines a current spatial location of the vehicle,
    receives current vehicle-related information, current occupant-related information, and exterior environmental and object information,
    generates, from the exterior environmental and object information a three-dimensional map comprising exterior animate objects in spatial proximity to the vehicle,
    models, from the three-dimensional map, predicted behavior of one or more of the exterior animate objects,
    models, from the occupant-related information, predicted behavior of one or more vehicle occupants, and based on the three-dimensional map and predicted behaviors of the one or more exterior animate objects and one or more vehicle occupants, issues a command to a vehicle component to perform a vehicle driving operation, and wherein the command is one or more of an acceleration rate of the vehicle, a deceleration rate of the vehicle, a steering angle of the vehicle, and an inter-object spacing of the vehicle relative to an exteriorly located object.

4. The method of claim 1, wherein the plurality of sensors comprise one or more of a global positioning system (GPS), a LIDAR sensor, an ultrasonic sensor, a RADAR sensor, an infrared sensor, a camera, and a microphone, wherein the third party is one or more of an insurance company insuring the vehicle and a manufacturer of the vehicle, and wherein the first entry and a second entry in the database indicate one or more of a level of human involvement in operating the vehicle and a level of automation in operating the vehicle to enable allocation of fault between a human occupant and the vehicle manufacturer in the event of an accident.

5. The method of claim 3, wherein the processor transmits the predicted behaviors of the one or more exterior animate objects to a different vehicle for execution by a processor of the different vehicle.

6. The vehicle of claim 3, wherein the processor transmits the predicted behaviors of the one or more occupants of the vehicle to a different vehicle for execution by a processor of the different vehicle.

7. The method of claim 1, wherein the first automation level of the ADA system comprises one or more of a steering-assist system, an accelerating-assist system, and a braking-assist system and wherein the first entry comprises an automation level description, a driver context description, and a driver identification.

8. The method of claim 1, further comprising:
detecting, with a sensor of the plurality of sensors, a change in the driving context;
determining, based on the change in the driver context, a second optimum automation level of the ADA system;
initiating, with the processor, the second automation level of the ADA system;
based on initiating the second automation level, creating, with the processor, a second entry in the database, wherein a second entry in the database comprises information associated with the initiation of the second automation level of the ADA system; and
transmitting, with the communication system, the second entry in the database to the third party via the network, wherein the first and second entries of the database are transmitted to an insurance company, wherein the first and second automation levels are initiated based on human driver input, wherein the first automation level requires human occupant interaction to operate the vehicle and the second automation level has no human occupant interaction to operate the vehicle.

* * * * *